US 9,051,946 B2

(12) United States Patent
Cameron et al.

(10) Patent No.: US 9,051,946 B2
(45) Date of Patent: Jun. 9, 2015

(54) CONNECTING MECHANISM

(75) Inventors: Dean Osman Cameron, Eagle Farm (AU); Thomas David Percy, Windsor (AU); John Hamish Alexander Pettigrew, Eagle Farm (AU)

(73) Assignee: JOINLOCK PTY LTD., Eagle Farm, Queensland (AU)

( * ) Notice: Subject to any disclaimer, the term of this patent is extended or adjusted under 35 U.S.C. 154(b) by 697 days.

(21) Appl. No.: 13/208,618

(22) Filed: Aug. 12, 2011

(65) Prior Publication Data

US 2012/0000060 A1 Jan. 5, 2012

Related U.S. Application Data

(63) Continuation-in-part of application No. 12/636,259, filed on Dec. 11, 2009, and a continuation-in-part of application No. PCT/AU2010/000240, filed on Mar. 2, 2010, and a continuation-in-part of application No. PCT/AU2008/000839, filed on Jun. 12, 2008.

(30) Foreign Application Priority Data

Aug. 13, 2010 (AU) .................. 2010903642

(51) Int. Cl.
*F16L 25/00* (2006.01)
*B21D 39/03* (2006.01)
(Continued)

(52) U.S. Cl.
CPC ............... *F16B 5/0044* (2013.01); *F16B 3/00* (2013.01); *F16B 7/0426* (2013.01); *F16L 37/098* (2013.01); *F16L 37/107* (2013.01); *F16L 37/144* (2013.01)

(58) Field of Classification Search
USPC ..................... 285/330, 913; 29/428
See application file for complete search history.

(56) References Cited

U.S. PATENT DOCUMENTS 3,819,079 A 6/1974 Levens
4,031,677 A 6/1977 Tantlinger
(Continued)

FOREIGN PATENT DOCUMENTS

EP  1 413 815  4/2004
WO  WO 2008/151368  12/2008

OTHER PUBLICATIONS

Translation of Annex to Search Report of Patent Application No. 097121872 dated Oct. 2, 2013.
(Continued)

*Primary Examiner* — Victor Macarthur
(74) *Attorney, Agent, or Firm* — Nixon & Vanderhye P.C.

(57) ABSTRACT

A method for connecting at least a first component and a second component together, wherein each said component comprises at least one keyway arrangement extending along the component and keyways of the keyway arrangement are spaced apart from one another. The method comprises the steps of: aligning the keyway arrangements of the first and second components such that the keyways intermesh to provide a continuous keyway passage extending longitudinally between the intermeshed keyways; and, extending a keyway connector comprising an arrangement of keys longitudinally within the continuous keyway passage such that the keys are retained by the keyways of the keyway arrangements. In the slip flange assembly 1001 embodiment shown, the first and second components are each in the form of a pipe (1002, 1003) or tube, the keyway arrangements are in the form of collars (1004, 1008) that extend around abutting ends of said pipes (1002, 1003) or tubes, and the keyway connector (1015) is annular.

13 Claims, 64 Drawing Sheets

(51) Int. Cl.

| | |
|---|---|
| *F16B 5/00* | (2006.01) |
| *F16B 7/04* | (2006.01) |
| *F16L 37/098* | (2006.01) |
| *F16L 37/107* | (2006.01) |
| *F16L 37/14* | (2006.01) |
| *F16B 3/00* | (2006.01) |

(56) References Cited

U.S. PATENT DOCUMENTS

| | | |
|---|---|---|
| 4,054,481 A | 10/1977 | Heffner |
| 4,412,370 A | 11/1983 | Speirs |
| 4,518,277 A | 5/1985 | Bush et al. |
| 4,649,679 A | 3/1987 | Arens |
| 5,930,872 A | 8/1999 | McBride et al. |
| 5,984,566 A | 11/1999 | Blaha |
| 7,044,507 B2 | 5/2006 | Ricard |
| 2002/0158484 A1 | 10/2002 | Delavalle et al. |
| 2004/0163371 A1 | 8/2004 | Reid |
| 2006/0171776 A1 | 8/2006 | Luft |

OTHER PUBLICATIONS

CN Office Action, Appln. 200880024675.2, Aug. 19, 2011 (with English translation).
International Search Report dated May 17, 2010 in PCT/AU2010/000240.
International Search Report dated Jan. 17, 2008 in PCT/IB2007/000030.
International Search Report for PCT/AU2008/000839 mailed Jul. 21, 2008.
Jyothish, K. et al, Organic Letters, vol. 6, No. 22, 2004 pp. 3965-3968 "Synthesis of novel Quinaldine-Based Squaraine Dyes: Effect of Substituents and Role of Electronic Factors."
Jyothish, K. et al, Organic Letters—supporting Information, vol. 6, No. 22, 2004, pp. S1-S13, "Synthesis of novel Quinaldine-Based Squaraine Dyes: Effect of Substituents and Role of Electronic Factors."
S. Yagi et al, Synthesis, No. 3, 2002, pp. 413-417, "Synthesis of Near-Infrared absorbing Disquarylium Dyues bearing unsymmetrically extended pi-Conjugation Structures."
A. Hirth, et al, Chemie in Unserer Zeit, vol. 33, No. 2, 1999, pp. 83-94, "Photodynamische Tumortherapie."

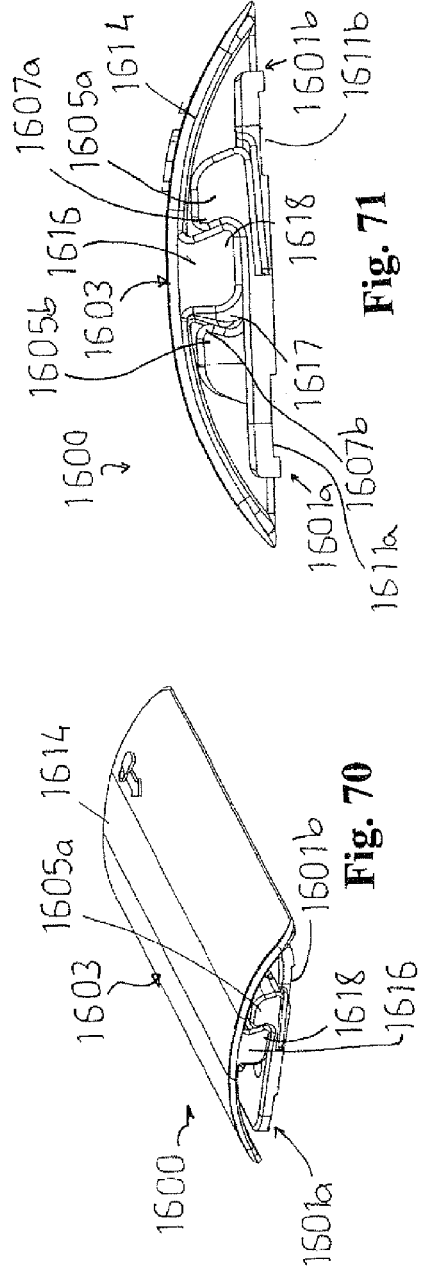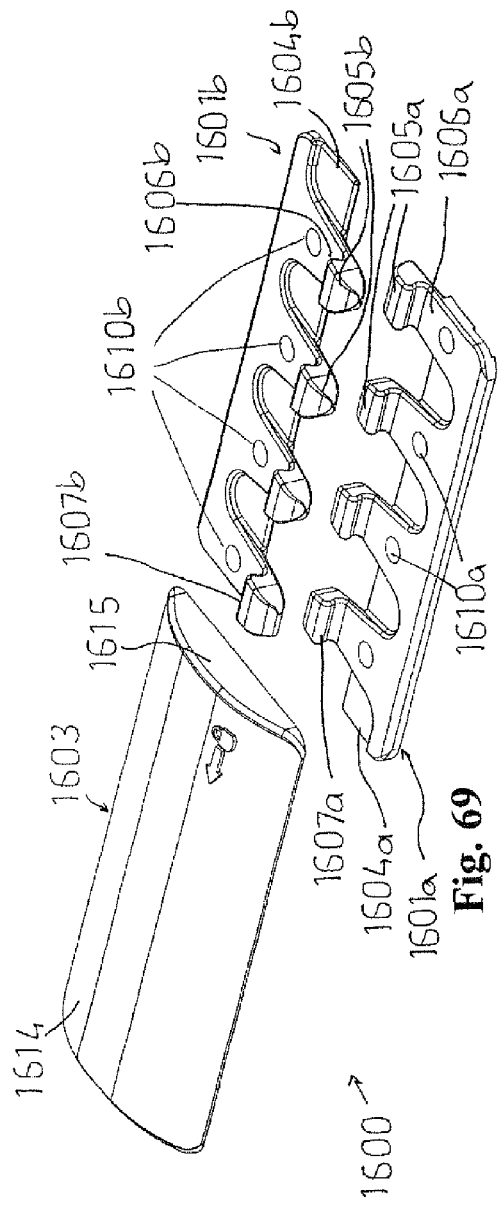

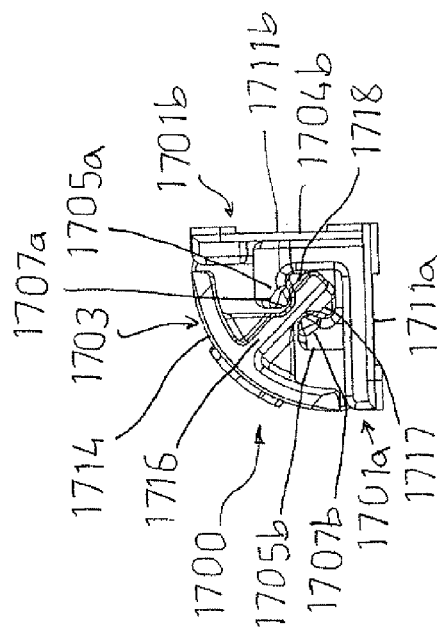
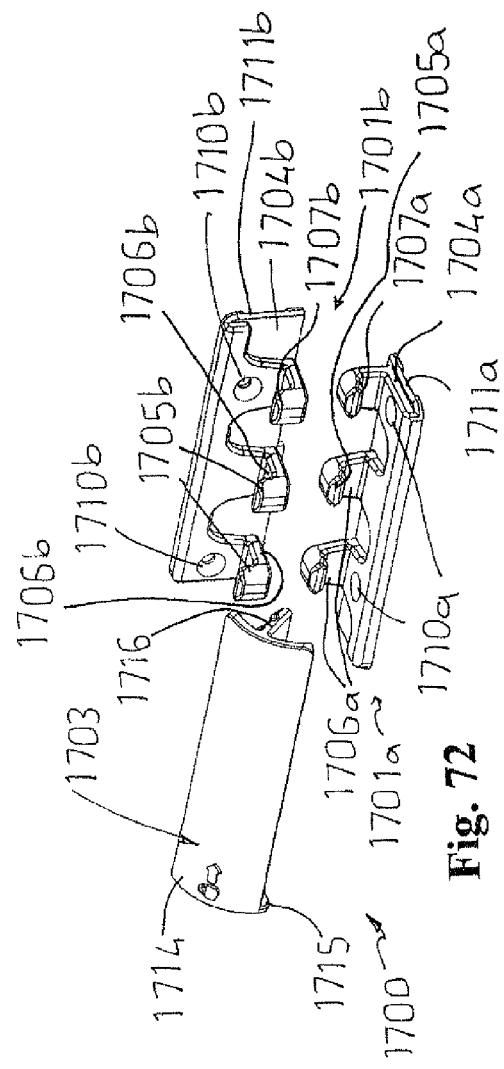
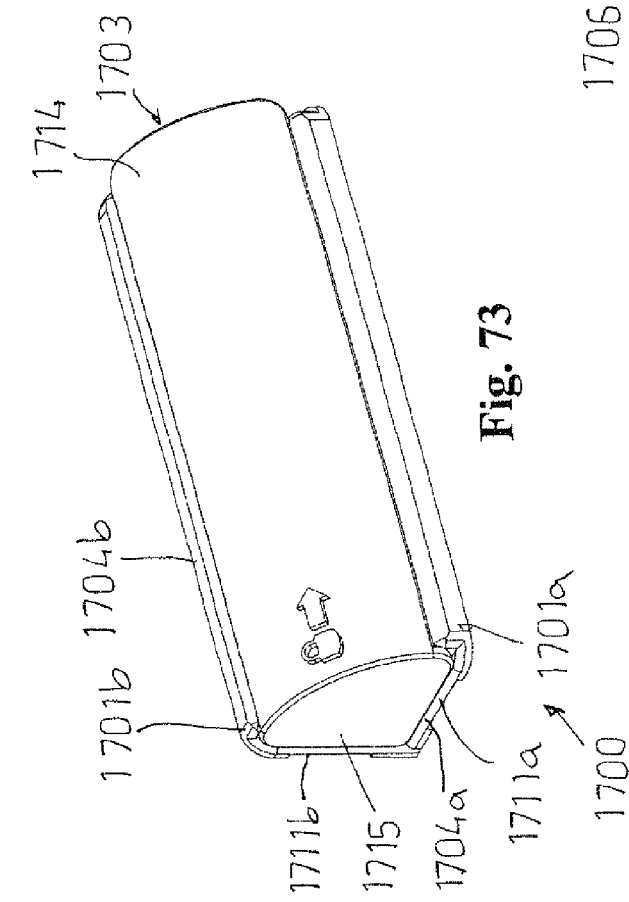

CONNECTING MECHANISM

This application is a continuation-in-part of U.S. application Ser. No. 12/636,259 filed 11 Dec. 2009, which in turn is a continuation-in-part of International Patent Application No. PCT/AU2008/000839 filed 12 Jun. 2008 and International Patent Application No. PCT/AU2010/000240 filed 2 Mar. 2010, and claims priority of Australian Provisional Application No. 2010903642 filed 13 Aug. 2010, the entire contents of which are incorporated herein by cross-reference.

FIELD OF THE INVENTION

This invention concerns a method for mechanically connecting two or more components together. In one aspect, the invention concerns components having keyway arrangements and a keyway connector having keys retainable by the keyway arrangements so as to lock the components together to form a secure joint.

Although the components and keyway connector can be made of any suitable type of material or materials, the invention is particularly suited to joining components and a keyway connector made of plastics material and will therefore be chiefly described in that context. Again, it is to be understood that the components and keyway connector need not be made of plastics material and can be made of any suitable material or materials suited for the intended application.

BACKGROUND OF THE INVENTION

Plastic is a versatile material that can be rotationally cast, injection moulded, heated and vacuum or pressure formed and even draped over form-work to make a variety of shapes for various purposes. For mass production, injection moulding is a preferred method because it is fast, energy efficient and gives more precision of shape and size. It is, however, limiting in that internal cavities can't be made without welding or gluing the components together. For some plastics, especially those in the polyolefin group like the very popular polypropylene, gluing is not normally successful, so welding or using mechanical compression fittings and seals is the only real joining alternative. Compression fittings are limited in how big they can be in practice because of expense. They are also predominantly used for standard sized pipe as making compression fittings for the variety of shapes required for consumer items is not practical. Even if it were practical for small items, moulded compression fittings are not practical nor cost effective for large plastic pails, so in these circumstances fabrication and welding is the only realistic alternative.

Several methods of welding are practiced. Butt welding involves cutting and cleaning both surfaces to be joined and then heating them before they are pushed together while still molten. This type of joint can leave an internal weld bead which is difficult to remove and can cause ragging that could lead to blockages when used for sewer pipelines. Fusion welding, where fittings have electrical resistance wire built into the components to melt the plastic, is also popular. Fusion joints can be pushed together whilst clean, then electrical energy is used to heat the bonding surfaces of the joint to fuse the parts together and so achieve a good seal. Other forms of welding include ultrasonic and hot air welding and both are time consuming and require specialist equipment and skills to bond joints successfully and safely. All forms of welding can produce toxic fumes and require good ventilation or breathing apparatus to be worn.

This significantly limits the uses to which plastics could otherwise be put, because it is time consuming and expensive to fabricate good quality joints on large components. Also, getting smooth curves when cold bending plastics for fabricated components is problematic and so is seldom done commercially.

Drums and pails are commonly used for the storage of hazardous or messy liquids and powders. They must have positive seals that are robust, even when dropped. Commonly used bucket type clips are prone to leakage, have a limited shelf life and once opened are no longer very effective. Threads provide a positive joining method but are expensive to mould, especially on large plastic components, and if they become too large they are very difficult to undo or tighten in real world conditions. Threads also are limited to use on circular joint face profiles with planar joint faces.

The present inventors have now developed a general connecting method for connecting two or more components together which may be made of plastics material or of any other suitable type of material. Described herein are further improvements in the connecting mechanism described in the specifications of U.S. application Ser. No. 12/636,259, International Patent Application No. PCT/AU2008/000839 and International Patent Application No. PCT/AU2010/000240 In one or more embodiments the connecting mechanism minimises or overcomes one or more of the component-joining problems referred to above.

DISCLOSURE OF INVENTION

According to a first aspect of the present invention, there is provided a method for connecting at least a first component and a second component together, wherein each said component comprises at least one keyway arrangement having one or more keyways extending along the component, said method comprising the steps of:

aligning the keyway arrangements of the first and second components such that the keyways provide a keyway passage extending longitudinally between the keyways; and extending a keyway connector longitudinally within the keyway passage such that the keyway connector engages the keyways of the keyway arrangements to lock the first and second components together.

According to a second aspect of the present invention, there is provided a method for connecting at least a first component and a second component together, wherein each said component comprises at least one keyway arrangement extending along the component and keyways of the keyway arrangement are spaced apart from one another, said method comprising the steps of:

aligning the keyway arrangements of the first and second components such that the keyways intermesh to provide a keyway passage extending longitudinally between the intermeshed keyways; and extending a keyway connector comprising an arrangement of keys longitudinally within the keyway passage such that the keys engage the keyways of the keyway arrangements to lock the first and second components together.

The present invention also relates to at least a first component, a second component and a keyway connector as defined above when used for the method according to the first or second aspects.

Each keyway arrangement and its keyway/s may extend along each component or a remainder/body of each component in any suitable way. For instance, the keyway arrangement may extend along a face, surface, edge, perimeter and/or periphery of the component. The form of each keyway arrangement will depend on the nature of each component and how they are to be connected to one another.

Each component and keyway arrangement may be of any suitable size, shape and construction, and may be made of any suitable material or materials. The component and keyway arrangement may be planar, angular, bent, arcuate, convex, concave, annular, tubular (circular or non-circular), discoid, conical, tapered, cylindrical, rectangular or of any other simple or complex geometry. Each component and keyway arrangement may consist of metal, an alloy, plastics material, ceramics or rubber, including steel or polyurethane, or any combination of these. The keyway arrangement and component/remainder of the component need not be made of the same material or materials.

Each keyway arrangement may comprise any suitable number of keyways and the keyways may be of any suitable size, shape and construction, provided that they can engage and preferably retain the keys of the keyway connector so as to lock the components together to form a secure joint. In a preferred embodiment, each keyway is in the form of a hook and each key is shaped so as to be retained by the hook.

Each keyway may have a connector-support portion and a key-retaining portion. The connector-support portion may extend beneath the keyway connector and the key-retaining portion may extend around a key. The key-retaining portion may be arcuate, angular or both.

Each keyway arrangement may comprise series of individual keyways or a body and keyway/s extending from the body. The keyway arrangement may comprise a body, for example, in the form of a planar, tubular, arcuate or annular strip or ring, and the keyways may extend from the body along a length of the body. The body and/or keyway/s, if annular or tubular, may be conical or tapered. The keyways may have the general appearance of a sine, square, triangle or sawtooth waveform, having both peaks and troughs. One or more of the troughs may support the connector support portion of an intermeshed keyway. The keyways may extend from one or both longitudinal sides of the body.

The keyways of the keyway arrangements may intermesh with one another in any suitable way. If first and second components are to be connected together, then each keyway of the first component may be located immediately adjacent a keyway of the second component.

More than two components may be connected together. For instance, if first, second and third components are to be connected together, then the keyway of one component may be flanked by a respective keyway of each other component, although this need not necessarily be the sequence of keyways.

Each component may have more than one keyway arrangement extending along the component. This would allow a component to be directly connected to two or more other components at the same time, thus enabling an endless number of complex structures to be assembled.

Each keyway arrangement may be connectable, permanently connected or detachably connected to a component or remainder/body of the component, and this may be achieved in any suitable way. For instance, the keyway arrangement body may be receivable within a groove, pocket or a fold of the component. Alternatively, or additionally, the keyway arrangement may be welded, fused, melted, glued, nailed, screwed or otherwise adhered, affixed or fastened to the component or remainder of the component. The keyway arrangement and component or remainder of the component may be of unitary construction.

The keyway connector may be of any suitable size, shape and construction, and may be made of any suitable material or materials. The keyway connector may consist of metal, an alloy, plastics material, ceramics or rubber, including steel or polyurethane, or any combination of these. The keyway connector need not be made of the same material as the first and second components/keyway arrangements. The keyway connector may be of unitary construction or may comprise two or more detachably connected pieces. An end of a first keyway connector piece may interference fit with an end of an adjacent second keyway connector piece. Alternatively, one end of an annular keyway connector may interference fit with the other end of the same connector (ie. a split-ring structure).

Preferably, the keyway connector has an elongate body and, for the connection of two components, the keys extend laterally off the body from opposite sides of the body. The keyway connector body may be in the form of a planar, tubular, arcuate or annular strip or ring, and the keys may extend from the body along a length of the body. The body and/or keyways, if annular or tubular, may be conical or tapered.

In one embodiment, a single key may extend laterally off each opposing side of the body. In another embodiment, each side of the body may have a plurality of keys extending within the same plane and the keys may be spaced apart from one another in accordance with the spacing of the keyways, and the position of the keys may alternate from one side of the body to the other along a length of the body. With the keys in this arrangement, the keys may be slid into locking engagement with the keyways or slid out of locking engagement with the keyways. If the keyways are in the form of hooks, then the keyway connector may be removed from the keyway passage in a lateral direction between the intermeshed hooks when not in locking engagement with the keyways.

The keyways and keyway connector may engage so that they may releasably unlocked or they may engage so that they cannot be unlocked without destroying the joint. This may be achieved in any suitable way. They may also engage such that the keyway connector can be reversibly fixed or held to prevent it accidentally unlocking with stress cycling. A lofted keyway profile or lofted keyway connector profile may be used to achieve this or alternatively any number of other methods that will be obvious to those skilled in the art may be used, e.g. notches, positive-lock arrangement, insertable keys, tabs, grub screws or other methods.

The keys of the keyway connector may simply interference fit with the keyways and/or the keyway connector may be used as a cam lock. If the latter, the keyway connector may be rotated relative to its longitudinal axis between locking and unlocking positions. In the unlocking position, the keyway connector may be inserted into the keyway passage and be movable relative to the keyways, and in the locking position the keys of the keyway connector may forcefully engage the keyways. Moving the keyway connector between the locking and unlocking positions may involve rotating the keyway connector through an angle of about 90° relative to its longitudinal axis.

The keyway connector may comprise a handle, lobe or grip surface extending from or along the body. The connector may have any suitable type of handle. Preferably, the handle extends almost the length of the body but for some applications it may be located at or near one end or both ends. The handle may have openings for fingers or other tools located between an upper surface of the handle and an upper surface of the body. The handle may be removable or engage with a variety of gripping surfaces that can be formed onto a suitable face of the keyway connector.

Alternatively or additionally, the keyway connector may comprise a structural component extending from or along the body. This structural component may be, for example, planar, angular, bent, arcuate, convex, concave, annular, discoid, conical, tapered, cylindrical, rectangular, rounded or of any other simple or complex geometry. This structural component may connect with another said component. The structural component may provide a decorative finish and/or a barrier.

The keyway connector may further comprise one or more travel stops or similar integrated mechanisms extending from the keyway connector body, for restricting the degree of longitudinal movement of the body within the keyway passage.

The method may comprise the step of connecting the components together using a further connecting mechanism. Such a mechanism may include mating male and female regions, such as, for example, a key and keyway arrangement, a tongue and groove arrangement, a pin and hole arrangement and so forth being located between abutting faces or edges of the components.

The method may further comprise the step of introducing a sealing member between the components before connecting them together, so as to render the connection fluid-tight (including water tight and/or air-tight). Any suitable type of sealing member may be used (e.g. a gasket or O-ring). A sealing member may be extended along abutting faces or edges of the components either as a loose fit or temporarily or permanently fixed, bonded, fused, adhered or attached by any other suitable means to the abutting faces or edges of the components.

Alternatively, abutting faces or edges of the components themselves may be shaped to provide a sealing function. For example, one or more of the components may have an integrally formed (eg. moulded) sealing member.

In a first embodiment, the first component is in the form of a container and the second component is in the form of a closure for the container. The keyway arrangements may extend along a circumference of the container and closure, and the keyway connector may be annular.

In a second embodiment, the first component is in the form of a cylindrical wall section of a tank and the second component is in the form of discoid base connectable to the wall section of the tank. The keyway arrangements may extend along a circumference of the wall section and base, and the keyway connector may be annular. In this embodiment, a third component in the form of a cylindrical wall section of the tank may be connectable to a free end of the other wall section, again by way of an annular keyway connector.

In a third embodiment, the first and second components are in the form of panels or beams that are connectable edge to edge or face to face such that they extend substantially in the same plane or at different angles relative to one another. The keyway arrangements may extend along an edge or face of each panel or beam, and a body of the keyway connector may be longitudinal. In this embodiment, any suitable number of additional panels or beams may be connected to the first and second components so as to form, for example, floors, formwork, scaffolding, architectural beams and other types of building elements.

In a fourth embodiment, the components are in the form of pipes or general tubular members that are connectable end to end. Each keyway arrangement may extend along a circumference of the pipe or tubular or conical member at or adjacent the pipe end or tubular or conical member end that is to be connected. The components may be of the same diameter or of differing diameter, and one or more of the components may be conical or tapered. The pipe or tubular member may have a circular or non-circular cross-section, including a rectangular, triangular, hexagonal or octagonal cross-section. One or more of the components may have a flanged end.

The keyway arrangement may comprise a body in the form of an arcuate, tubular or annular strip or ring, and the keyways may extend from the body along a length of the body. The keyways may have the appearance of a sine, square, triangle or sawtooth waveform, having both peaks and troughs. The keyways may extend from one or both longitudinal sides of the body.

The keyway arrangement may be permanently connected or detachably connected to the pipe or tubular member or a remainder of the pipe or tubular member, and this may be achieved in any suitable way. For instance, the keyway arrangement body may be of integral/unitary construction with the pipe or tubular member. For instance, the keyway arrangement body may be receivable within or retainable by a groove or fold of the pipe or tubular member. For instance, the keyway arrangement body may be connectable to or otherwise engageable with a flange of the pipe or tubular member. Alternatively, or additionally, the keyway arrangement may be welded, fused, melted, glued, nailed, screwed or otherwise adhered, affixed or fastened to the pipe or tubular member or remainder of the pipe or tubular member.

The keyway connector may comprise an arcuate, annular, tubular or ring body or a split ring body or multi-piece body, and keys of the keyway connector may be spaced along a circumference of the keyway connector body. The keys may be slid between adjacent keyways of the keyway arrangements and rotated into locking engagement with the keyways. The keys may extend generally in line with a central axis of the arcuate, annular or ring body and/or the keys may extend generally or otherwise point radially relative to a central axis of the body. The keyway connector may be able to ride over the keyways when the keyway connector is being inserted into the continuous keyway passage. In one embodiment, the keys are spaced apart by curved recessed sections that help the keyway connector ride over keyways when the keyway connector is being inserted into the continuous keyway passage.

The first and second components may each be in the form of a pipe or tube having a flanged end with the keyway arrangements extending around and over abutting flanged ends of said pipes or tubes.

According to a third aspect of the present invention, there is provided an assembly comprising at least a first component, a second component and a keyway connector, wherein each said component comprises at least one keyway arrangement having one or more keyways extending along the component, wherein the keyway arrangements of the first and second components are aligned such that the keyways provide a keyway passage extending longitudinally between the keyways, and the keyway connector extends longitudinally within the keyway passage so as to lock the first and second components together.

According to a fourth aspect of the present invention, there is provided an assembly comprising at least a first component, a second component and a keyway connector, wherein each said component comprises at least one keyway arrangement extending along the component and keyways of the keyway arrangement are spaced apart from one another, wherein the keyway arrangements of the first and second components are aligned such that the keyways intermesh to provide a keyway passage extending longitudinally between the intermeshed keyways, and the keyway connector comprises an arrangement of keys and extends longitudinally within the keyway passage such that the keys engage the keyways of the keyway arrangements to lock the first and second components together.

The components, keyway assemblies and keyway connector of the assembly may be as described above.

According to a preferred form of the present invention, there is provided a method for connecting at least a first component and a second component together, wherein each said component comprises a keyway arrangement extending along a body of the component and keyways of the keyway arrangement are spaced apart from one another but connected to the body of the components to be joined, said method comprising the steps of:

aligning the keyway arrangements of the first and second components such that the keyways intermesh to provide a series of opposing keyways forming a keyway passage extending longitudinally between laterally juxtapositioned intermeshed keyways; and inserting a keyway connector comprising a corresponding arrangement of keys longitudinally within the keyway passage such that when the keyway connector is moved longitudinally in the keyway passage the keys engage with and are retained by the keyway passage of the keyway arrangements and at the same time force the keyways apart laterally and so tightening jointing surfaces of the bodies.

The components and keyway connector may be as described above.

According to a fifth aspect of the present invention, there is provided a method for connecting at least a first component and a second component together, wherein at least the first said component comprises two or more spaced apart keyway arrangements, with each said arrangement having one or more keyways extending along the component that provide a keyway passage extending longitudinally between the keyways, said method comprising the steps of:

extending part of the second component within the keyway passage; and extending a keyway connector longitudinally within the keyway passage such that the keyway connector engages the keyways of the keyway arrangements to lock the first and second components together.

According to a sixth aspect of the present invention, there is provided an assembly comprising at least a first component, a second component and a keyway connector, wherein at least the first said component comprises two or more spaced apart keyway arrangements, with each said arrangement having one or more keyways extending along the component that provide a keyway passage extending longitudinally between the keyways, wherein part of the second component extends within the keyway passage, and the keyway connector extends longitudinally within the keyway passage so as to lock the first and second components together.

The components and keyway connector of the method and assembly may be as described above. The assembly may be as described above.

One or both of the keyway arrangements may have keyways spaced apart from one another (ie. castellated). Alternatively, one of the keyway arrangements may have castellated keyways and the other keyway arrangement may have a single keyway (ie. non-castellated).

According to a seventh aspect of the present invention, there is provided a method for connecting at least a first component and a second component together, wherein each said component has at least one keyway arrangement extending along the component and keyways of the keyway arrangement are spaced apart from one another, said method comprising the steps of:

aligning the keyway arrangements of the first and second components such that the keyways intermesh to provide a keyway passage extending longitudinally between the intermeshed keyways; and extending a keyway connector comprising an arrangement of keys longitudinally within the keyway passage such that the keys engage the keyways of the keyway arrangements to lock the first and second components together, wherein the first and second components are each in the form of a pipe or tubular member with the keyway arrangements extending around abutting ends of said pipes or tubular members, and the keyway connector is annular.

According to an eighth aspect of the present invention, there is provided an assembly comprising at least a first component, a second component and a keyway connector, wherein each said component comprises at least one keyway arrangement extending along the component and keyways of the keyway arrangement are spaced apart from one another, wherein the keyway arrangements of the first and second components are aligned such that the keyways intermesh to provide a keyway passage extending longitudinally between the intermeshed keyways, and the keyway connector comprises an arrangement of keys and extends longitudinally within the keyway passage such that the keys engage the keyways of the keyway arrangements to lock the first and second components together, wherein the first and second components are each in the form of a pipe or tubular member with the keyway arrangements extending around abutting ends of said pipes or tubular members, and the keyway connector is annular.

In one embodiment, the first and second components may each be in the form of a pipe or tube having a non-flanged end with the keyway arrangements extending around and over abutting ends of said pipes or tubular members.

In another embodiment, the first and second components may each be in the form of a pipe or tube and only one of the pipes or tubes has a flanged end, and the keyway arrangements extend around and over abutting ends of said pipes or tubular members.

In yet another embodiment, the first and second components may each be in the form of a pipe or tube having a flanged end with the keyway arrangements extending around and over abutting flanged ends of said pipes or tubular members.

Each said keyway arrangement may comprise a body in the form of a collar or ring that is permanently connected or connectable to said pipe or tubular member. The keyway arrangement may be welded, fused, melted, glued, nailed, screwed or otherwise adhered, affixed or fastened to the component. The respective keyway arrangement and component may be of unitary construction.

Each said keyway arrangement may comprise a body in the form of a collar that is detachable from said pipe or tubular member. This may be achieved by way of mating male and female regions, such as, for example, a key and keyway arrangement, a tongue and groove arrangement, a pin and hole arrangement and so forth.

The keyways may extend from a length of the keyway arrangement body. The keyways may have the general appearance of a sine, square, triangle or sawtooth waveform, having both peaks and troughs.

Each said keyway may comprises a connector-support portion and a key-retaining portion, the connector-support portion extending beneath the keyway connector and the key-retaining portion extending around a said key.

Each said keyway may be in the form of a hook and each said key may be shaped so as to be retained by the hook.

According to a ninth aspect of the present invention, there is provided a method for connecting at least a first component and a second component together, wherein each said component comprises at least one keyway arrangement extending along the component and keyways of the keyway arrangement are spaced apart from one another, said method comprising the steps of:

aligning the keyway arrangements of the first and second components such that the keyways intermesh to provide a keyway passage extending longitudinally between the intermeshed keyways; and extending a keyway connector comprising an arrangement of keys longitudinally within the keyway passage such that the keys engage the keyways of the keyway arrangements to lock the first and second components together, wherein the first and second components are each in the form of a panel or beam with the keyway arrangements extending along abutting edges or faces of said panels or beams, and the keyway connector is elongate.

According to a tenth aspect of the present invention, there is provided an assembly comprising at least a first component, a second component and a keyway connector, wherein each said component comprises at least one keyway arrangement extending along the component and keyways of the keyway arrangement are spaced apart from one another, wherein the keyway arrangements of the first and second components are aligned such that the keyways intermesh to provide a keyway passage extending longitudinally between the intermeshed keyways, and the keyway connector comprises an arrangement of keys and extends longitudinally within the keyway passage such that the keys engage the keyways of the keyway arrangements to lock the first and second components together, wherein the first and second components are each in the form of a panel or beam with the keyway arrangements extending along abutting edges or faces of said panels or beams, and the keyway connector is elongate.

Each said keyway arrangement may comprise a body in the form of a strip that is permanently connected or connectable to said panel or beam. The keyway arrangement may be welded, fused, melted, glued, nailed, screwed or otherwise adhered, affixed or fastened to the component. The respective keyway arrangement and panel or beam may be of unitary construction.

Each said keyway arrangement may comprise a body in the form of a strip that is detachable from said panel or beam. This may be achieved by way of mating male and female regions, such as, for example, a key and keyway arrangement, a tongue and groove arrangement, a pin and hole arrangement and so forth. For example, the strip may be locatable within a retaining groove or fold in said panel or beam, or may be weakly adhered to said component.

The keyways may extend from a length of the keyway arrangement body. The keyways may have the general appearance of a sine, square, triangle or sawtooth waveform, having both peaks and troughs.

Each said keyway may comprise a connector-support portion and a key-retaining portion, the connector-support portion may extend beneath the keyway connector and the key-retaining portion may extend around a said key.

Each said keyway may be in the form of a hook and each said key may be shaped so as to be retained by the hook.

The invention also concerns a connecting mechanism for connecting components together (or a component to itself).

According to an eleventh aspect of the present invention, there is provided a connecting mechanism comprising:

a first keyway arrangement connectable to a component and comprising keyways spaced apart from one another;

a second keyway arrangement connectable to a component and comprising keyways spaced apart from one another; and a keyway connector comprising an arrangement of keys, wherein the first and second keyway arrangements are alignable such that the keyways intermesh to provide a keyway passage extending longitudinally between the intermeshed keyways, and the keyway connector is extendable longitudinally within the keyway passage such that the keys engage the keyways of the keyway arrangements to lock the first and second keyways and keyway connector together.

The (first and second) keyway arrangements and keyway connector can be as described above in respect of the other aspects of the invention.

The first and second keyway arrangements can be connectable to any suitable type of component, including any of those described above in respect of the other aspects of the invention. The keyway arrangements may be connected to different components or to the same (common) component.

Particularly preferred embodiments of the invention will now be described by way of example with reference to the accompanying figures.

BRIEF DESCRIPTION OF THE FIGURES

FIG. 69 is an exploded view of a connecting mechanism comprising two keyway arrangements and a keyway connector for joining two planar components together and to mask the joint with a decorative finish, according to an embodiment of the present invention;

FIG. 70 is an end perspective view of the connecting mechanism of FIG. 69 when assembled;

FIG. 71 is an end view of the connecting mechanism of FIG. 69 when assembled;

FIG. 72 is an exploded view of a connecting mechanism comprising two keyway arrangements and a keyway connector for joining two components together at 90 degrees and to mask the joint with a decorative finish, according to an embodiment of the present invention;

FIG. 73 is a perspective view of the connecting mechanism of FIG. 72 when assembled; and FIG. 74 is an end view of the connecting mechanism of FIG. 72 when assembled.

DESCRIPTION OF THE PREFERRED EMBODIMENTS

Figure 1:
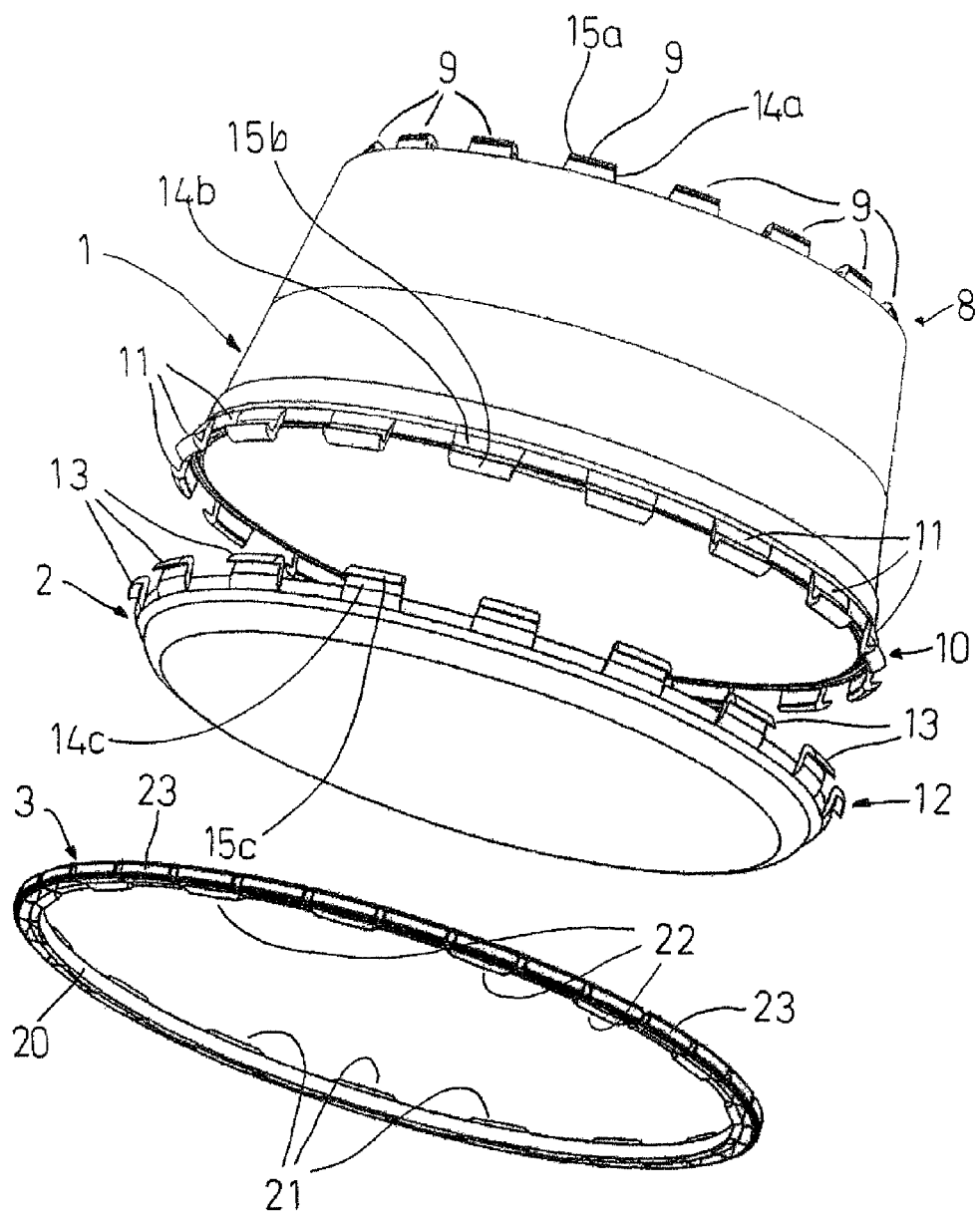
FIG. 1 is an exploded perspective view of various components of a container in the form of a tank, according to an embodiment of the present invention.

In the figures, like reference numerals refer to like features.

FIG. 1 shows part of a water tank comprising a cylindrical wall section 1, a discoid base 2 and a keyway connector 3. Preferably the tank is made of plastics material, although this need not be the case. A keyway arrangement 8 extends along a circumference of an upper end of the wall section 1 and comprises a plurality of regularly spaced keyways 9. A keyway arrangement 10 also extends along a circumference of a lower end of the wall section 1 and comprises a plurality of regularly spaced keyways 11 (only some of which have been labeled).

Likewise, a keyway arrangement 12 extends along a circumference of the base 2 and comprises a plurality of regularly spaced keyways 13 (only some of which have been labeled).

The keyway connector 3 comprises an annular body 20, keys 21 (only some of which have been labeled) extending from one side of the body 20, keys 22 (only some of which have been labeled) extending from an opposite side of the body 20, and a handle 23 generally extending from the body 20 between the keys 21, 22. The keyway connector 3 is preferably made of flexible plastics material.

Keys 21 extend in a common plane and are regularly spaced from one another. The spacing of keys 21 matches the spacing of keyways 13. Keys 22 also extend in a common plane and are regularly spaced from one another. The spacing of keys 22 matches the spacing of keyways 11. Key 21 and 22 are off-set relative to one another along a length of the body 20 in the same manner as keyways 11 and 13 when intermeshed.

Each keyway 9, 12, 13 is in the form of a hook clip having a connector-support portion 14a, 14b, 14c and a key-retaining portion 15a, 15b, 15e. Each key-retaining portion 15b, 15c may extend around a key 21, 22 of the keyway connector 3. Key-retaining portions 15b and 15c mesh externally of the wall section 1. Key-retaining portion 15a would mesh with keyways of another component internally of the wall section 1.

Figure 2:
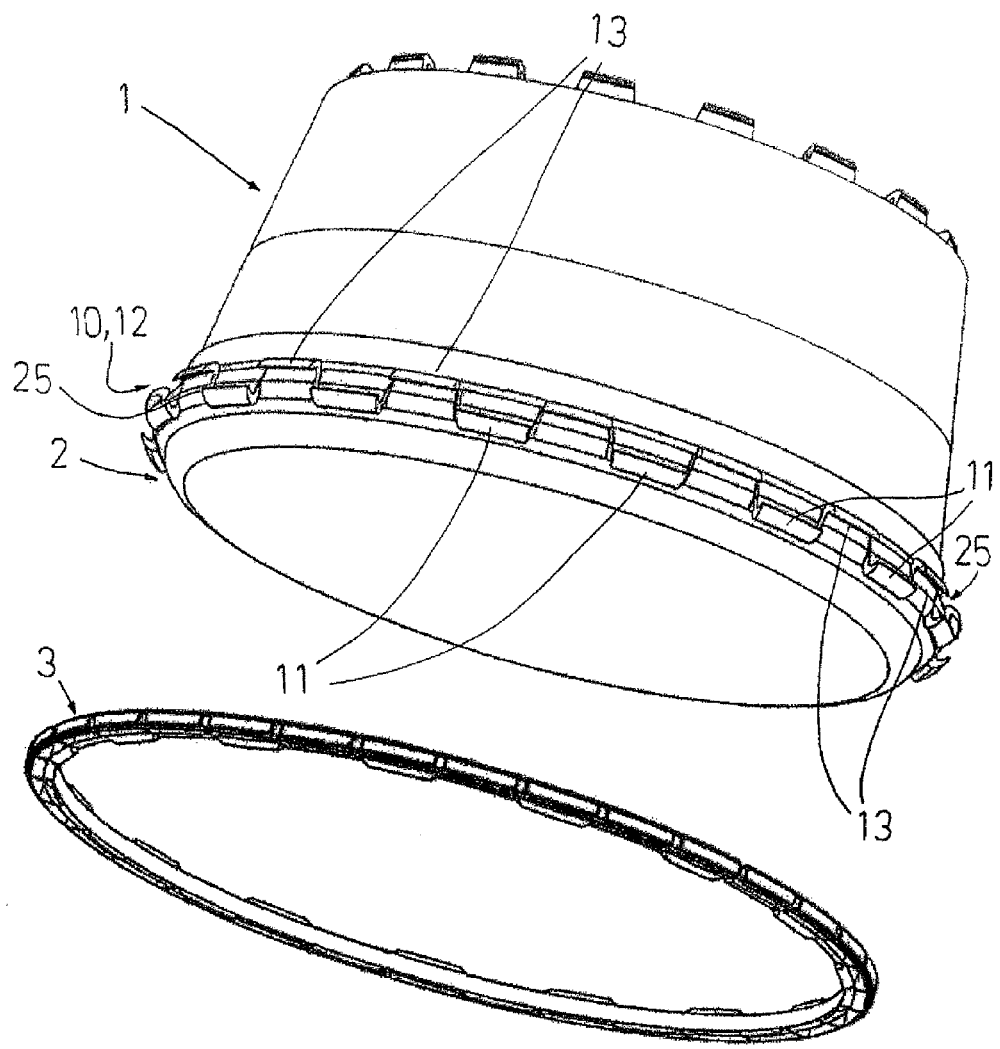
FIG. 2 is the same as FIG. 1 except that the tank has been partially assembled whereby two of the components have been brought into contact with one another.

As shown in FIG. 2, the keyways 11, 13 of the keyway arrangements 10, 12 can intermesh with one another such that each keyway 11 is straddled by two keyways 13. Keyways 11 and 13 intermesh to provide a continuous keyway passage 25 (indicated by a broken line) extending longitudinally between the intermeshed keyways 11, 13.

Figure 3:
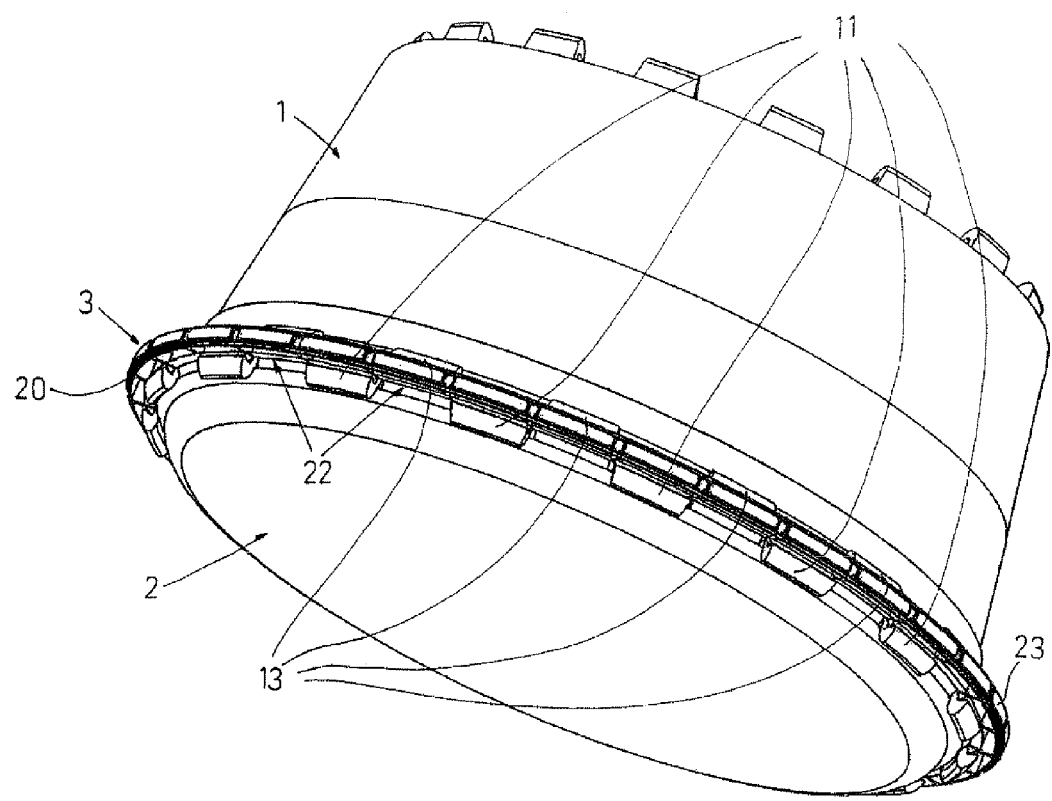
FIG. 3 is the same as FIG. 2 except that all of the components have been brought into contact with one another, but have yet to be properly locked together.
Figure 4:
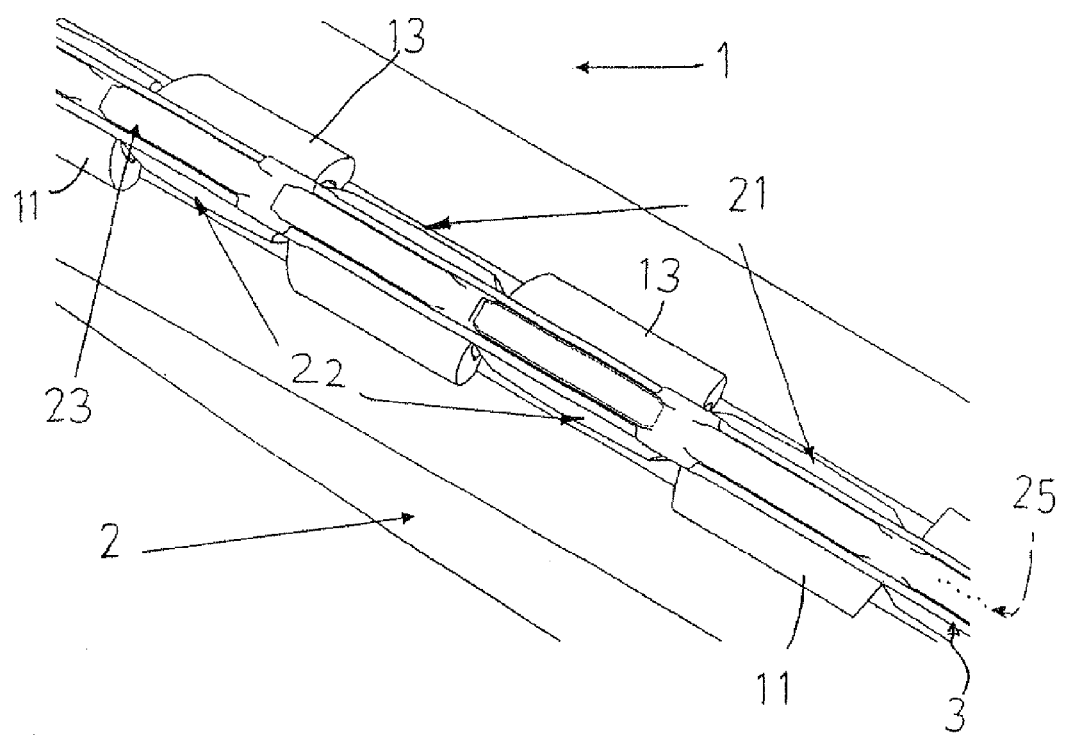
FIG. 4 is a close-up view of part of the tank shown in FIG. 3.

As shown in FIGS. 3 and 4, the keyway connector 3 is insertable longitudinally within the continuous keyway passage 25 when the keys 21, 22 are not positioned directly atop the keyways 11, 13. Once inserted, each connector-support portion 14b, 14c extends beneath the keyway connector 3 and each key-retaining portion 15b, 15c is potentially positioned to extend around a key 21, 22. This is best seen in FIG. 4.

Figure 5:
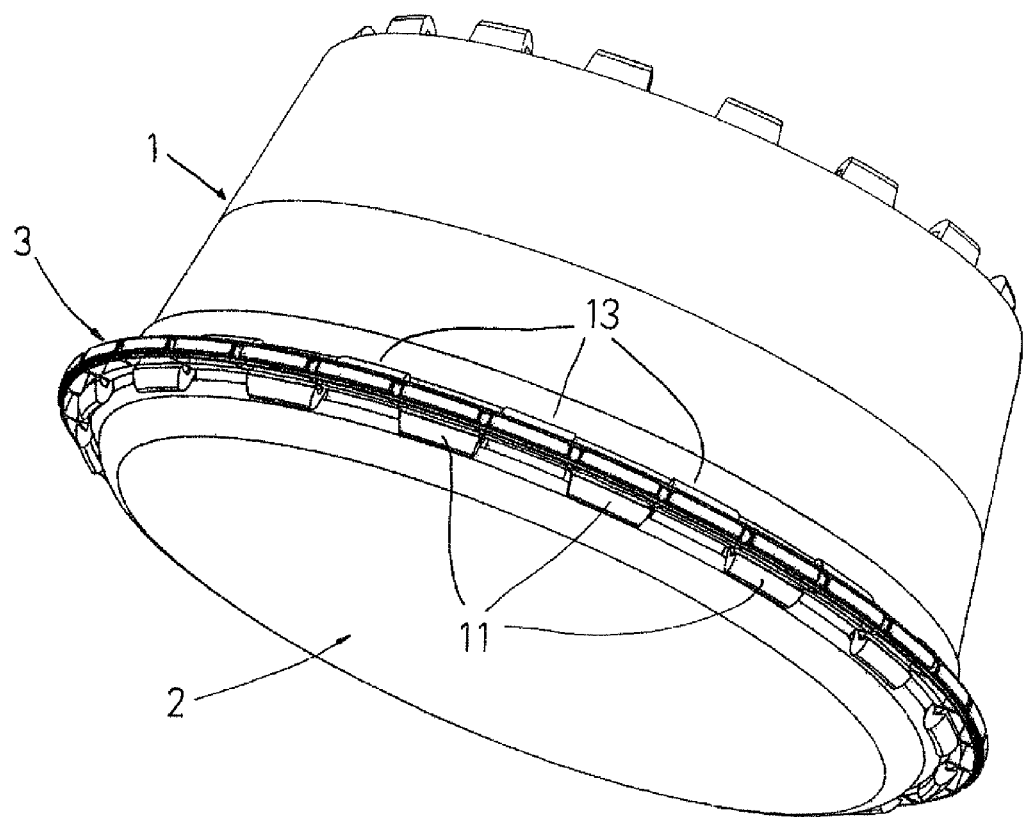
FIG. 5 is the same as FIG. 3 except that all of the components have been locked together (curved joint)
Figure 6:
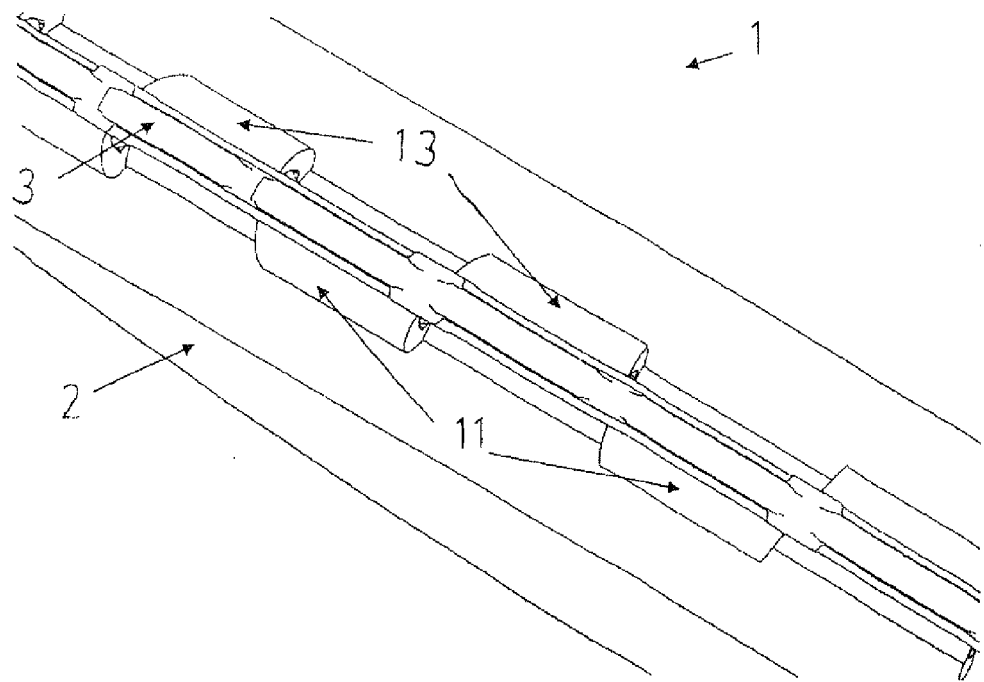
FIG. 6 is a close-up view of part of the assembled tank shown in FIG. 5.

Once the keyway connector 3 extends within the passage 25, it can be slid relative to the keyways 11, 13 until the keys 21, 22 engage the keyways 11, 13 and are retained by the keyways 11, 13 so as to lock the wall section 1 and base 2 together and to form a secure curved joint. This is shown in FIGS. 5 and 6. To disconnect the wall section 1 from the base 2, the keyway connector 3 is slid within the passage 25 until the keys 21, 22 no longer engage the keyways 11, 13, as seen in FIGS. 3 and 4.

If required, another wall section like section 1 or a lid like base 2 may be connected to the upper region of wall section 1 by way of keyway arrangement 8. However, since the keyways 9 of keyway arrangement 8 face inwardly, a keyway connector would extend circumferentially within the interior of the tank.

It can be seen from FIGS. 2-6 that keyways 13 are fully backed by the lower region of wall section 1 and that keyways 11 are fully backed by a peripheral region of base 2 and so are inherently strong as most of the stress is resolved into tensile forces and bending moment by prestressing the keyways 11, 13 through the strongest central point of both the keyways 11, 13 and keyway connector 3, so minimizing the shear forces which for most materials are the weakest structural property.

Referring now to FIGS. 7 to 10, there is shown a panel assembly 30 comprising an upper panel component 31, a lower panel component 32 and a keyway connector 33. Preferably the assembly 30 is made of plastics material, although this need not be the case. A keyway arrangement 34 extends along an upper edge of the upper panel 31 and comprises a plurality of regularly spaced keyways 35. A keyway arrangement 37 also extends along a lower edge of the upper panel 31 and comprises a plurality of regularly spaced keyways 38.

Likewise, a keyway arrangement 40 extends along an upper edge of the lower panel 32 and comprises a plurality of regularly spaced keyways 41. A keyway arrangement 42 also extends along a lower edge of the lower panel 32 and comprises a plurality of regularly spaced keyways 43.

Figure 9:
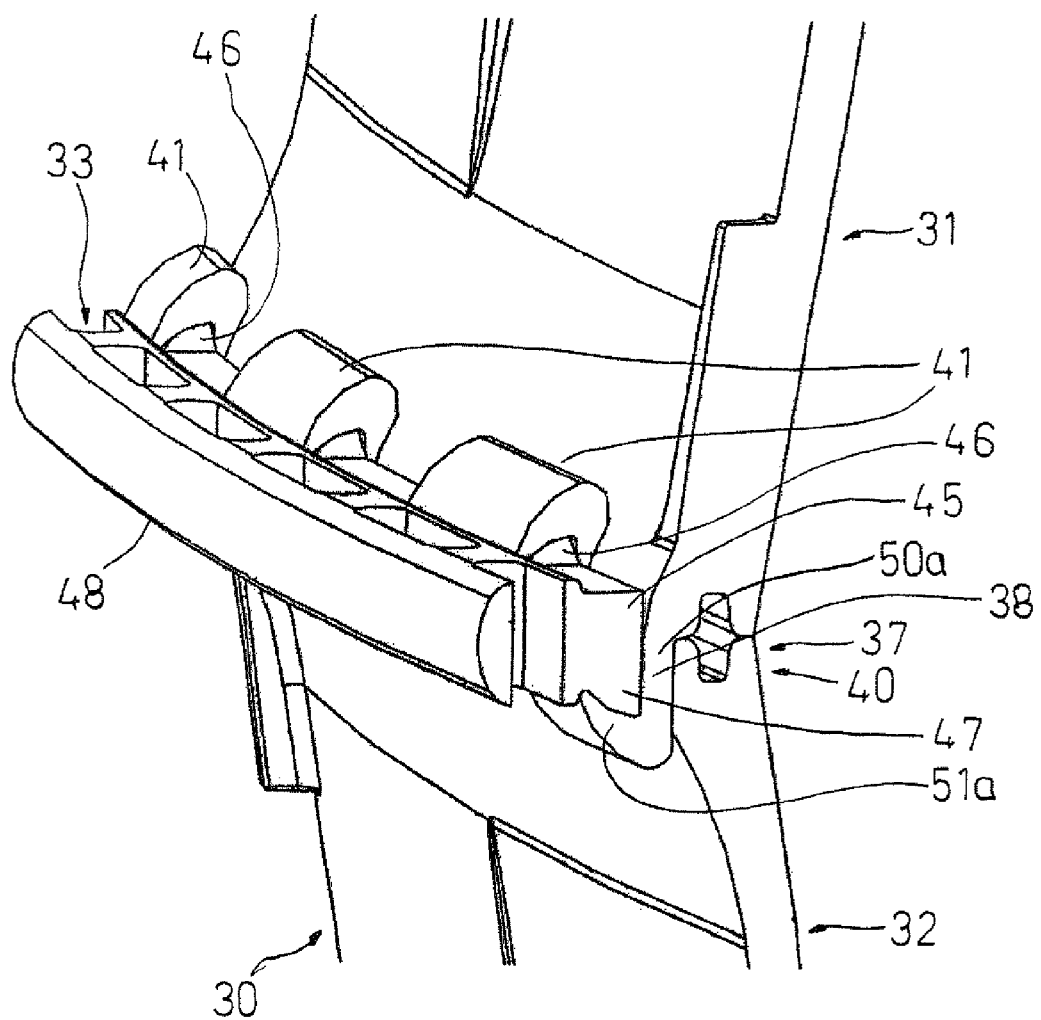
FIG. 9 is a close-up view of the connected panel components shown in FIG. 7 (curved joint)
Figure 10:
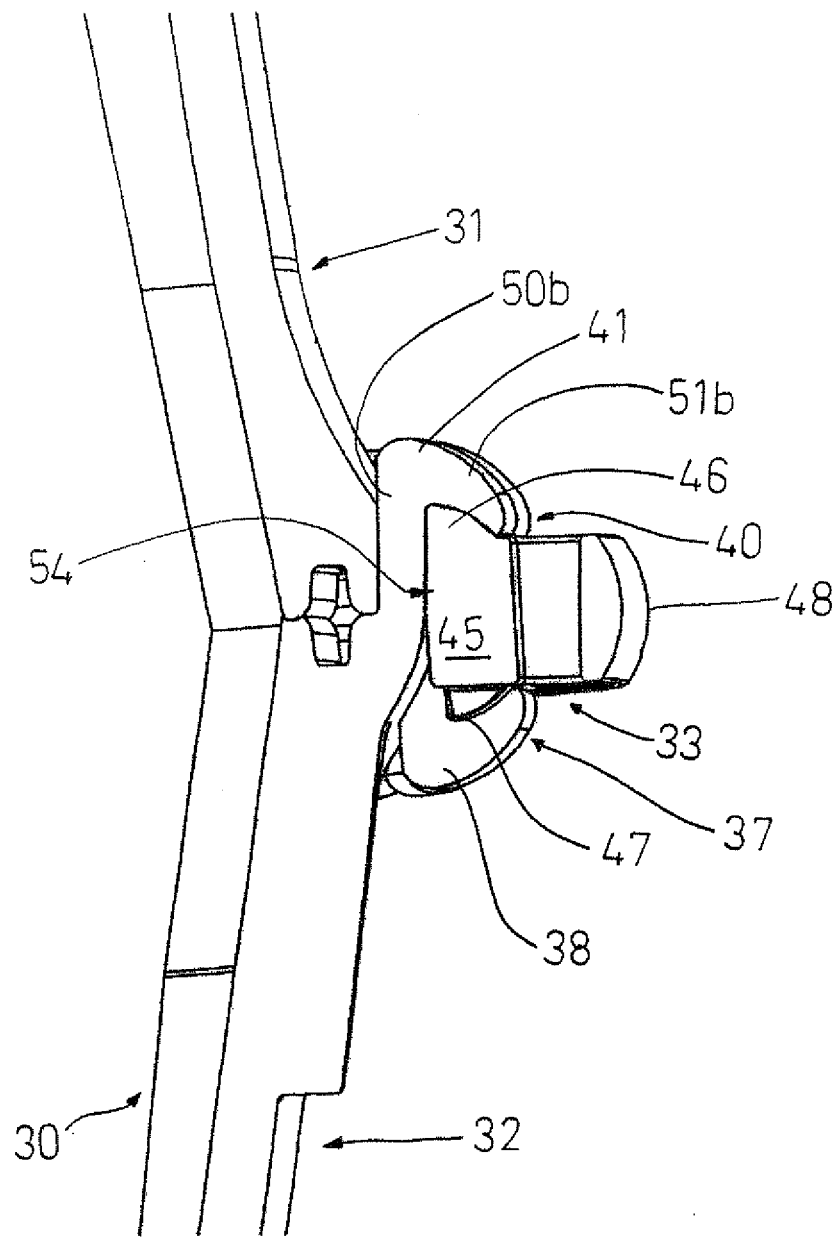
FIG. 10 is a side elevation view of the connected panel components shown in FIG. 7.

As seen in FIGS. 9 and 10, the keyway connector 33 comprises a longitudinal body 45, keys 46 extending from one side of the body 45, keys 47 extending from an opposite side of the body 45, and a handle 48 generally extending from above the body 45 between the sides of the body 45.

Keys 46 extend in a common plane and are regularly spaced from one another. The spacing of keys 46 matches the spacing of keyways 41. Keys 47 also extend in a common plane and are regularly spaced from one another. The spacing of keys 47 matches the spacing of keyways 38. Keys 46 and 47 are off-set relative to one another along a length of the body 45 in the same manner as keyways 38 and 41 when intermeshed.

Each keyway 38, 41 is in the form of a hook having a connector-support portion 50a, 50b and a key-retaining portion 51a, 51b. Each key-retaining portion 51a, 51b may extend around a key 46, 47.

The keyways 38, 41 can intermesh with one another such that each keyway 41 is straddled by two keyways 38 of the other arrangement. Keyways 38 and 41 intermesh to provide a continuous keyway passage 54 extending longitudinally between the intermeshed keyways 38, 41 (see FIG. 10).

The keyway connector 33 can be inserted laterally and slide longitudinally within the continuous keyway passage 54. Once inserted, each connector-support portion 50a, 50b extends beneath the keyway connector 33 and the key-retaining portion 51a, 51b is potentially positioned to extend around a key 46, 47. This is best seen in FIGS. 9 and 10.

Once the keyway connector 33 extends within the passage 54, it can be slid relative to the keyways 38, 41 until the keys 46, 47 engage the keyways 38, 41 and are retained by the keyways 38, 41 so as to lock the panels 31, 32 together to form a simple tight joint. To disconnect panel 31 from panel 32, the keyway connector 33 is slid within the passage 54 until the keys 46, 47 no longer engage the keyways 38, 41.

If required, another panel component may be connected to the upper region of panel 31 by way of keyway arrangement 34/keyways 35 or to the lower region of panel 32 by way of keyway arrangement 42/keyways 43, as described above.

It can be seen from FIGS. 9 and 10 that keyways 38 are fully backed by the upper region of panel 32 and that keyways 41 are fully backed by the lower region of panel 31, and so are inherently strong for the reasons described above for the tank.

Figure 11:
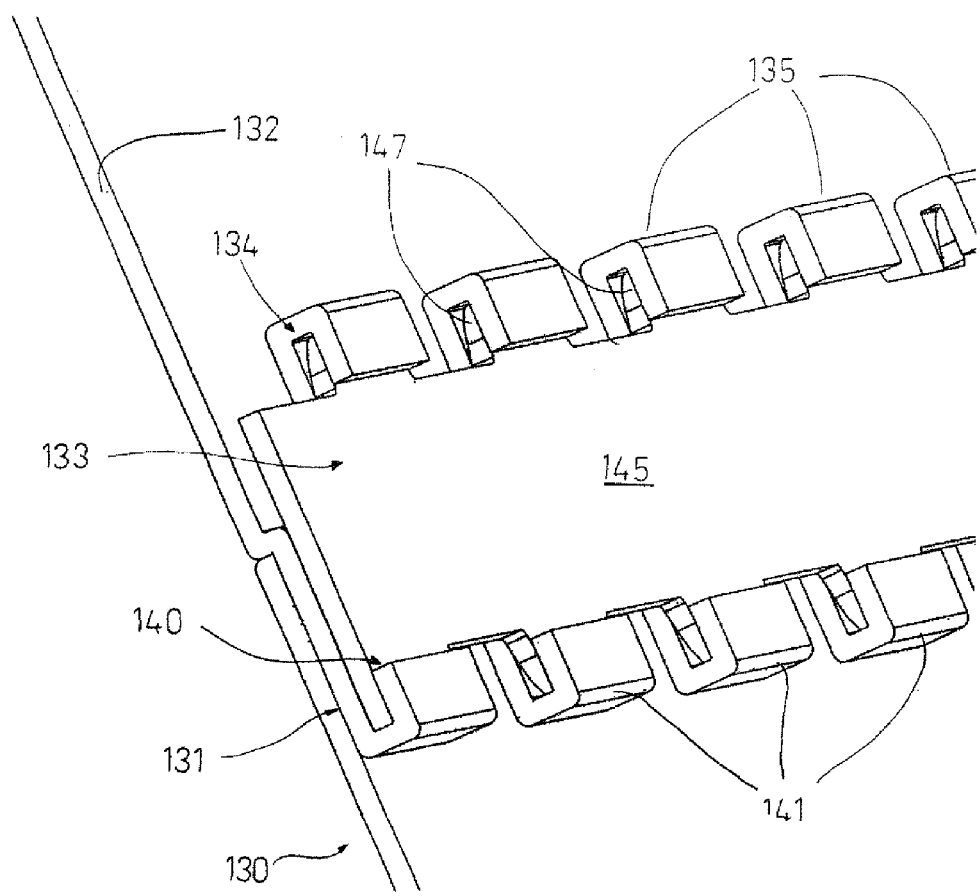
FIG. 11 is a perspective view of an assembly comprising two flat panel components connected together with a keyway connector (flat joint), according to another embodiment of the present invention.

Referring now to FIG. 11, there is shown a panel assembly 130 comprising a first substantially flat panel component 131, a substantially flat second panel component 132 and a keyway connector 133. Preferably the assembly 130 is made of plastics material, although this need not be the case. A keyway arrangement 134 extends along a joining edge of the first panel 131 and comprises a plurality of regularly spaced keyways 135.

Likewise, a keyway arrangement 140 extends along a joining edge of the second panel 132 and comprises a plurality of regularly spaced keyways 141.

The keyway connector 133 comprises a longitudinal body 145, keys 146 extending from one side of the body 145 and keys 147 extending from an opposite side of the body 145.

Keys 146 extend in a common plane and are regularly spaced from one another. The spacing of keys 146 matches the spacing of keyways 141. Keys 147 also extend in a common plane and are regularly spaced from one another. The spacing of keys 147 matches the spacing of keyways 135. Keys 146 and 147 are off-set relative to one another along a length of the body 145 in the same manner as keyways 135 and 141 when intermeshed.

Each keyway 135, 141 is in the form of a hook having a connector-support portion and a key-retaining portion (as described in respect of FIGS. 7-10). Each key-retaining portion may extend around a key.

The keyways 135, 141 can intermesh with one another such that each keyway 141 is straddled by two keyways 135 of the other arrangement. Keyways 135 and 141 intermesh to provide a continuous keyway passage extending longitudinally between the keyways 135, 141.

The keyway connector 133 can be inserted laterally and slide longitudinally within the continuous keyway passage. Once inserted, each connector-support portion extends beneath the keyway connector 133 and the key-retaining portion is potentially positioned to extend around a key 146, 147.

Once the keyway connector 133 extends within the passage, it can be slid relative to the keyways 135, 141 until the keys 146, 147 engage the keyways 135, 141 and are retained by the keyways 135, 141 so as to lock the panels 131, 132 together to form a simple flat joint providing a continuous planar surface. To disconnect panel 131 from panel 132, the keyway connector 133 is slid within the passage until the keys 146, 147 no longer engage the keyways 135, 141.

Keyways 135 are fully backed by the joining edge of panel 132 and keyways 141 are fully backed by the joining edge of panel 131, and so are inherently strong for the reasons described above.

Figure 12:
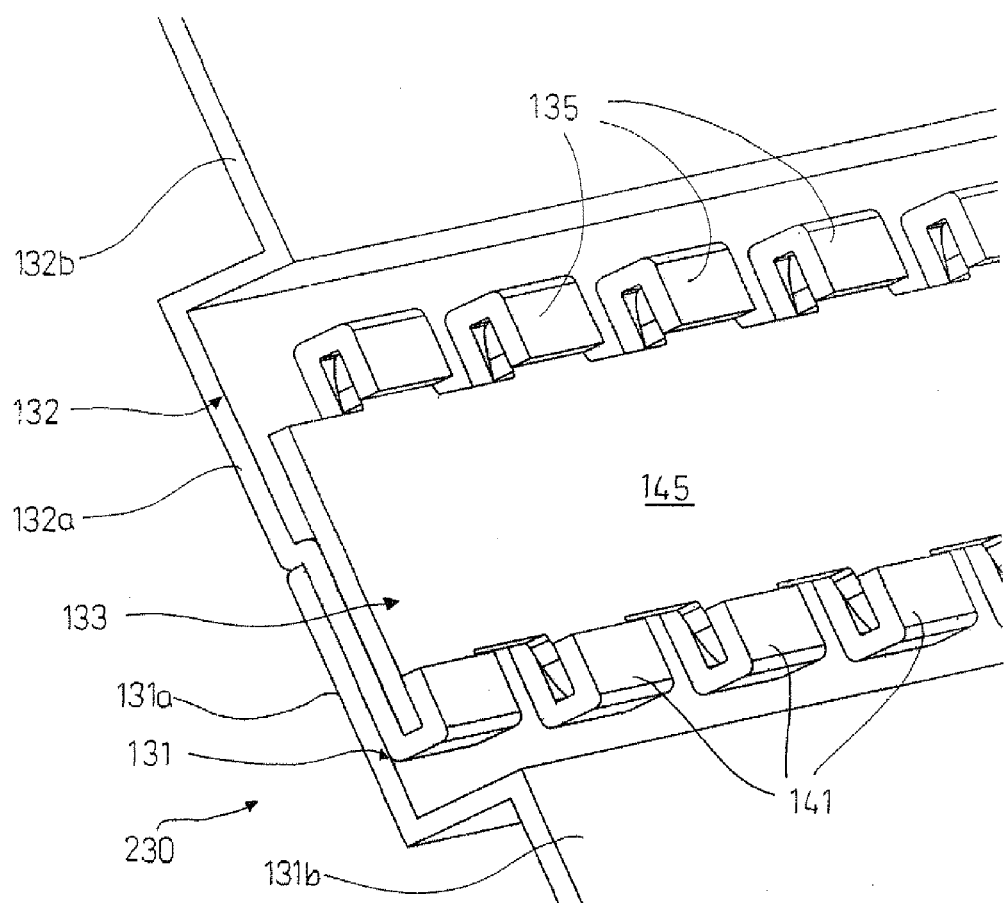
FIG. 12 is a perspective view of an assembly comprising two panel components connected together with a keyway connector (recessed flat joint), according to another embodiment of the present invention.

Referring now to FIG. 12, there is shown a panel assembly 230 like assembly 130 shown in FIG. 11, except that the joint is recessed. That is, the first and second panel components 131, 132 have joining edges 131a, 132a that are in spaced parallel planes to adjoining regions of the panels 131, 132, namely panel regions 131b and 132b. Preferably the assembly 230 is made of plastics material, although this need not be the case.

Figure 13:
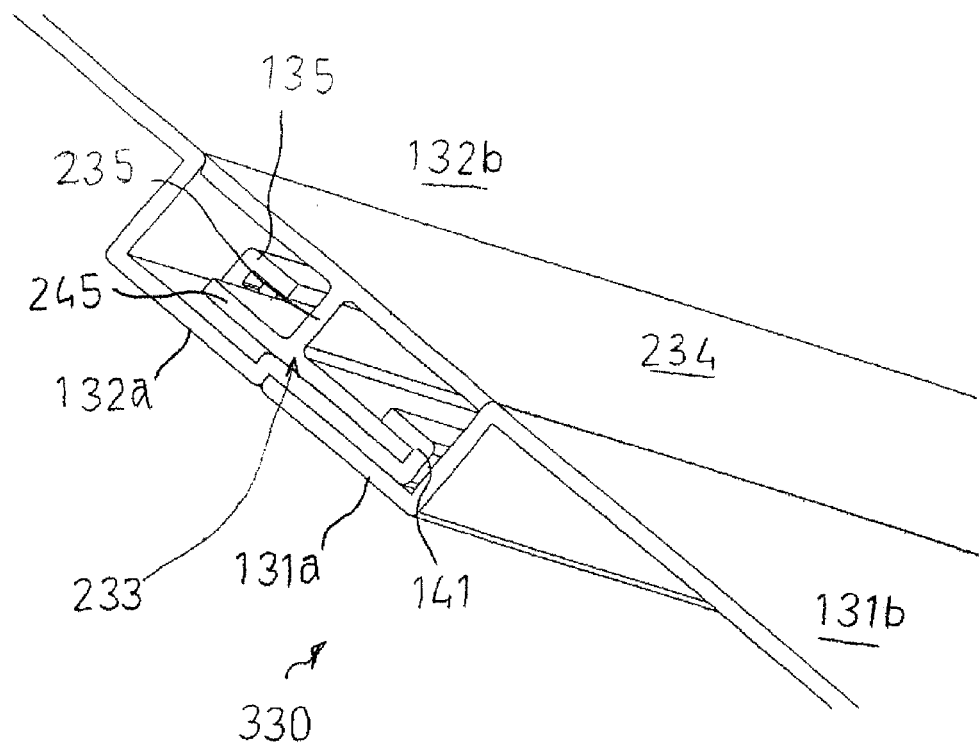
FIG. 13 is a perspective view of an assembly comprising two panel components connected together with a keyway connector (recessed flat joint providing a substantially continuous panel surface), according to another embodiment of the present invention.
Figure 14:
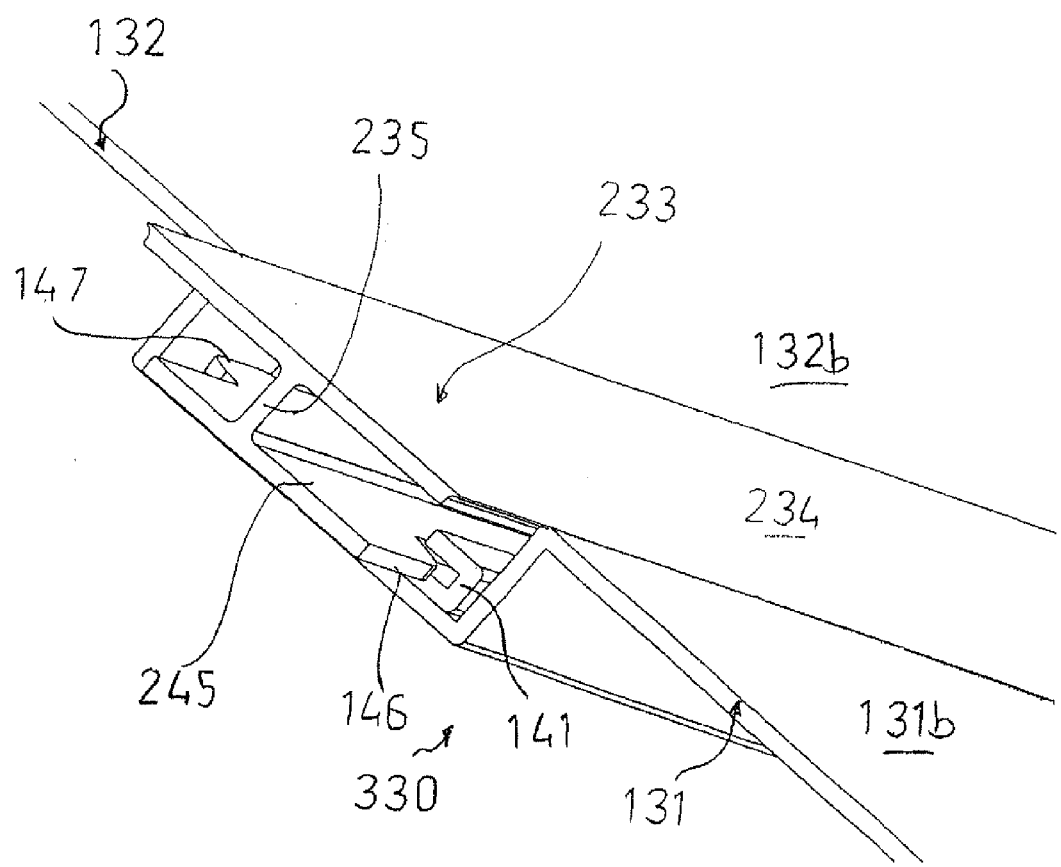
FIG. 14 is the same as FIG. 13, except in an unlocked configuration

Referring now to FIGS. 13 and 14, there is shown a panel assembly 330 like assembly 230 shown in FIG. 12, except that the keyway connector 233 is shaped to provide a continuous smooth surface with panel regions 131b and 132b. Preferably the assembly 330 is made of plastics material, although this need not be the case.

The keyway connector 233 has a longitudinal body 245, like body 145 shown in FIG. 12. The keyway connector 233 also has a longitudinal strip 234 and an interconnecting wall 235. Longitudinal strip 234 extends parallel with body 245 and in the same plane as panel regions 131b and 132b, so as to provide a continuous smooth surface. Interconnecting wall 235 extends perpendicularly from body 245 to strip 234.

FIG. 13 shows the assembly 330 locked together whereas FIG. 14 shows the keyway connector 233 in a position whereby its keys 146, 147 do not engage the keyways 135, 141 and the keyway connector 233 may be readily released from the panels 131, 132.

This type of joint is useful for cosmetic facing panels in aircraft cabins, car interior panels or building walls, or formwork or cladding, for example. The recessed joint can also be used to create stiffening elements when joining two panels, such as structural pillars in cars or chassis boxing, or in panel construction methods.

Figure 15:
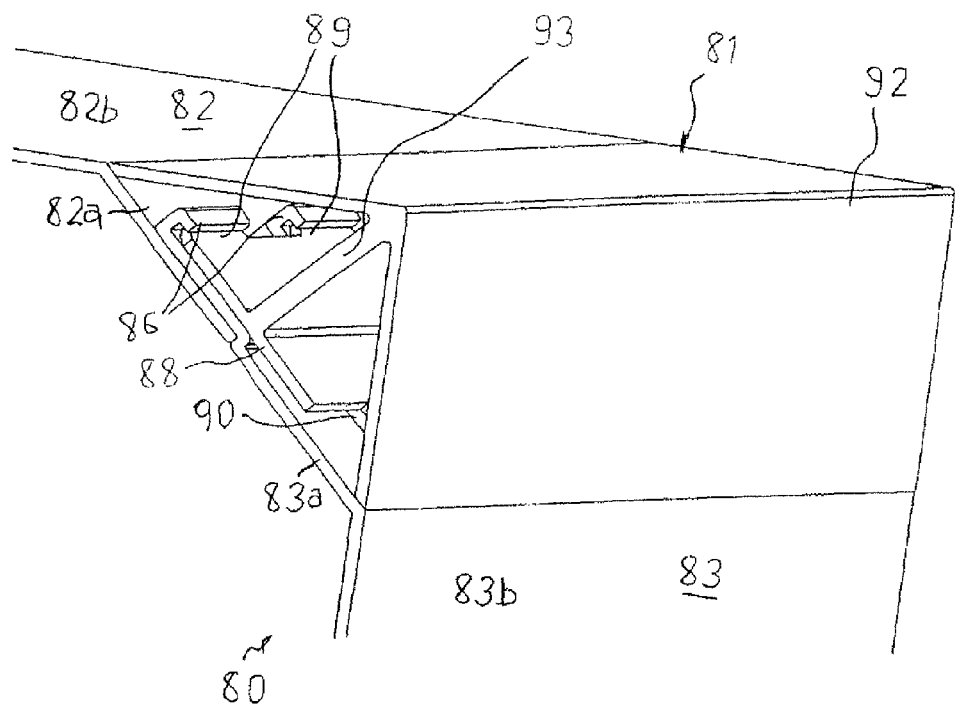
FIG. 15 is a perspective view of an assembly comprising two panel components connected together with a keyway connector (corner joint), according to another embodiment of the present invention.
Figure 16:
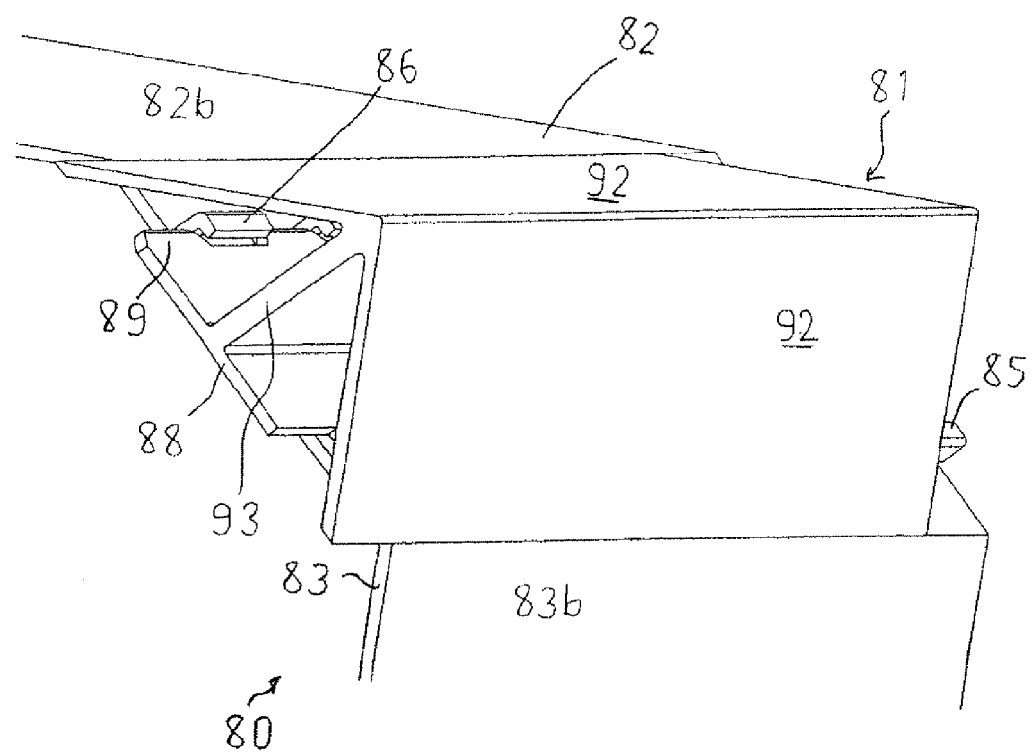
FIG. 16 is the same as FIG. 15, except in an unlocked configuration.

Referring now to FIGS. 15 and 16, there is shown a panel assembly 80 like assembly 330 shown in FIG. 14, except that the keyway connector 81 is shaped as a corner piece that provides a continuous surface with diverging first and second panel components 82, 83. Preferably the assembly 80 is made of plastics material, although this need not be the case.

The first and second panels 82, 83 each have a joining edge 82a, 83a that extend in the same plane when joined together. The first and second panels 82, 83 each has a region 82b, 83b and these extend away from one another.

The keyway connector 81 has a longitudinal body 88, an L-shaped wall 92 and an interconnecting wall 93. Keys 89 extend from one side of the body 88 and keys 90 extend from an opposite side of the body 88. The L-shaped wall 92 has diverging halves that are able to provide continuous surfaces with panel regions 82b and 83b. The interconnecting wall 93 extends perpendicularly from the body 88 to L-shaped wall 92.

The key/keyway arrangement of assembly 80 is essentially the same as shown in FIG. 14. However, in brief, a keyway arrangement extends along the joining edge 82a of the first panel 82 and comprises a plurality of regularly spaced keyways 85. Likewise, a keyway arrangement extends along the joining edge 83a of the second panel 83 and comprises a plurality of regularly spaced keyways 86.

The keyway connector 81 can be inserted laterally and slide longitudinally within a continuous keyway passage provided by the keyways 85, 86. Once the keyway connector 81 extends within the passage, it can be slid relative to the keyways 85, 86 until the keys 89, 90 engage their respective keyways 85, 86 and are retained by the keyways 85, 86 so as to lock the panels 82, 83 together (as shown in FIG. 15). To disconnect panel 82 from panel 83, the keyway connector 81 is slid within the passage until the keys 89, 90 no longer engage their respective keyways 85, 86 (as shown in FIG. 16).

Figure 17:
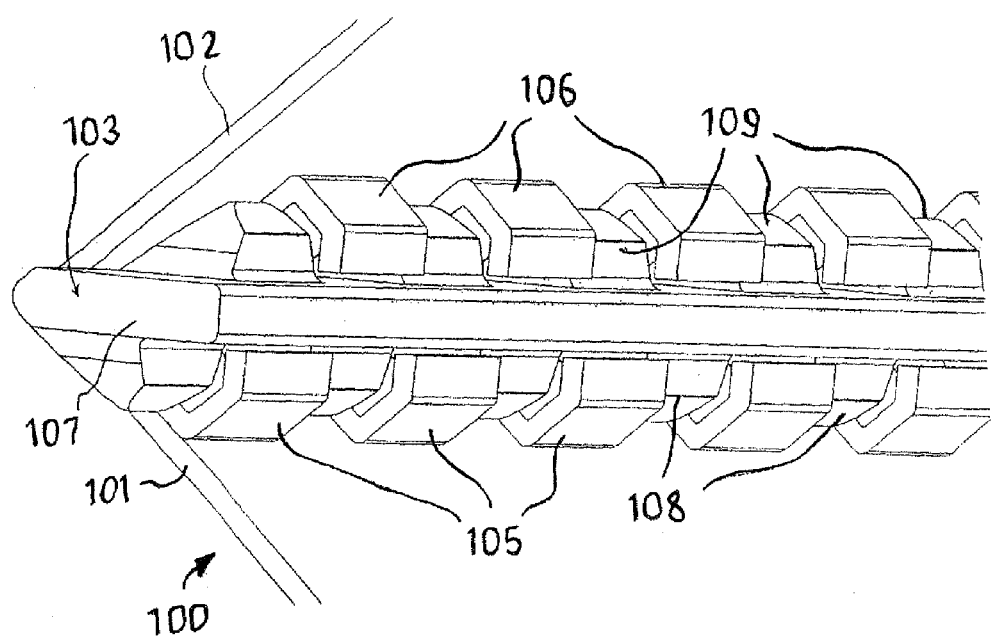
FIG. 17 is a perspective view of an assembly comprising two panel components in the process of being connected together (corner joint), according to another embodiment of the present invention.

Referring now to FIG. 17, there is shown a panel assembly 100 comprising a first panel component 101, a second panel component 102 and a keyway connector 103. A keyway arrangement extends along a joining edge of the first panel 101 and comprises a plurality of regularly spaced keyways 106. A keyway arrangement also extends along a joining edge of the second panel 102 and comprises a plurality of regularly spaced keyways 105. Preferably the assembly 100 is made of plastics material, although this need not be the case.

The keyway connector 103 comprises a longitudinal body 107, keys 108 extending from one side of the body 107 and keys 109 extending from an opposite side of the body 107.

Keys 108 extend in a common plane and are regularly spaced from one another. The spacing of keys 108 matches the spacing of keyways 105. Keys 109 also extend in a common plane and are regularly spaced from one another. The spacing of keys 109 matches the spacing of keyways 106. Keys 108 and 109 are off-set relative to one another along a length of the body 103 in the same manner as keyways 105 and 106 when intermeshed.

Each keyway 105, 106 is in the form of a hook, as described for other embodiments. The keyways 105, 106 can intermesh with one another such that each keyway 105 is straddled by two keyways 106 of the other component. Keyways 105 and 106 intermesh to provide a continuous keyway passage extending longitudinally between the intermeshed keyways 105, 106.

The keyway connector 103 can be inserted laterally and slide longitudinally within the continuous keyway passage. Once the keyway connector 103 extends within the passage, it can be slid relative to the keyways 105, 106 until the keys 108, 109 engage the keyways 105, 106 and are retained by the keyways 105, 106 so as to lock the panels 101, 102 together to form a tight corner joint. To disconnect panel 101 from panel 102, the keyway connector 103 is slid within the passage until the keys 108, 109 no longer engage the keyways 105, 106, as shown in FIG. 17.

Figure 18:
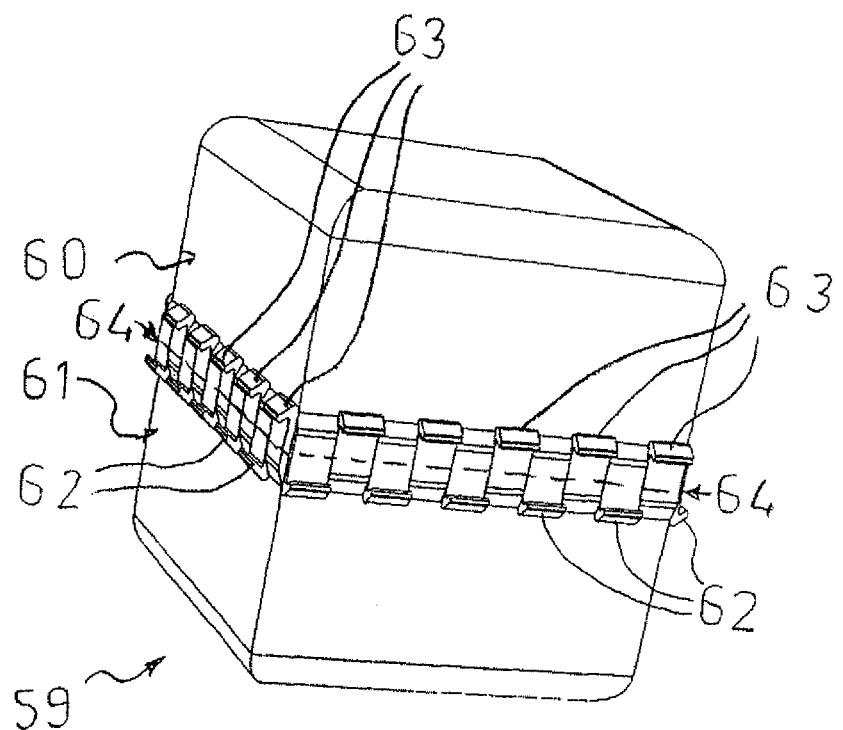
FIG. 18 is a perspective view of a container assembly comprising two cuboid container halves ready to be connected together (flat joint), according to another embodiment of the present invention.

Referring now to FIG. 18, there is shown upper 60 and lower 61 cuboid halves of a container assembly 59, preferably made of plastics material. Four linear keyway connectors of the assembly 59 have not been illustrated.

A keyway arrangement extends along a lower joining edge of the upper half 60 and comprises a plurality of regularly spaced keyways 62 (only some of which have been labeled). A keyway arrangement also extends along an upper joining edge of the lower half 61 and comprises a plurality of regularly spaced keyways 63 (only some of which have been labeled).

Figure 7:
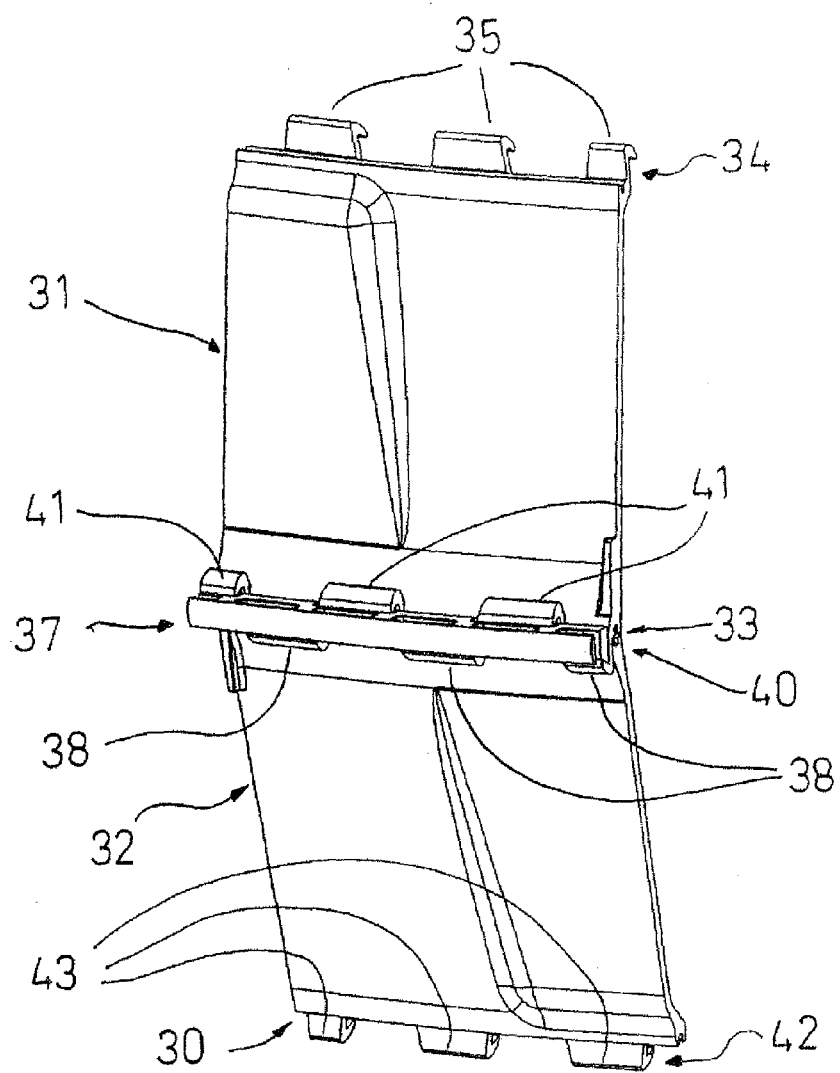
FIG. 7 is a front perspective view of an assembly comprising two panel components connected together with a keyway connector, according to another embodiment of the present invention (curved joint)
Figure 8:
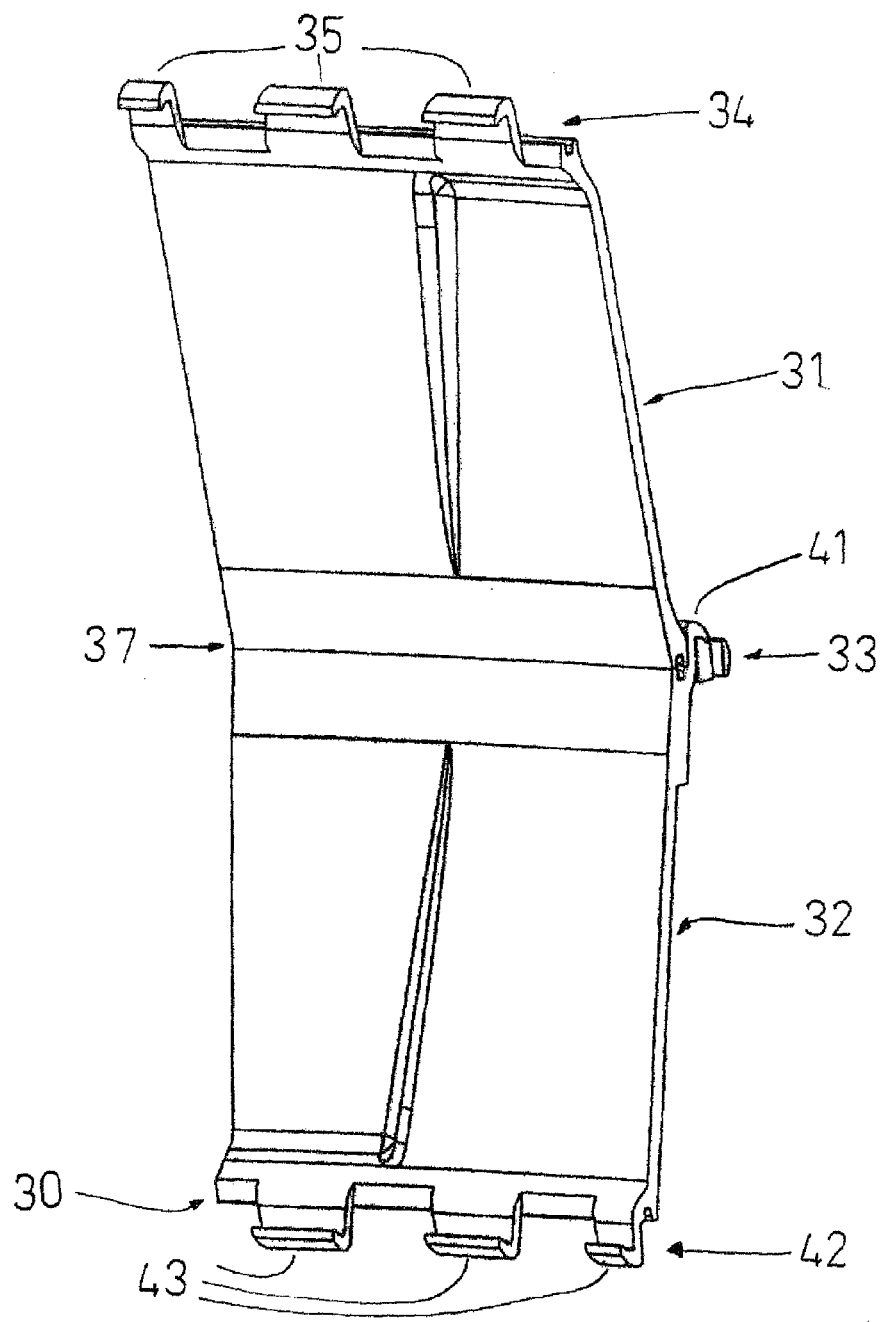
FIG. 8 is a rear perspective view of the connected panel components shown in FIG. 7.

Each keyway connector comprises a longitudinal body, keys extending from one side of the body, keys extending from an opposite side of the body, and a handle generally extending from the body between the keys—much like the keyway connector shown in FIG. 7.

All of the keys extend in a common plane and are regularly spaced from one another in a castellated manner such that they match the spacing of keyways 62 and 63 when intermeshed.

Each keyway connector can be inserted laterally and slid longitudinally within a continuous keyway passage 64 when the keys are not positioned directly atop the keyways 62, 63. Once a keyway connector extends within the passage 64, it can be slid relative to the keyways 62, 63 until the keys engage and are retained by the keyways 62, 63 so as to lock the container halves 60, 61 together and to form a secure planar joint. To disconnect the container halves 60, 61 from one another, the keyway connector is slid within the passage until the keys no longer engage the keyways 62, 63.

Figure 19:
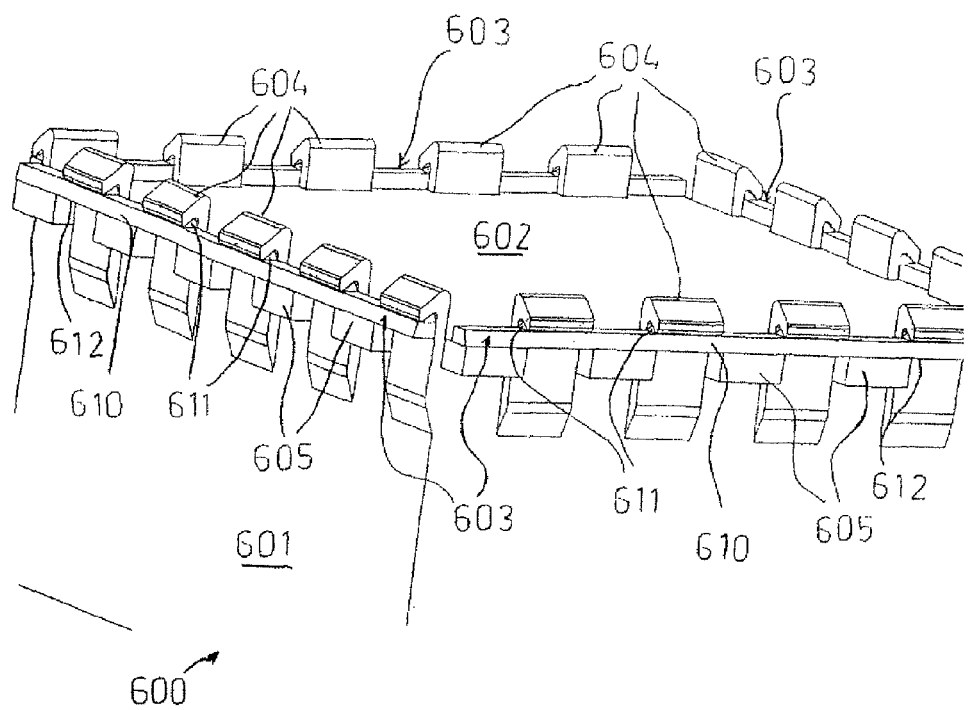
FIG. 19 is a perspective view of a container assembly comprising a container base and closure connected together with keyway connectors (flat joint), according to another embodiment of the invention.

Referring now to FIG. 19, there is shown a container assembly 600 (preferably made of plastics material) comprising a container base 601 and closure 602 connected together with four keyway connectors 603.

A keyway arrangement extends along an upper joining edge of container base 601 and comprises a plurality of regularly spaced hooked keyways 604 (only some of which have been labeled). A castellated keyway arrangement also extends along a periphery of closure 602 and comprises a plurality of regularly spaced (non-hooked) keyways 605 (only some of which have been labeled).

Each keyway connector 603 comprises a longitudinal body 610 with keys 611 extending laterally off an upper side of the body. A single key 612 extends along a lower side of each body 610. Put another way, the lower side of the body 610 serves as key 612 and interference fits with keyways 605.

Keys 611 extend in a common plane and are regularly spaced from one another in a castellated manner such that they match the spacing of keyways 604 when intermeshed.

Each keyway connector 603 can be inserted laterally and slid longitudinally within a keyway passage (as described for other embodiments). Once a keyway connector 603 extends within the passage, it can be slid relative to the keyways 604, 605 until keys 611 engage and are retained by keyways 604 so as to lock the base 601 and closure 602 together and to form a secure planar joint.

Figure 20:
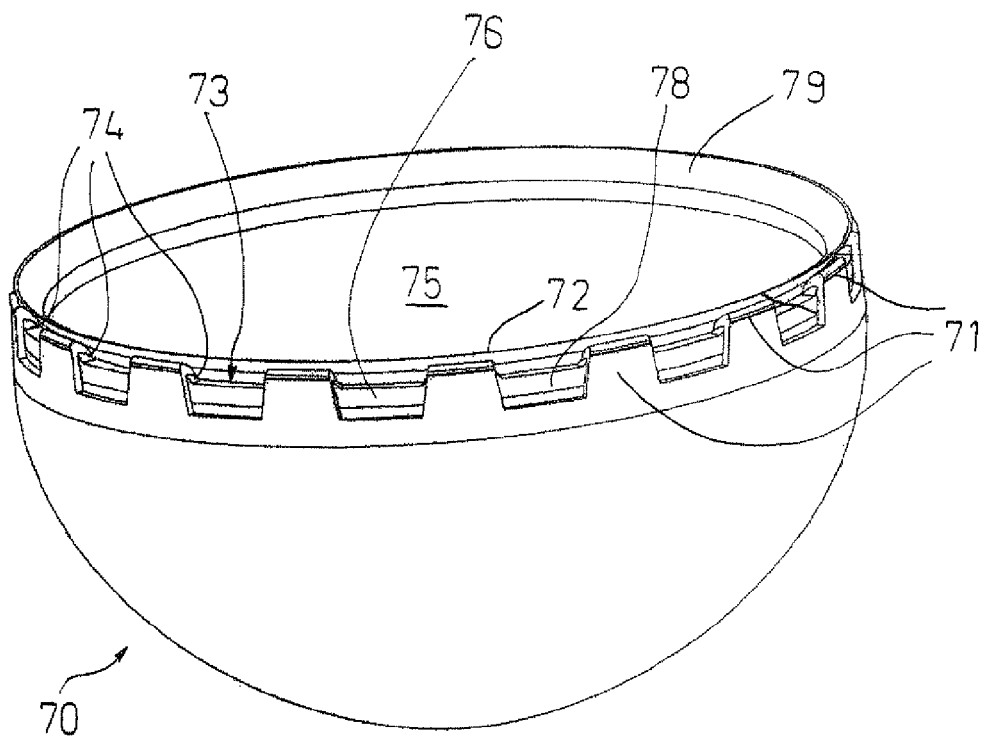
FIG. 20 is a perspective view of a hemispherical reflector housing connected to a discoid part with a keyway connector (curved joint), according to another embodiment of the present invention.

Referring now to FIG. 20, there is shown a hemispherical reflector housing 70 connected to a discoid lens component 75 with a keyway connector 73. These can be made of any suitable material or materials, such as metal or plastics material. A keyway arrangement having regularly spaced inwardly facing keyways 71 extends along an outer circumference of the housing 70. A planar surface (not labeled) of the housing 70 situated beneath the keyway connector 73 functions as another keyway.

The keyway connector comprises a split annular body 76 and an annular cosmetic flange 79 that partially covers keyways 71. The keyway connector 73 has a series of castellated keys 74 that extend from an upper side of the body 76 and engage a hook of each keyway 71. A continuous (un-castellated) key (not labeled) extends along a lower side of the body 76.

An annular keyway passage extends between keyways 71 and the keyway provided by the planar surface of the housing 70.

The discoid lens component 75, when inserted into this keyway passage, essentially forms a smaller keyway passage into which the keyway connector 73 fits. There may be one or more substantially discoid components laminated between this uncastellated keyway surface and keyway connector 73.

Because of the split in the keyway connector body 76, it can be flexed laterally under the keyway 71 hooks so that the castellated keys 74 lie between them prior to extending the keyway connector 73 longitudinally underneath the hook shaped keyways 71. This action wedges and retains a smooth edged discoid component 75 between the uncastellated surface of the housing 70 and the key/lower side of the keyway connector body 76.

Figure 21:
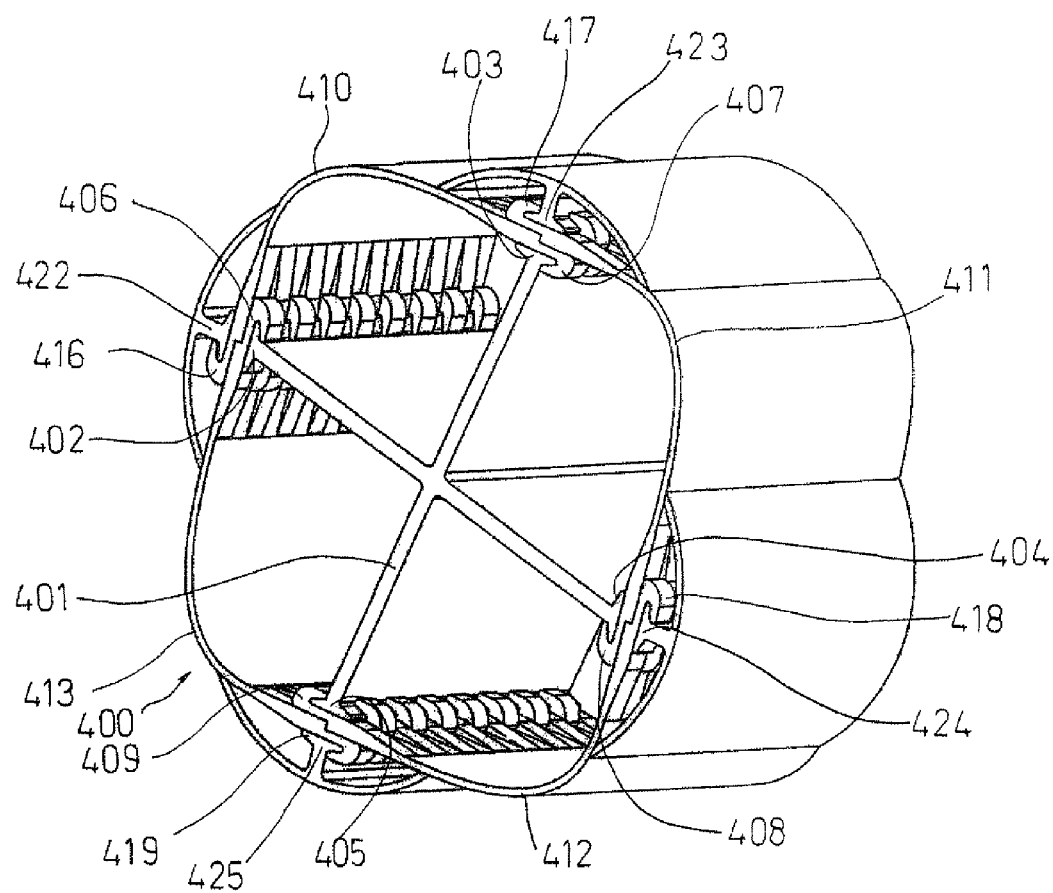
FIG. 21 is a perspective view of a complex structure assembled using the connecting mechanism of the present invention (various joints)

FIG. 21 shows that the connecting mechanism of the present invention can be used to assemble different shape components into complex structures 400 (such as an aircraft wing). These can be made of, for example, metal and/or plastics material.

A cross-shaped keyway connector 401 serves as a bracing and tie element. The keyway connector 401 has four diverging arms and keys 402, 403, 404, 405 located at an end of each arm. Keys 402, 403, 404, 405 engage four different pairs of keyway arrangements 406, 407, 408, 409, which arrangement pairs 406, 407, 408, 409 connect adjacent arcuate panels 410, 411, 412, 413 together. Additional pairs of keyway arrangements 416, 417, 418, 419 and keyway connectors 422, 423, 424, 425 provide additional joint strength as well as rounded external surfaces for aesthetic purposes.

Although not entirely clear from the figure, a single key may extend laterally off each opposing side of each arm—rather than a plurality of spaced keys extending laterally off each opposing side of each arm. That is, the keyway connectors shown in FIG. 21 need not have castellated keys, but can rather can have a leading edge that allows the key to be inserted from one side.

Figure 22:
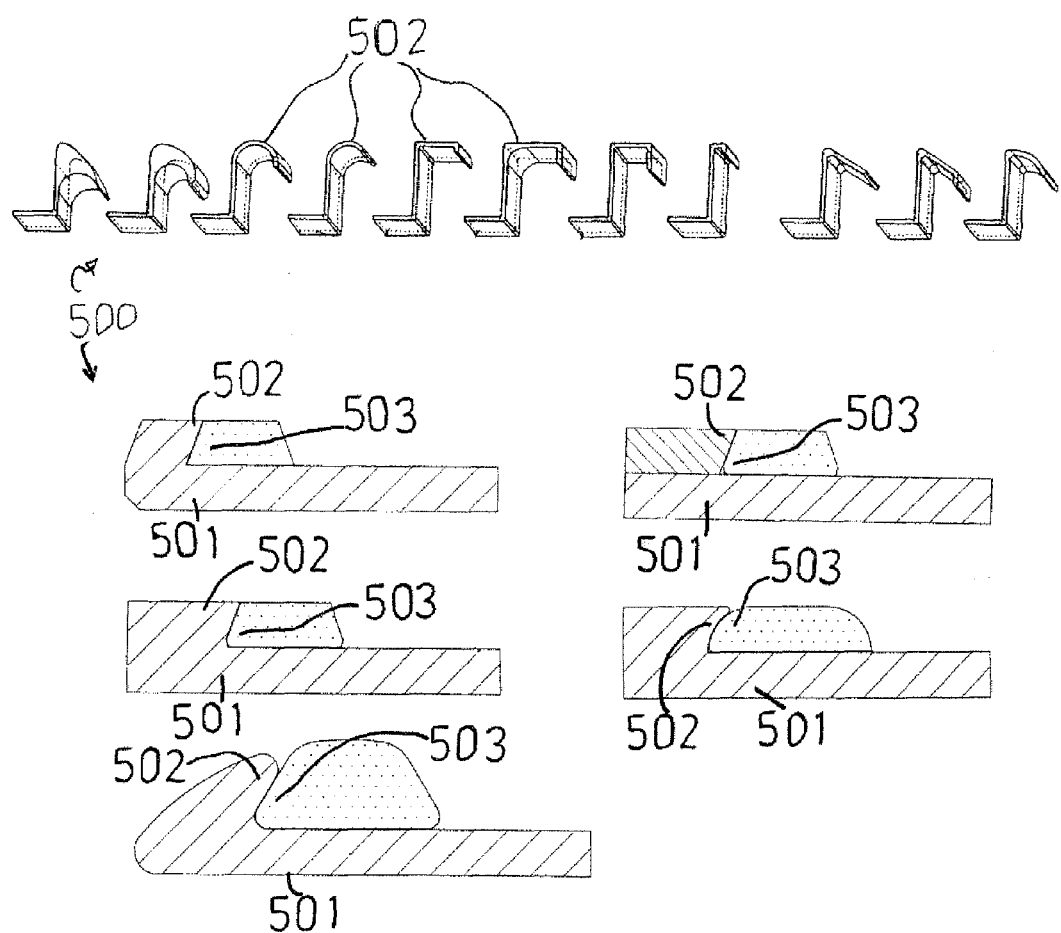
FIG. 22 shows different shaped keys and keyways (including perspective views and cross sections), according to other embodiments of the present invention.
Figure 23:
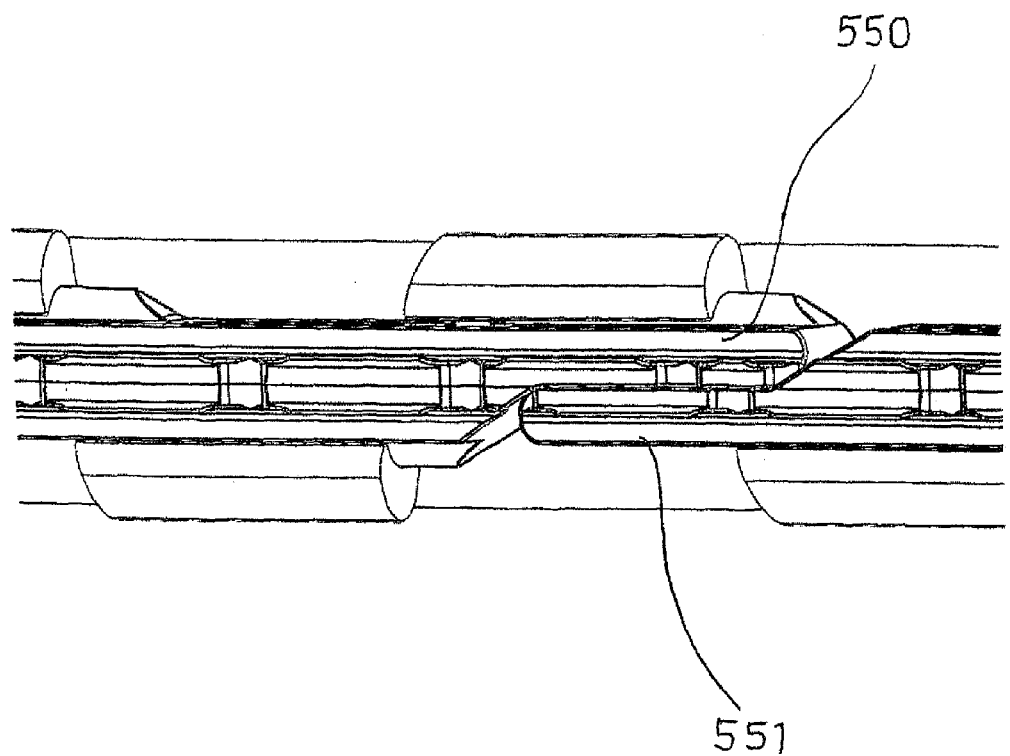
FIG. 23 is a perspective view of one or more keyway connectors extending within a continuous keyway passage.

Referring now to FIG. 22, there is shown some of the differently shaped keyways 500 according to the present invention. Each keyway 500 is in the form of a hook having a connector-support portion 501 and a key-retaining portion 502 (only some of which have been labeled). Depending on the intended application, each key-retaining portion 502 may be arcuate and/or angular, provided that it can extend part way around a key 503 of a keyway connector, Referring now to FIG. 23, there is shown two ends 550, 551 of an annular keyway connector interference fitting together, or two ends 550, 551 of adjacent keyway connectors interference fitting together. Multiple short keyway connectors interference fitting together could be used for large components having a long keyway passage, that could otherwise be difficult to join together using a single keyway connector.

Figure 24:
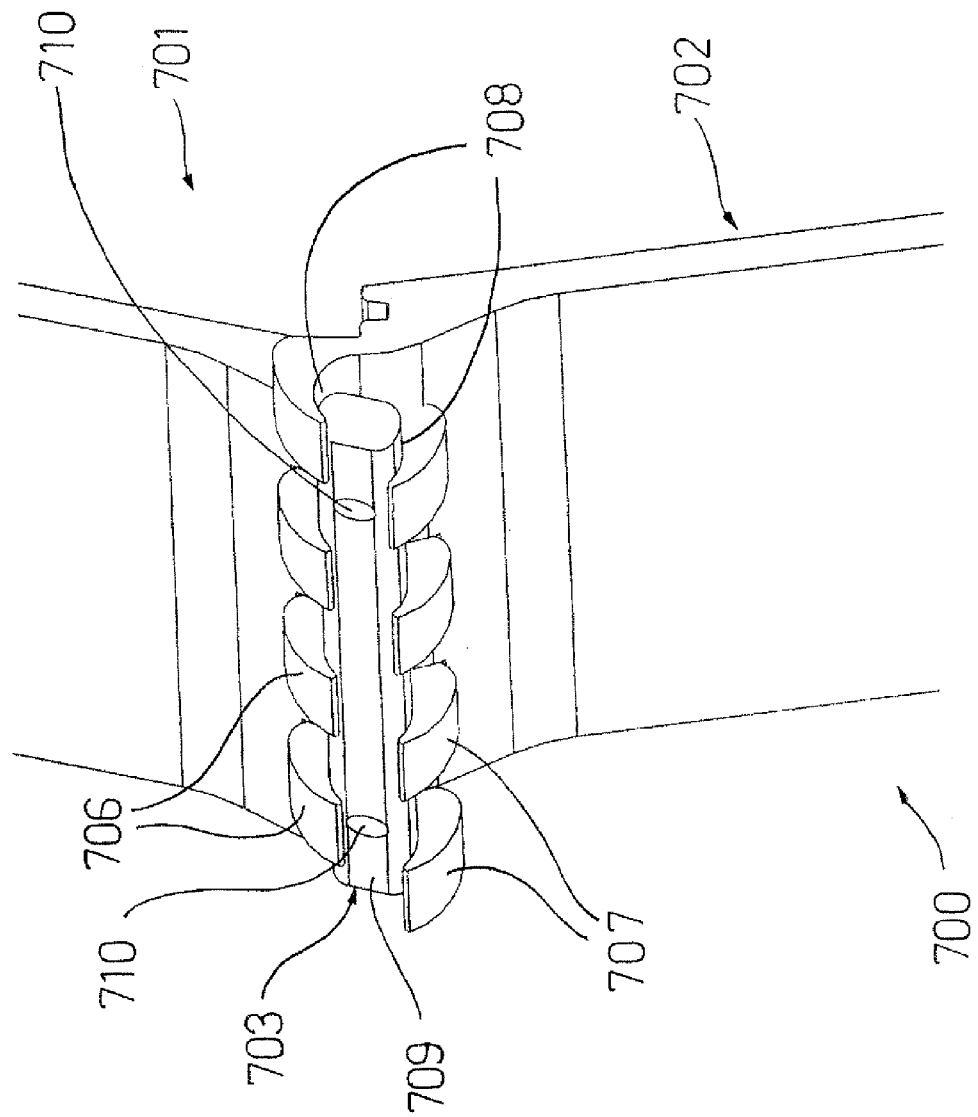
FIG. 24 is a front perspective view of an assembly comprising two panel components connected together with a keyway connector, according to another embodiment of the present invention.

Referring now to FIG. 24, there is shown a panel assembly 700 comprising an upper panel component 701, a lower panel component 702 and a keyway connector 703 (preferably made of plastics material). A keyway arrangement extends along a lower edge of the upper panel 701 and comprises a plurality of regularly spaced hooked keyways 706. A keyway arrangement also extends along an upper edge of the upper panel 702 and comprises a plurality of regularly spaced hooked keyways 707. The keyways 706, 707 intermesh and provide a keyway passage as previously described in respect of FIGS. 7 to 10.

The keyway connector 703 comprises an elongate body 709 having a cross-sectional shape of a rounded oblong (ovoid). Opposing arcuate sides of the body function as keys 708 that can engage and be retained by the keyways 706, 707. The body 709 has openings 710 for tools for rotating the connector 703 relative to its longitudinal axis through a 90 degree rotation, between locking (as seen in FIG. 24) and unlocking positions. The connector 703 functions as a cam lock.

The keyway connector 703 can be inserted laterally and slide longitudinally within the keyway passage when in the unlocked position. Once the keyway connector 703 extends within the passage, it can be rotated through an angle of about 90 degrees to the locking position, in which position the keys 708 forcefully engage the keyways 706, 707 and lock the panels 701, 702 together.

Figure 25:
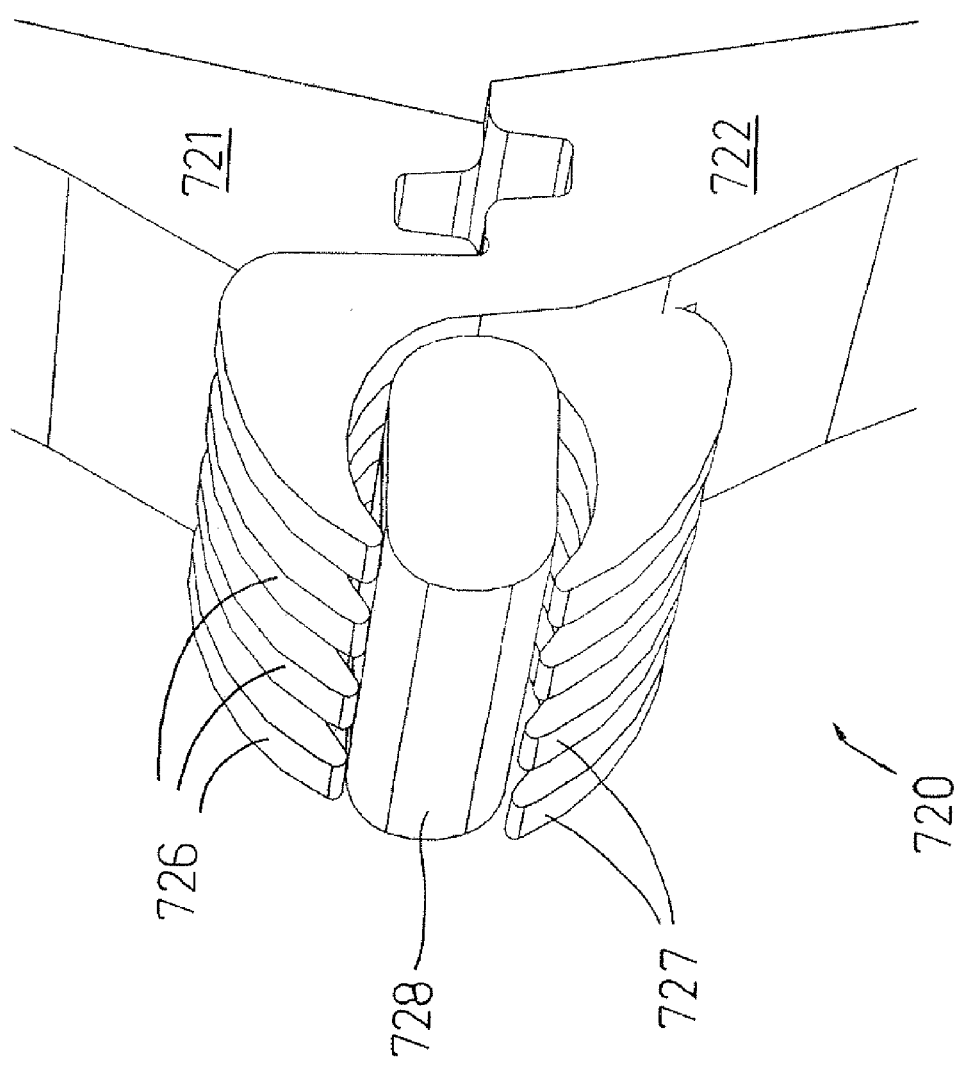
FIG. 25 is a perspective view of an assembly comprising two panel components connected together with a keyway connector, according to another embodiment of the present invention.

Referring now to FIG. 25, there is shown a panel assembly 720 much like assembly 700. The major differences are that the panel components 721, 722 are slightly different and keyways 726, 727 are of smaller width and spacing relative to one another. Also, tools openings are not shown for keyway connector 728 of the assembly 720. The keyway connector 728 is shown in an unlocked position.

Figure 26:
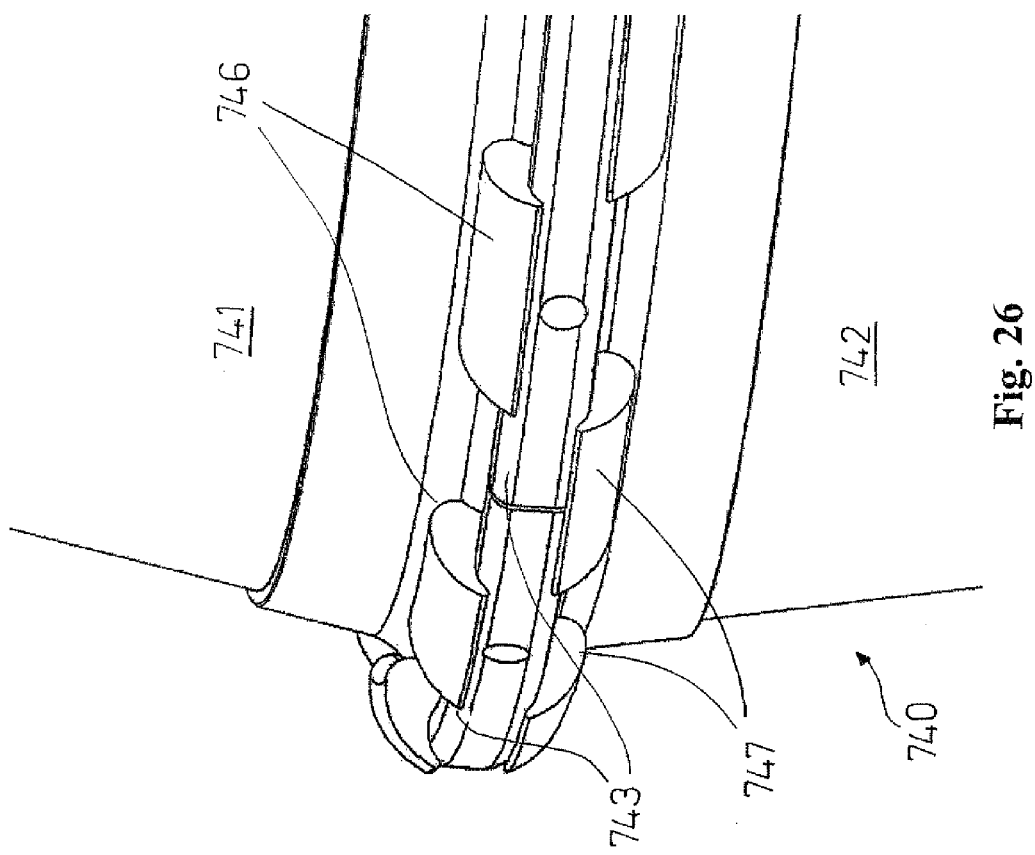
FIG. 26 is a perspective view of an assembly comprising two arcuate components connected together with keyway connectors, according to another embodiment of the present invention.

Referring now to FIG. 26, there is shown an assembly 740 comprising upper 741 and lower 742 arcuate components connected together with keyway connectors 743. Again, assembly 740 is much like assembly 700. The major differences are that the components 741, 742 and the keyway connector 743 are arcuate, and keyways 746, 747 are of greater width and spacing relative to one another.

Since the joint is of an arcuate nature, more than one keyway connector 743 (or a multi-piece connector) is used. As for assembly 700, each connector 743 can be inserted laterally and slide longitudinally within a keyway passage when in an unlocked position. Once the keyway connector 743 extends within the passage, it can be rotated through an angle of about 90 degrees to a locking position, in which position keys of the connector 743 forcefully engage the keyways 743, 744 and lock the components 741, 742 together.

Referring now to FIGS. 27 to 30, there is shown an assembly 740 comprising two components 741, 742 and a keyway connector 743 (preferably made of plastics material). Component 741 has an arcuate pocket 745 having a linear array of slits 744. The pocket 745 also has a keyway arrangement whereby keyways 747 of the arrangement are provided by non-slitted regions of the pocket 745. The keyways 747 extend transversely of the pocket 745. This can be best seen in FIG. 30.

An edge of component 742 also has a keyway arrangement consisting of four hooked keyways 750. The keyways 750 may be extended into the pocket 745 by way of the slits 744.

The keyway connector 743 is essentially the same as connector 709 of FIG. 24. Opposing arcuate sides of a body of the connector 743 function as keys that can engage and be retained by the keyways 747. The body also has handles or openings for tools to act as handles for rotating the connector 743 relative to its longitudinal axis through a 90 degree rotation, between locking and unlocking positions. The connector 743 functions as a cam to lever the keyways apart and lock the joint.

Figure 27:
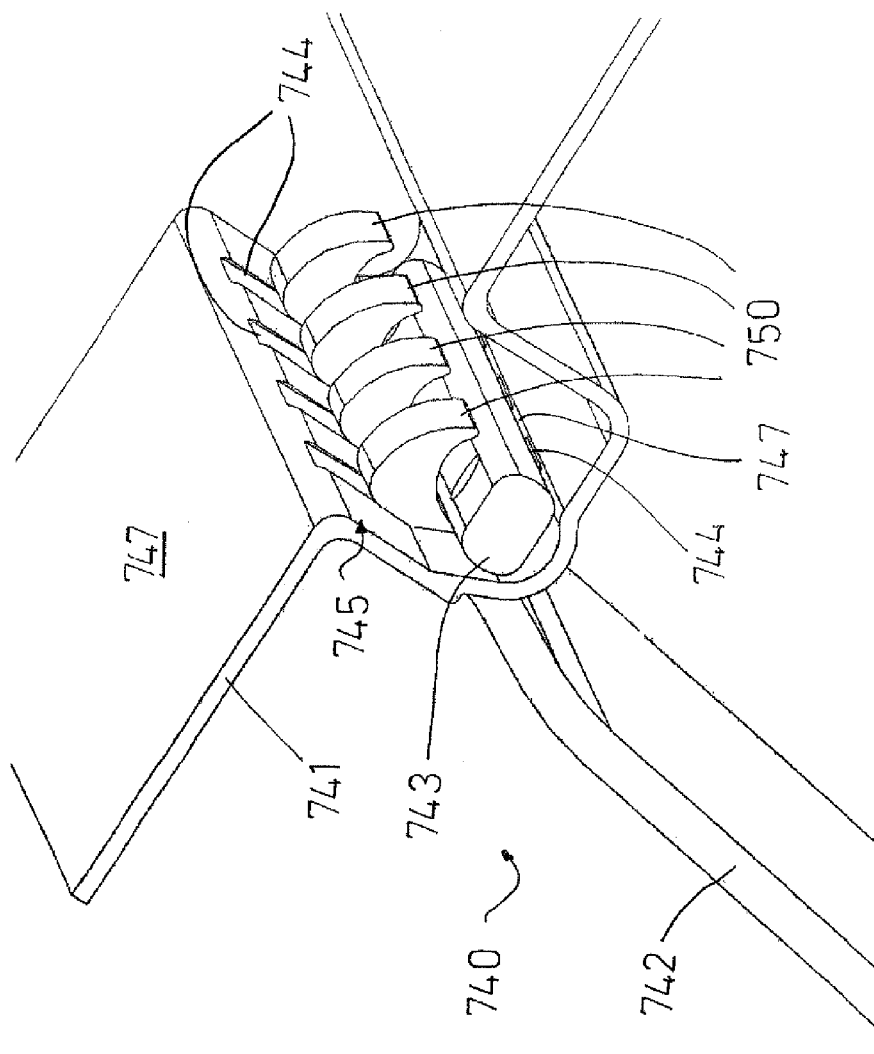
FIG. 27 is a perspective view of an assembly comprising two components in the process of being connected together with a keyway connector, according to another embodiment of the present invention.
Figure 28:
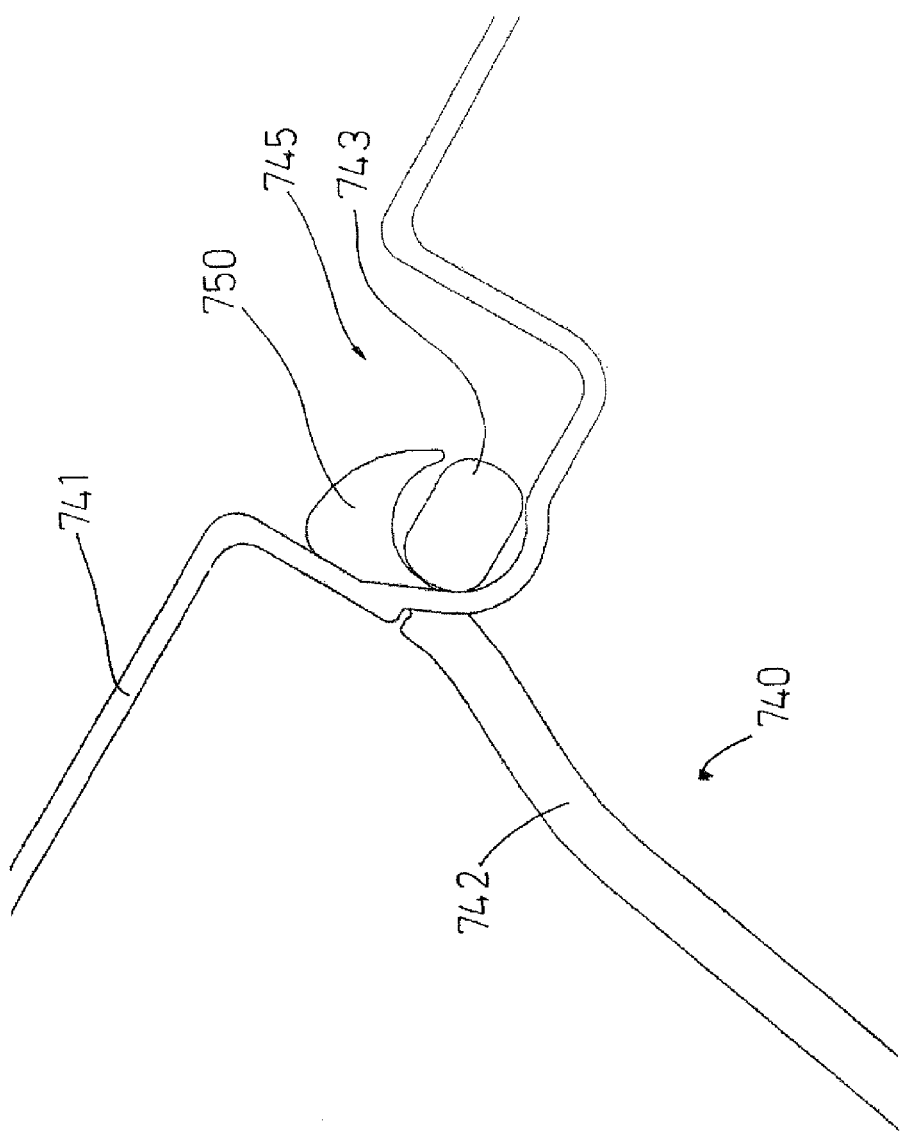
FIG. 28 is a side elevation view of that shown in FIG. 27.
Figure 29:
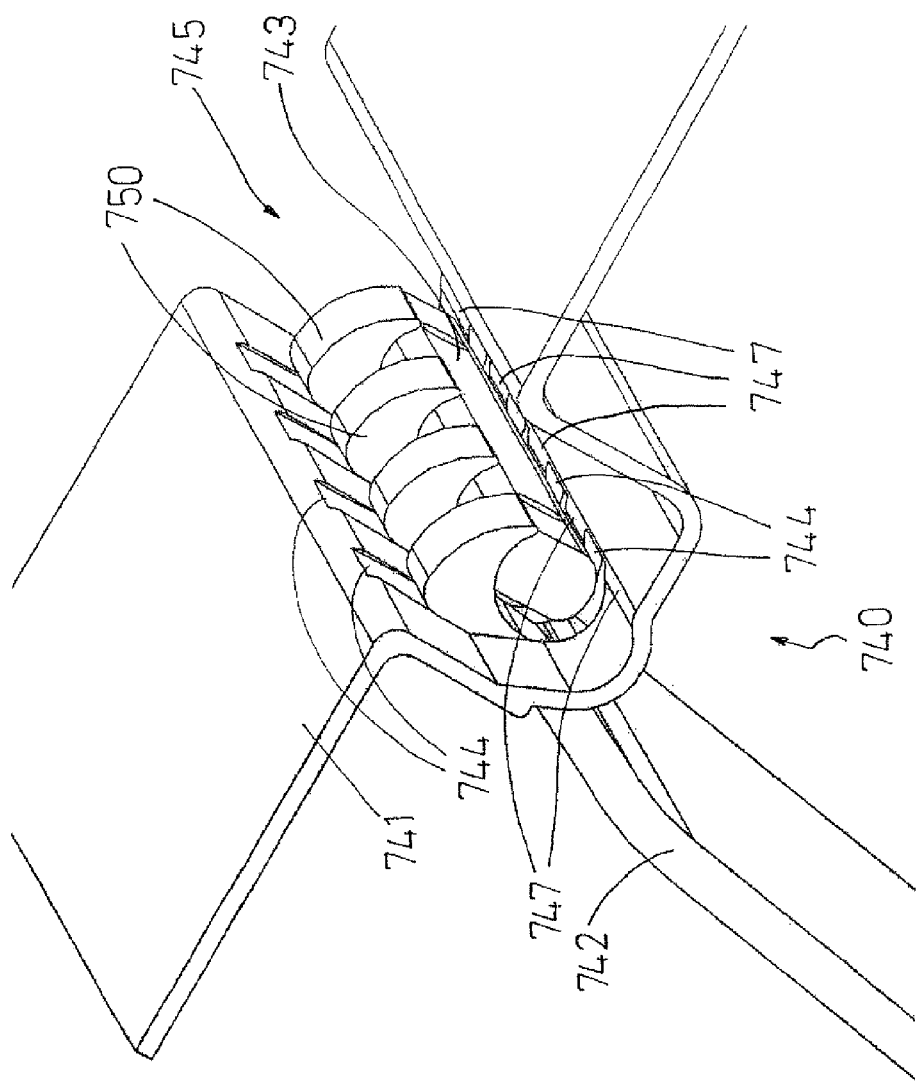
FIG. 29 is a perspective view of that shown in FIG. 27 except that the two components have been connected together with the keyway connector (wing brace joint)
Figure 30:
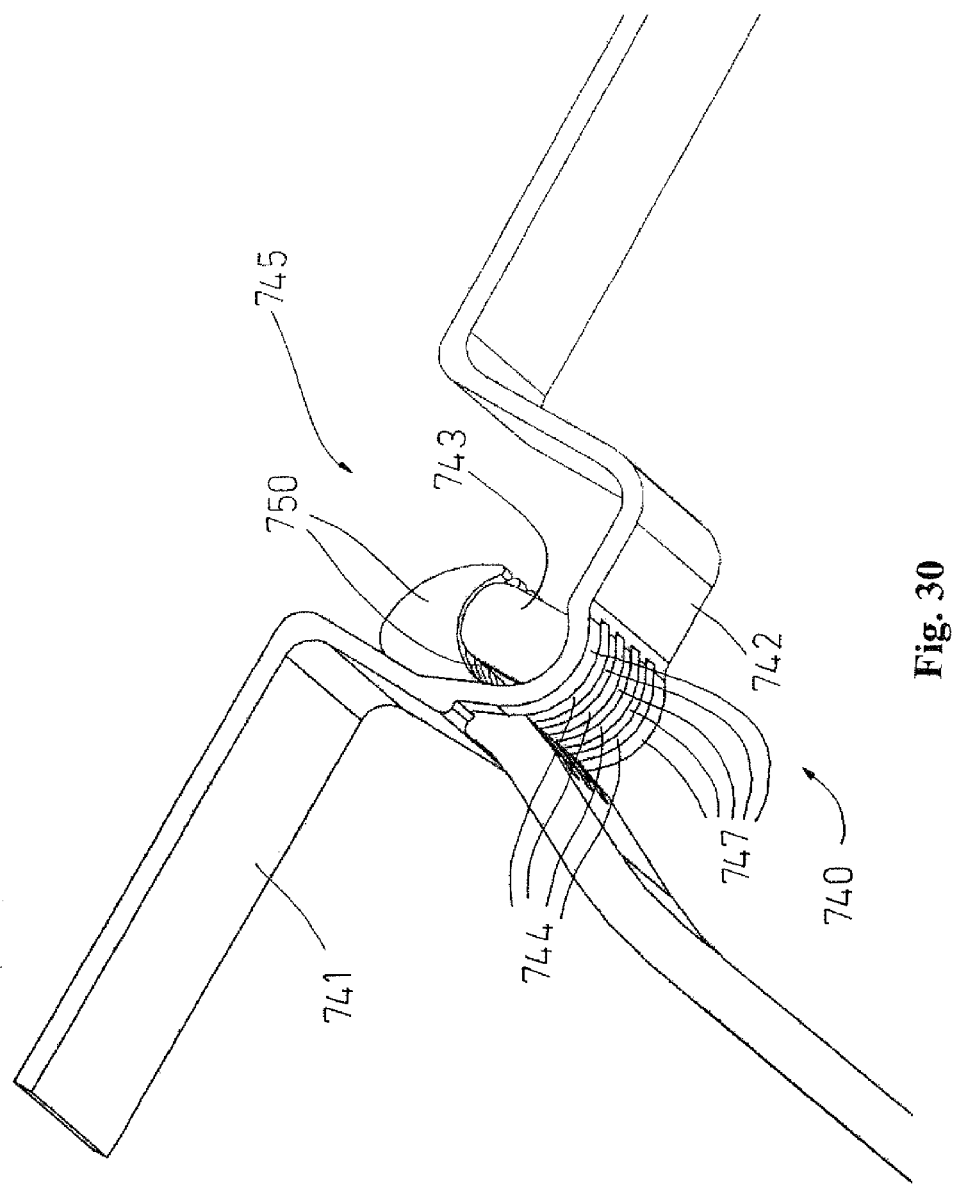
FIG. 30 is another perspective view of that shown in FIG. 29.

The keyway connector 743 can be inserted laterally and slide longitudinally within the keyway passage when in the unlocked position. Once the keyway connector 743 extends within the passage, it can be rotated through an angle of about 90 degrees to the locking position, in which position the keys forcefully engage the keyways 744, 750 and lock the components 741, 742 together. FIGS. 29 and 30 show the connector 743 in the locked position (wing brace joint) whereas FIGS. 27 and 28 show the connector 743 in the unlocked position. In the locked position, the keyways 750 bear against a non-slitted region of the pocket 745, as seen in FIG. 30.

The connecting method as exemplified above (except as shown in the FIGS. 19, 20 and 21) involves creating a series of intermeshing (castellated) keyways along a jointing face and extending below the joint plane on each component. The keyways are shaped to retain keys of a keyway connector. The connector can be made of one or several curved or straight profiles made to match the profiles of the joint face, and has complementary keys which allow it to be inserted between opposing keyways in such a way that by moving the connector parallel to the joint face the assembly can be positively locked into position, with the keyways shaped to retain the keys in position when the joint is placed. The keyway connector bends to take the loads imposed by the components on the joint. This spring tensioning force is an important part of the connecting mechanism and distinguishes it markedly from a typical hinge, which it superficially resembles. (The hinge pin experiences a shear force at the junctions of the hinge castellations, rather than a flexural force.)

The present connecting method overcomes several component joining problems especially (although not exclusively) for larger plastic components and also has application for smaller components especially where a sealed internal cavity is required. With this connecting method it is much cheaper and faster to produce injection moulding and pressing methods can in many circumstances be substituted for more expensive and limiting rotational moulding, welding, bolting and threading.

The present invention delivers a strong and, if necessary, gas tight joint that is more robust to shock loads. It is much faster to make than traditional joining methods and the flexible, but strong, holding technique allows successful joints to be made even where the parts are made of traditionally incompatible, brittle or innovative composite materials.

The connecting mechanism is straight forward to produce using existing mass production techniques, such as injection moulding, forging, pressing, casting, fabricating, moulding, extrusion, roll forming, punching and laser cutting.

The present connecting method has the advantage of providing a strong positive joint and being able to be moulded, wrought or extruded more cheaply than for other joins in a wide variety of applications ranging from aviation industry, construction through to buildings and consumer products.

Further uses and advantages of the present invention are described below.

The Present Connecting Method Supports Complex Joint Faces and Planes

Unlike a traditional helical thread the present connecting method can be made to conform to complex shapes involving straight edges and convex and concave multi-radius organic curves, and can even be made to seal non-planar joints and non-contiguous joint lines which in the past could only be joined by bolted flanges or welding. Vehicles, especially cars and planes, are good examples of products which have many such joins and because of the limitations of welded, bolted, screwed and riveted joins they are expensive to mass produce and especially to repair after structural damage. It also means that they can not be easily made of more light weight flexible materials like injection moulded plastics or plastic/fibre composites or pressed or cast carbon fibre composites without much greater expense. Joint planes are often a weak point in large designs because they provide an opportunity for shear stresses along a flat plane. Threaded joints have the disadvantage that they can either over tighten or unscrew when deployed on a driven shaft and grub screws and conventional keyways damage or interfere with thread seals and can shear off under load. The present connecting method allows components to be designed for high torque joints that substitute much more robust compressive forces for shear forces through the use of serrated, castellated, sinuous or even randomly juxtapositioned joint "planes".

The Present Connecting Method Allows for Multi-component and Multi-material Interlocking Joins Multi-component interfaces can also be constructed using the present connecting method that would be virtually impossible to mould because of undercuts and parting plane complexity. Joints can be constructed using one material or completely dissimilar materials. For example, one joint component in a multi-component assembly could be made of ceramics, one of metal and one of plastic, and the keyway connector could be made of yet another material to achieve different structural outcomes for each joint.

The Present Connecting Method Allows for Tailored Joint Rigidity

In some cases a very rigid inflexible joint may be required, so the components could be made of very high tensile materials and more keyway and keyway connector interference could be designed so that the joint is prestressed when locked up to compensate for the forces expected when the joint is under stress. In other cases a flexible joint that can withstand and flex under shock loads is required so a tough but elastic material would be chosen for the keyway connector or components.

The Present Connecting Method Allows for a Join Without Reorienting the Key Components Many dissimilar non-weldable materials are joined in electrical and automotive assemblies. Insulating plastics and metals are a good example. The components can often not be screwed together because connecting wires will tangle short circuit or break if rotated so the components are either over-moulded or crimped together making them disposable items, even though they could easily be repaired were it not for the difficulty of opening and resealing the joints. The keyway connector joint would be a much better way to provide a positive non-screwed joint where the keyway connector moves but the components remain in the correct relationship to each other.

The Present Connecting Method Promotes Higher Levels of Reuse

Another application for the present connecting method is for reusable plastic pails. The seals between the lid and buckets, once broken, are not suitable for storing hazardous or messy materials. They also have a limited life span as the plastic relaxes over time and can leak air in, which could react with the contents, or the contents could leak out. Making the existing bucket type clip seal more rigid by thickening the profile or increasing the interference is not always an option as, if it becomes too stiff, the lid can not be removed manually and levers may permanently damage the clip or seal. This in practice limits the size of the clip seal too, as a larger diameter clip seal will be too hard to unclip. The keyway connector is a much more positive seal and can be reused many times, thus reducing materials consumption. It also enables a replaceable spout or funnel to be quickly connected to the rim of the container so that the contents can be decanted to another container more safely and cleanly.

The Present Connecting Method Allows for Bigger Seals

Because joints utilising the keyway connector can be clamped up incrementally, it is possible to quickly make huge sealed joints that would be otherwise impossible to make other than by welding them. On very large tanks, for example, plastics are seldom used despite their superior corrosion resistance to metals because they have to be fabricated in situ. The present connecting method will allow large tanks to be economically constructed using prefabricated panels that can be transported in compact stacks and assembled quickly on site as it doesn't require expensive and noisy generators or heavy batteries as hot wire, butt or hot air seam welding does.

The Present Connecting Method Provides Structural Bracing

On large diameter water tanks the internal force of water will tend to open up joints and stretch the wall material. Because the keyway can be designed to wedge parts together in two directions so that the keyway connector itself can be wedged into high friction contact with the parts, so the keyway connector can be made to act like a continuous lateral rib providing enormous hoop strength and stiffness to a structure and can even be used to create a box girder construction to increase stiffness without greatly increasing cost or wall thickness. This is particularly important where the box beam constructed is to be used as sacrificial or reusable formwork for long spans in building and construction applications such as, for example, bridge beams, structural girders, light or power poles, elevated water header towers, multi-story building shells and suspended flooring.

Long curvilinear beams in particular can be constructed in situ using lightweight plastic formwork that can even be hollow to save materials and then have reinforced concrete pumped into it in a continuous operation. In corrosive or highly saline or seaside environments, where corrosion of concrete reinforcing steel is a billion dollar problem, the sealed formwork can simply be sacrificed to permanently protect the concrete.

Passages can be moulded into the formwork for reinforcing steel, or alternative reinforcing materials such as high tensile plastic strapping materials can be used and by sequential casting of multiple cavity formwork, the reinforcing materials can be prestressed in situ. Aesthetic patterns can be cast or moulded into the surface of visible sacrificial formwork, or onto the relief side of reusable formwork.

The Present Connecting Method Allows for Greater Transport Efficiency

Transportation of large tanks and components is very expensive, as they are inherently bulky. There is a heavy greenhouse gas emission associated with essentially moving air large distances. The present connecting method will allow tanks to be cheaply transported in nested stacks or panels that can be assembled at or near the final destination.

The Present Connecting Method Supports Much Greater Design Flexibility

Modern vernacular architecture is boxy and boring predominantly because of the horrendous cost of fabricating complex surface formwork. The huge cost blow out on the construction of the iconic Sydney Opera House is a salient reminder to architects and subconsciously informs their conservative rectilinear designs. Complex compound shell structures can become as affordable as more staid design by using the present connecting method. Extremely complex forms can be fabricated and replicated in a variety of arrays using a suite of tangentially interfacing interlocking panel forms. Light weight and rapid to transport and erect shell structures can be made for prefabricated plastic housing for temporary shelters in refugee or other humanitarian housing crisis situations. And by burying structural shells, passive super energy efficient earth sheltered structures could be made more affordable than conventional prefabricated box construction houses.

The Present Connecting Method Allows for Extruded Components

Where long wall profiles are required, such as in large diameter tanks, the wall profile can be extruded and the keyways either punched off during extrusion or co-moulded. This will allow very large wall sections to be made of any material that can be extruded, such as various grades and alloys of aluminium, steel, plastic and the like. It would even be practical to construct low cost pressure vessels or large underground storage tanks using this technique.

The Present Connecting Method Allows for Securing Smooth Edged Components

Where it is required to attach a smooth edged component such as a spotlight lens into a reflector housing, for instance, a keyway passage can be formed which has one side formed by the smooth edge and the other side formed by the castellated hooks of the keyway arrangement. The keyway connector would then only have keys arranged on one side. Such an arrangement is illustrated in FIG. 20.

The there are some cases where there are advantages from using a non-castellated keyway connector which has a singe key on each side of the keyway connector. If the frictional forces are high however from the interference fit into the keyway it may be impossible to draw the keyway connector through a long keyway passage. An alternative is to shape the keyway in the form of a cam that can be easily inserted between the keyways when twisted 90 degrees from its locked position. Locking can then be accomplished by rotating the key 90 degrees in either direction after insertion, FIGS. 24-30 illustrate this embodiment. Depending on the flexibility of the locking keyway connector and the diameter of an annular keyway passage it is still possible to employ this method. The natural memory of the flexible keyway connectors can be employed to advantage to stabilize the keyway connector from rolling and allowing the joint to loosen. This arrangement is shown in FIG. 26.

There is often a need to join the edge of one part to the face of another. In this application the two parts can be stitched together by punching a linear array of slots across the sheet to allow the hook shaped keyway ends to penetrate through and be locked in position by any suitable keyway connector as illustrated in FIGS. 27-30 (the wing brace joint). The joint could be recessed and keyway connector could also have a cosmetic face so that the joint results in a smooth surface profile as would be required for aerodynamic structural elements.

Referring now to FIGS. 31-36 there is show a slip flange assembly 1001 for connecting respective flanged ends of two pipes 1002, 1003 together.

Figure 31:
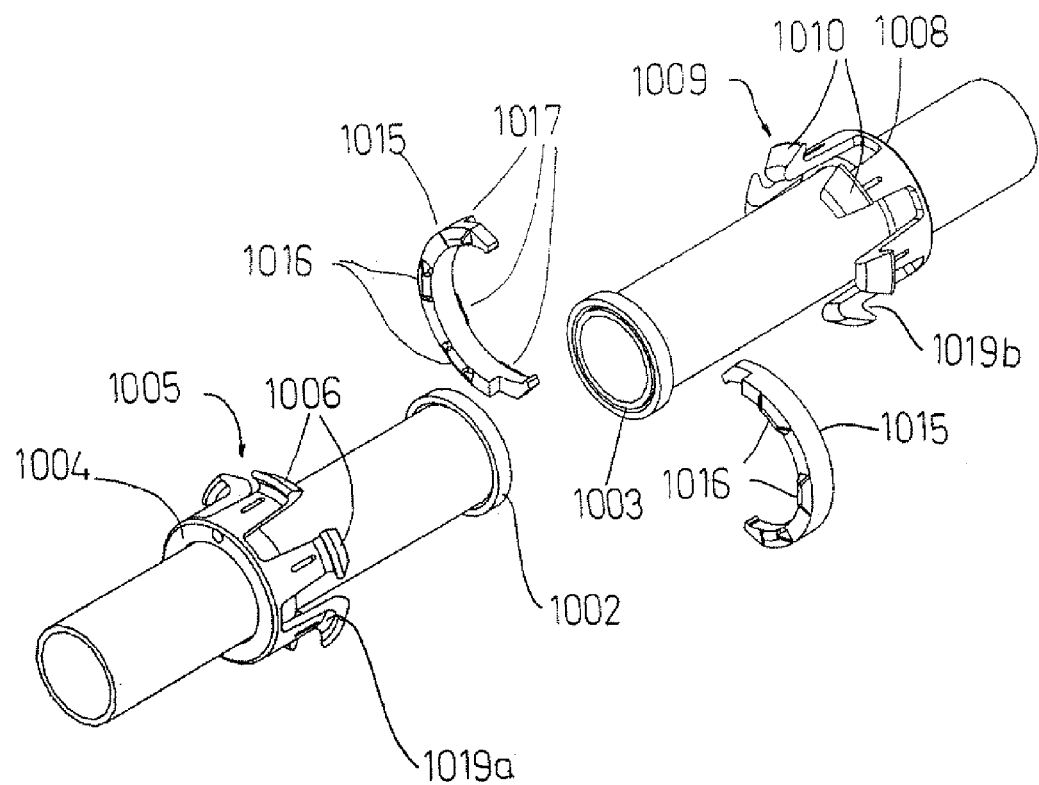
FIG. 31 is an exploded view of a slip flange assembly for connecting flanged ends of two pipes together, according to an embodiment of the present invention.
Figure 32:
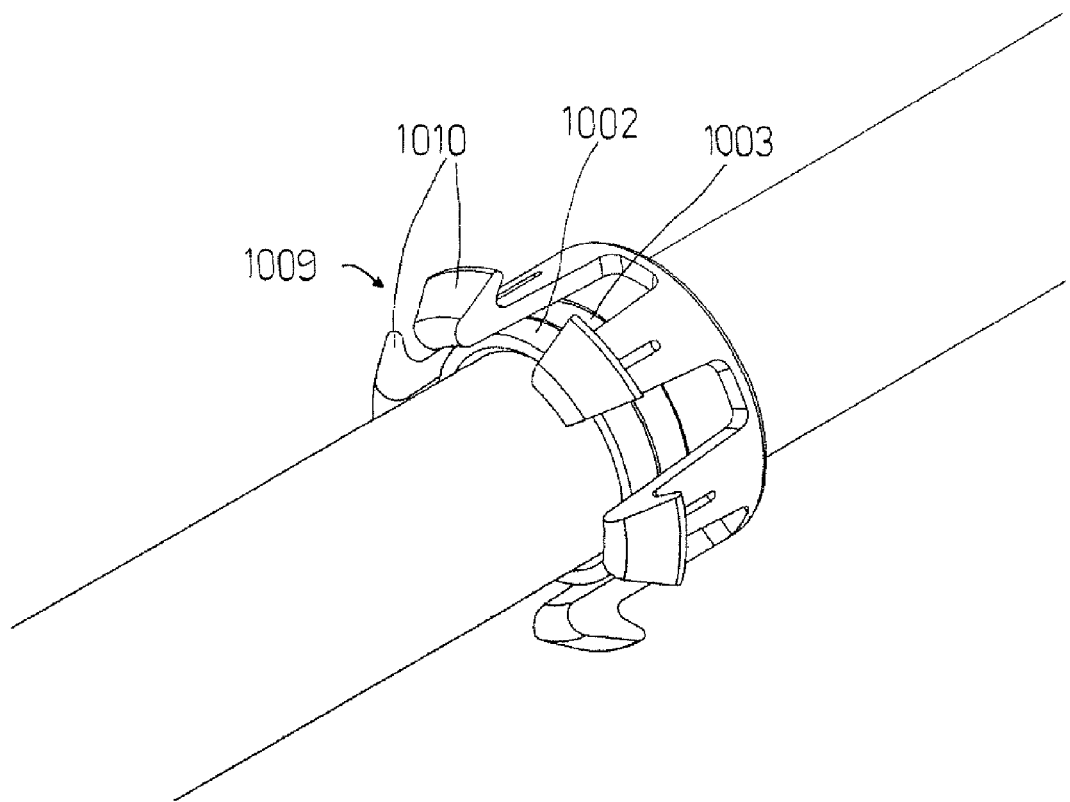
FIG. 32 is the same as FIG. 31 except that only one part of the slip flange assembly is shown positioned around the pipes.
Figure 33:
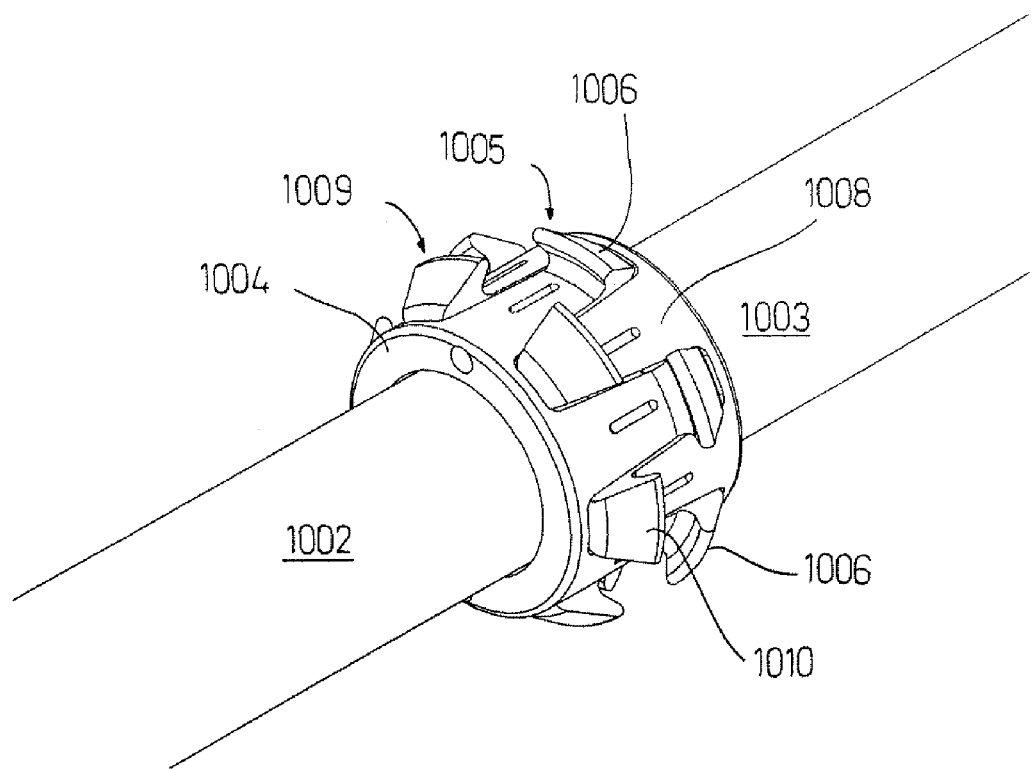
FIG. 33 is the same as FIG. 32 except that two parts of the slip flange assembly are shown positioned around the pipes.

The slip flange assembly 1001 comprises a first collar 1004, a second collar 1008 and a two-part keyway connector 1015, as seen in FIG. 31.

The first collar 1004 has a keyway arrangement 1005 extending from a circumference of the collar 1004. The keyway arrangement 1005 comprises a plurality of regularly spaced keyways 1006 (only some of which have been labeled).

The second collar 1008 has a keyway arrangement 1009 extending along a circumference of the collar 1008. The keyway arrangement 1009 comprises a plurality of regularly spaced keyways 1010 (only some of which have been labeled).

The keyway connector 1015 is in the form of a split ring 1015 having a first set of keys 1016 (only some of which have been labeled) extending from one side of the ring 1015 and a second set of keys 1017 (only some of which have been labeled) extending from an opposite side of the ring 1015 (as seen in FIG. 31).

Keys 1016 extend in a common plane and are regularly spaced from one another. The spacing of keys 1016 matches the spacing of keyways 1010. Keys 1017 also extend in a common plane and are regularly spaced from one another. The spacing of keys 1017 matches the spacing of keyways 1006. Key 1016 and 1017 are off-set relative to one another along a length of the ring 1015 in the same manner as keyways 1006 and 1010 when intermeshed.

Each keyway 1006, 1010 is in the form of a hook clip having a connector-support portion and a key-retaining portion 1019a, 1019b (as seen in FIG. 31). Each key-retaining portion 1019a, 1019b may extend around a key 1016, 1017 of the keyway connector 1015.

As shown in FIGS. 33-36, the keyways 1006, 1010 of the keyway arrangements 1005, 1009 can intermesh with one another to provide a continuous keyway passage extending around the pipes 1002, 1003 between the intermeshed keyways 1006, 1010.

Figure 34:
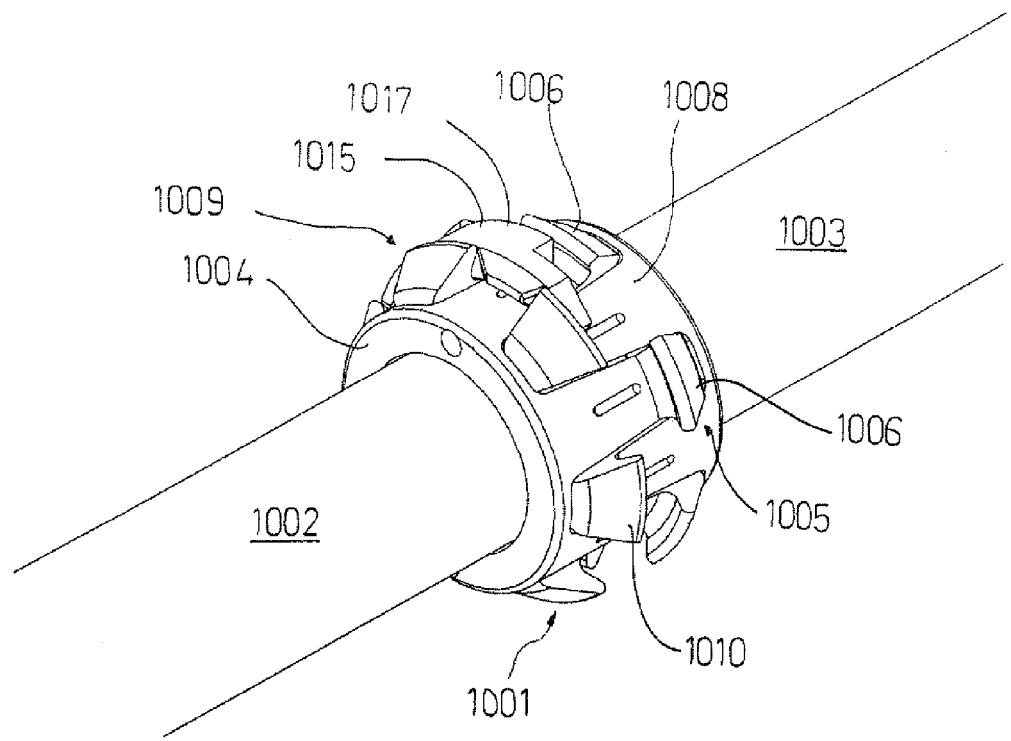
FIG. 34 is the same as FIG. 33 except that a further part of the slip flange assembly is shown positioned around the pipes.
Figure 35:
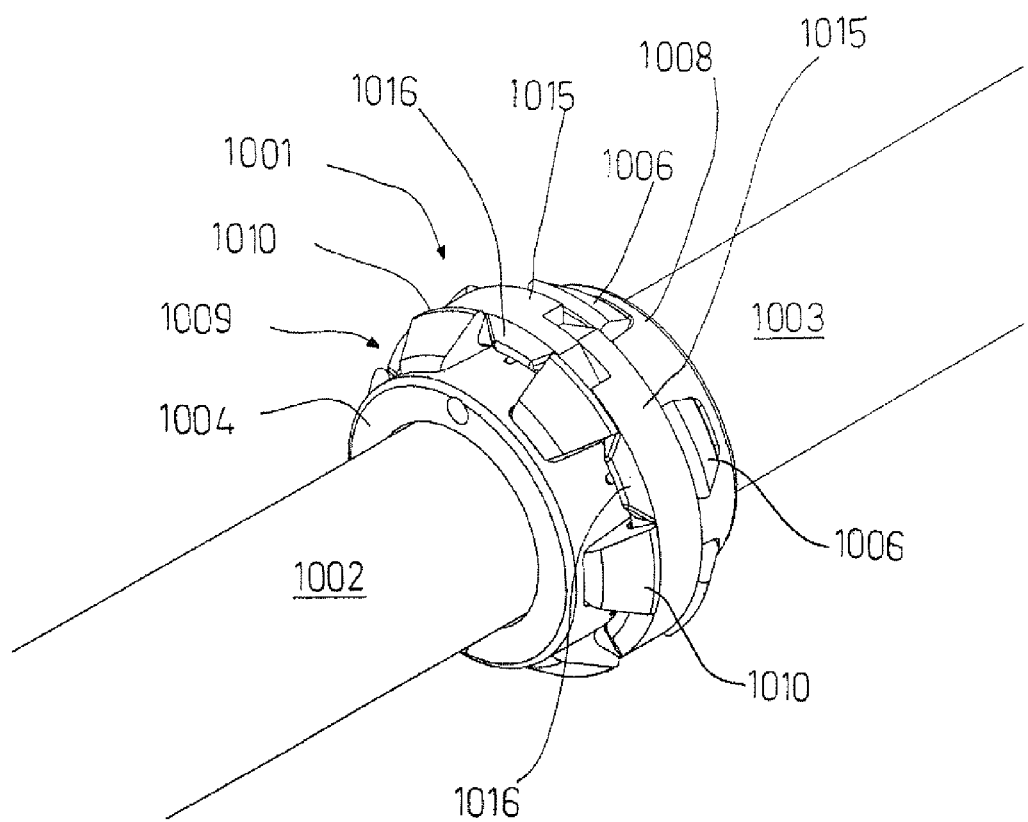
FIG. 35 is the same as FIG. 34 except that all of the parts of the slip flange assembly are positioned around the pipes.
Figure 36:
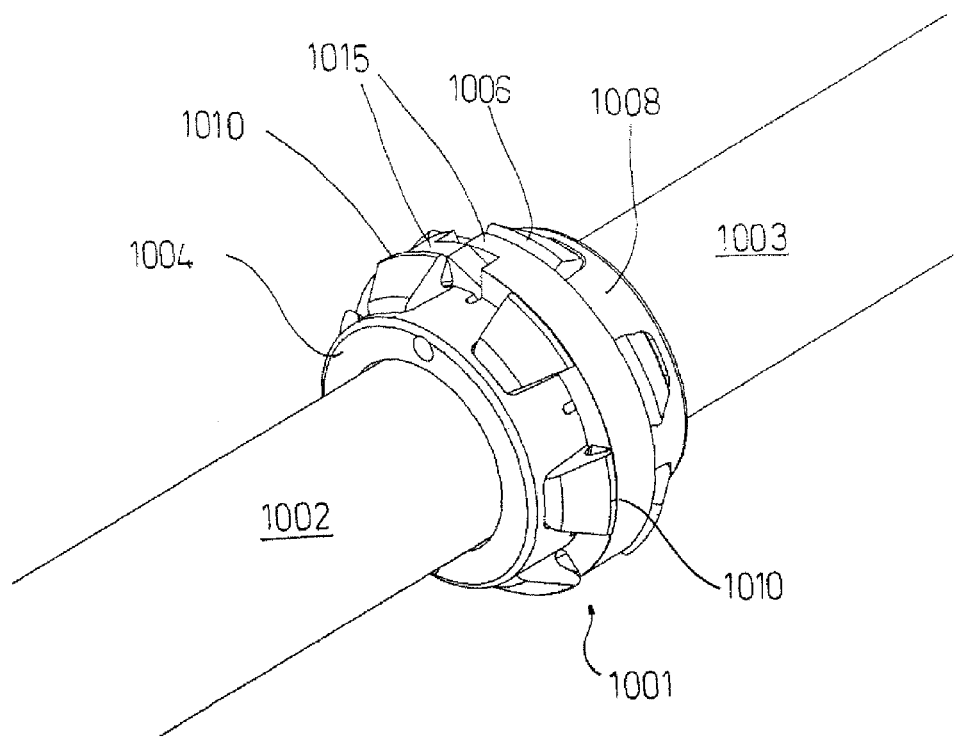
FIG. 36 is the same as FIG. 35 except that the slip flange assembly has been configured to lockingly connect the pipes together.

As shown in FIGS. 34 and 35, the two-part keyway connector 1015 is insertable longitudinally within the continuous keyway passage when the keys 1016, 1017 are not positioned directly atop the keyways 1006, 1010. Once inserted, each key-retaining portion 1019*a*, 1019*b* is potentially positioned to extend around a key 1016, 1017. This is best seen in FIG. 36.

Once the keyway connector 1015 extends within the passage, it can be slid relative to the keyways 1006, 1010 until the keys 1016, 1017 engage the keyways 1006, 1010 and are retained by the keyways 1006, 1010, so as to lock the flanged ends of the pipes 1002, 1003 together. This is shown in FIG. 36. To disconnect the flanged ends of the pipes 1002, 1003, the keyway connector 1015 is slid within the passage until the keys 1016, 1017 no longer engage the keyways 1006, 1010, as seen in FIG. 35.

Referring now to FIGS. 37 to 42, there is shown a slip flange assembly 1020 for connecting ends of two pipes 1021, 1022 together.

Figure 37:
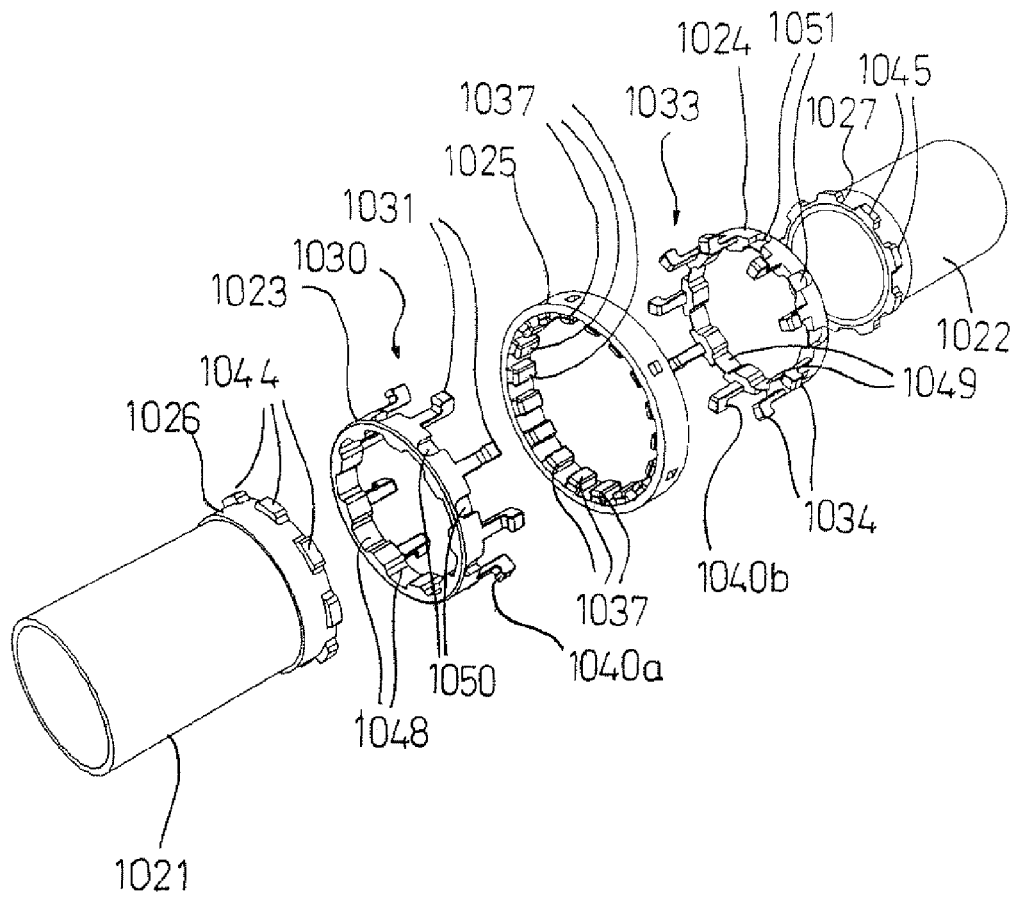
FIG. 37 is an exploded view of a slip flange assembly for connecting two pipes together, according to an embodiment of the present invention.
Figure 38:
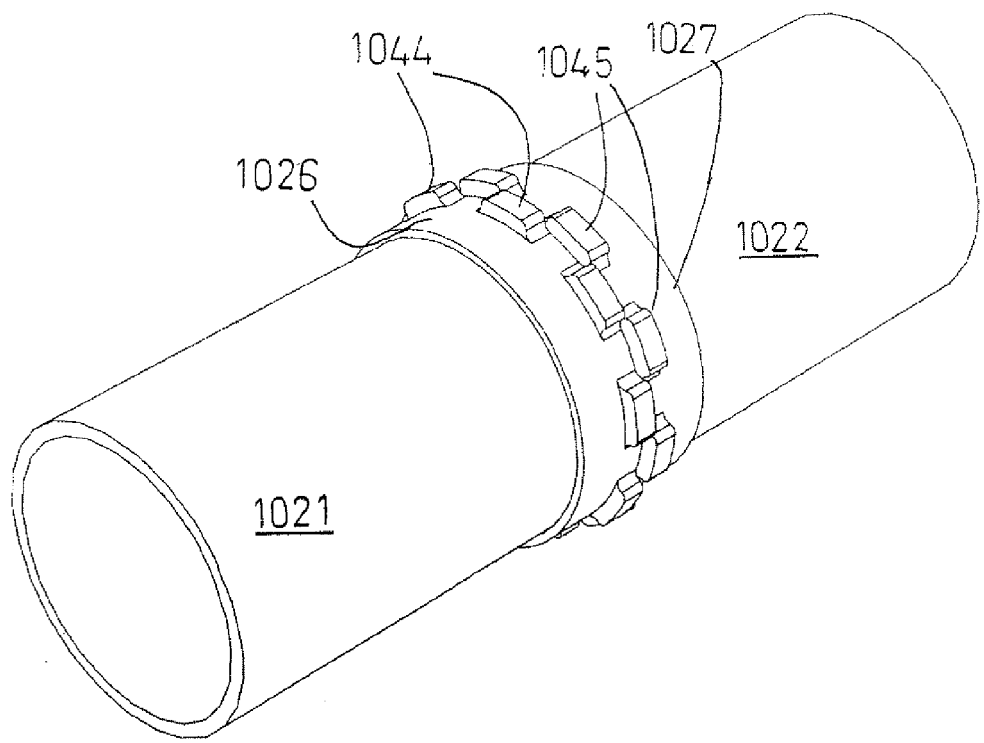
FIG. 38 is the same as FIG. 37 except that only two parts of the slip flange assembly are shown connected to the pipes.

The slip flange assembly 1020 comprises a first collar 1023, a second collar 1024, a keyway connector 1025, a castellated flange 1026 connected to the end of pipe 1021, and a castellated flange 1027 connected to the end of pipe 1022, as seen in. FIGS. 37 and 38.

Castellated flange 1026 is connected to the end of pipe 1021 with adhesive. The flange 1026 has castellations 1044 spaced along its outer circumference.

Likewise, castellated flange 1027 is connected to the end of pipe 1022 with adhesive. The flange 1027 has castellations 1045 spaced along its outer circumference.

The first collar 1023 has a keyway arrangement 1030 extending from an outer circumference of the collar 1023. The keyway arrangement 1030 comprises a plurality of regularly spaced keyways 1031 (only some of which have been labeled). The first collar 1023 has recesses 1048 regularly spaced along its inner circumference, for snugly receiving castellations 1044. The first collar 1023 also has indents 1050 regularly spaced along its outer circumference.

The second collar 1024 has a keyway arrangement 1033 extending along a circumference of the collar 1024. The keyway arrangement 1033 comprises a plurality of regularly spaced keyways 1034 (only some of which have been labeled). The second collar 1024 has recesses 1049 regularly spaced along its inner circumference, for snugly receiving castellations 1045. The second collar 1024 also has indents 1051 regularly spaced along its outer circumference.

The keyway connector 1025 is in the form of a ring 1025 having spaced apart keys 1037 (only some of which have been labeled) extending along an inner circumference of the ring 1025, from one side of the ring 1025 to the other (as best seen in FIG. 37). The regular spacing of keys 1037 matches the spacing of keyways 1031 and 1034. Each keyway 1031, 1034 is in the form of a hook clip having a connector-support portion and a key-retaining portion 1040*a*, 1040*b* (as seen in FIG. 37). Each key-retaining portion 1040*a*, 1040*b* may extend around a key 1037 of the keyway connector 1025.

In order to lock the two pipes 1021, 1022 together, first the castellated flanges 1026, 1027 are brought into contact with one another, such that the castellations 1044, 1045 are offset relative to one another, as seen in FIG. 38.

Figure 39:
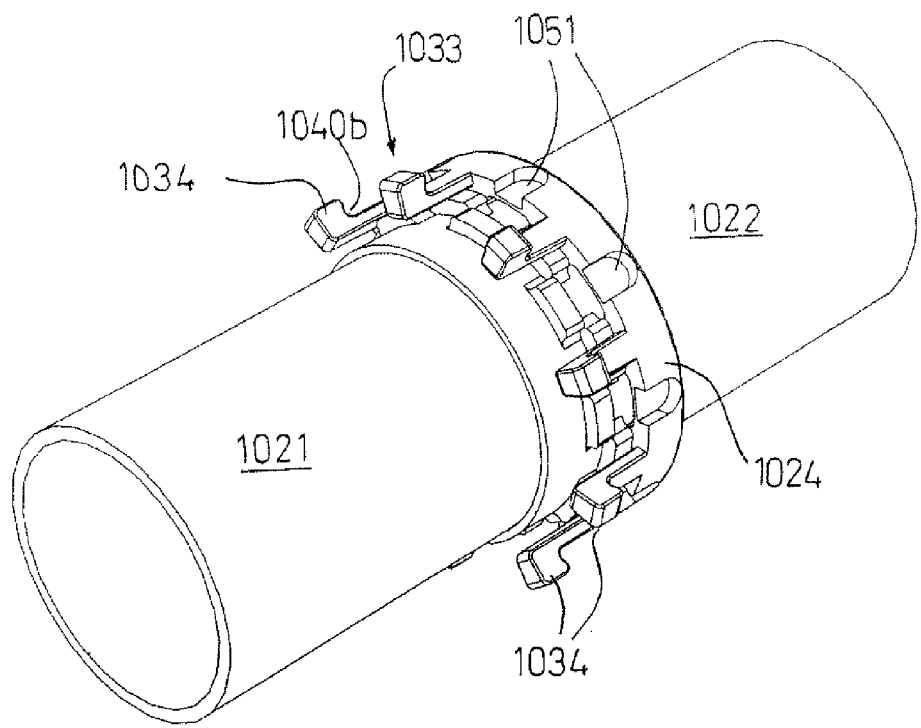
FIG. 39 is the same as FIG. 38 except that a further part of the slip flange assembly is shown positioned around the pipes.
Figure 40:
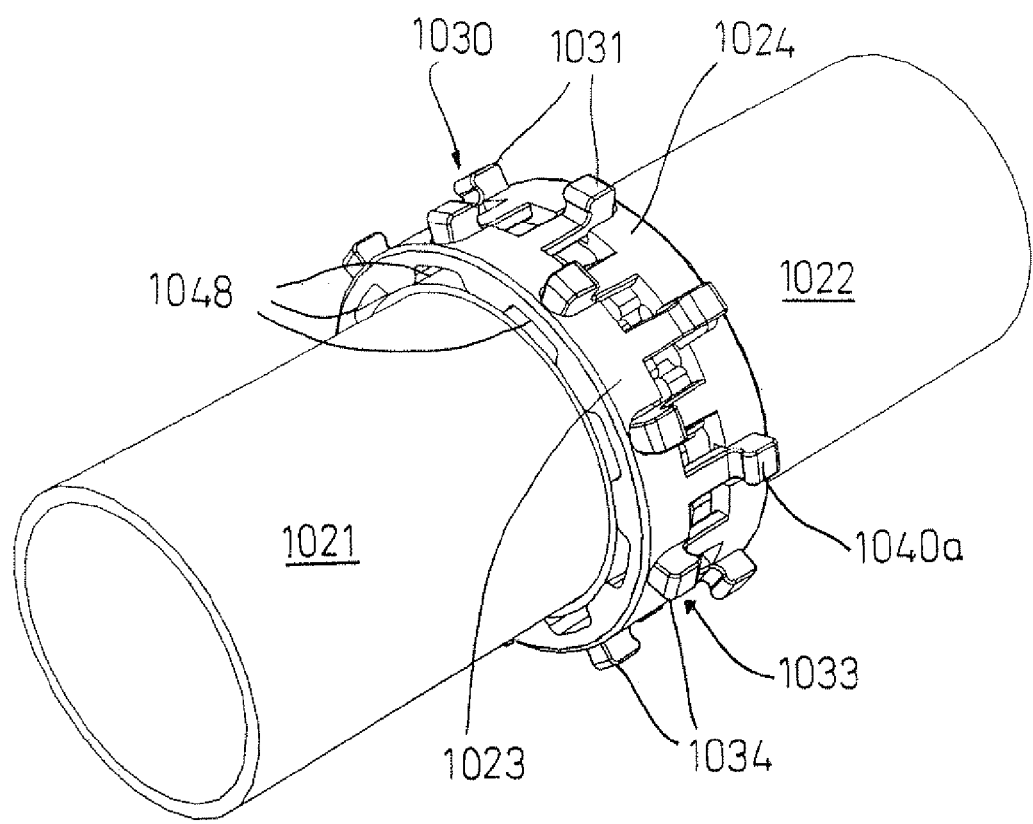
FIG. 40 is the same as FIG. 39 except that a further part of the slip flange assembly is shown positioned around the pipes.
Figure 41:
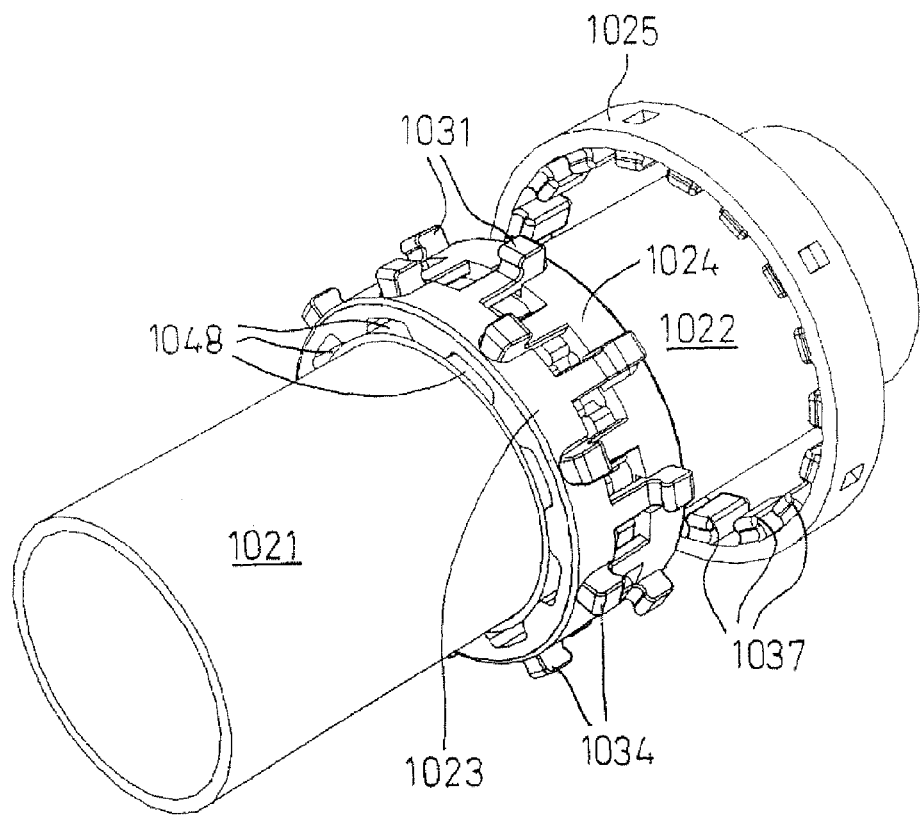
FIG. 41 is the same as FIG. 40 except that it shows a further part of the slip flange assembly being positioned around the pipes.

As shown in FIGS. 39-41, the keyways 1031, 1034 of the keyway arrangements 1030, 1033 are then made to intermesh with one another to provide a continuous keyway passage extending around the castellated flanges 1026, 1027. When intermeshed, each key-retaining portion 1040*a* rests within each indent 1051. Likewise, each key-retaining portion 1040*b* rests within each indent 1050.

Figure 42:
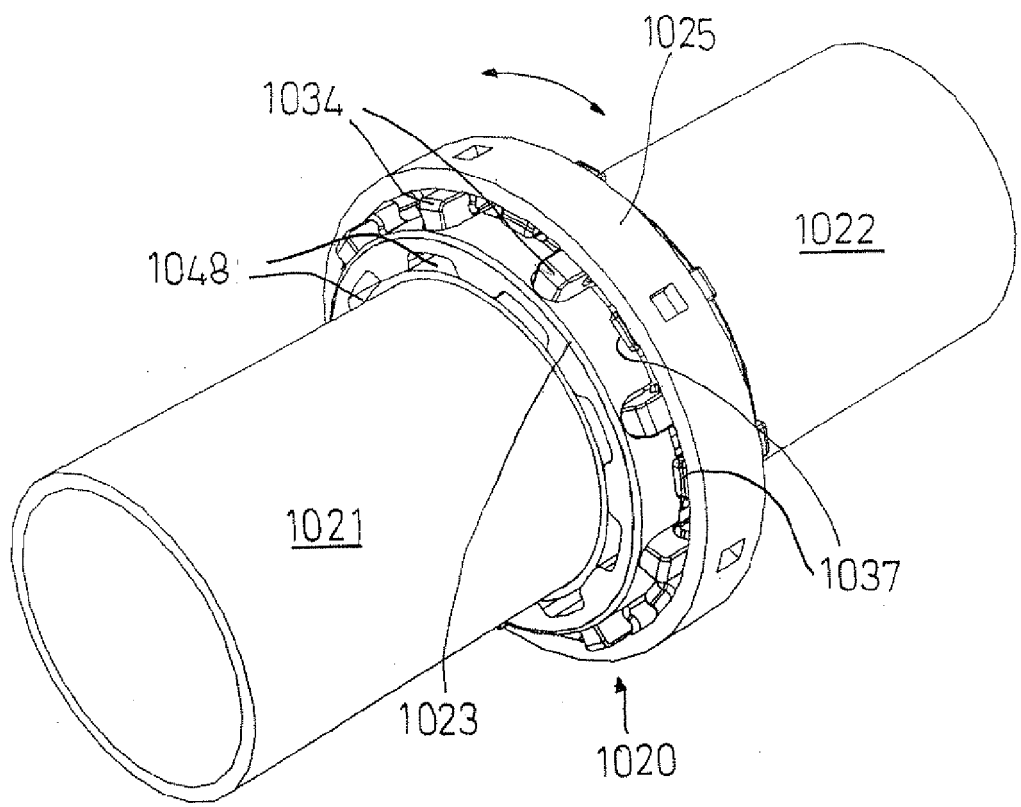
FIG. 42 is the same as FIG. 41 except that the slip flange assembly is being configured to lockingly connect the pipes together (in the direction of the arrow)
Figure 43:
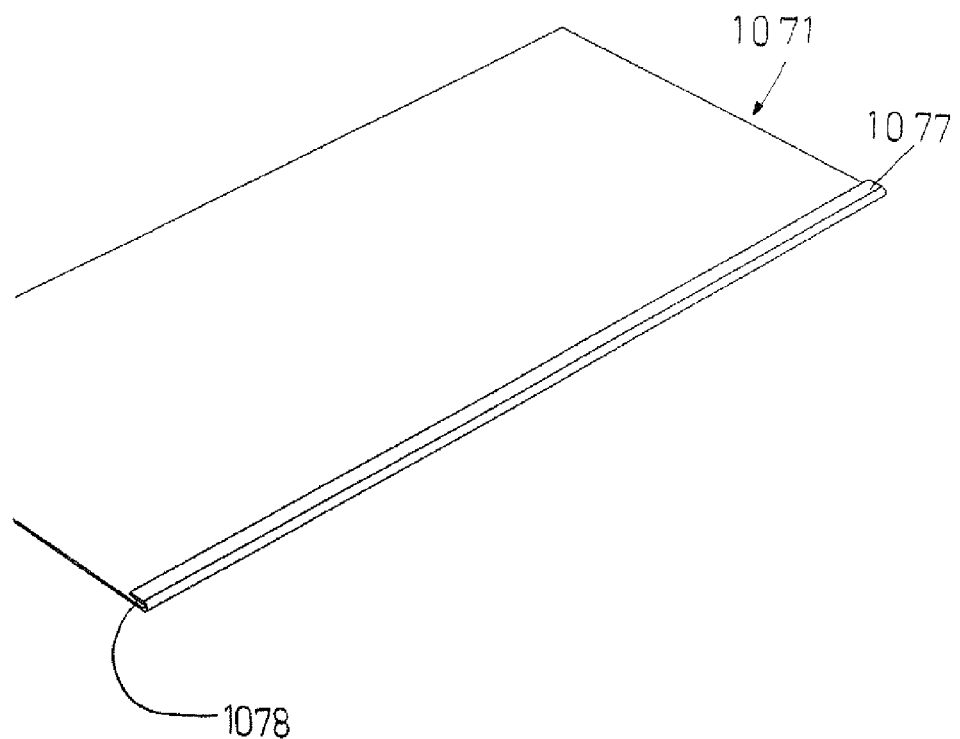
FIG. 43 is a perspective view of part of a panel assembly, according to another embodiment of the present invention.
Figure 44:
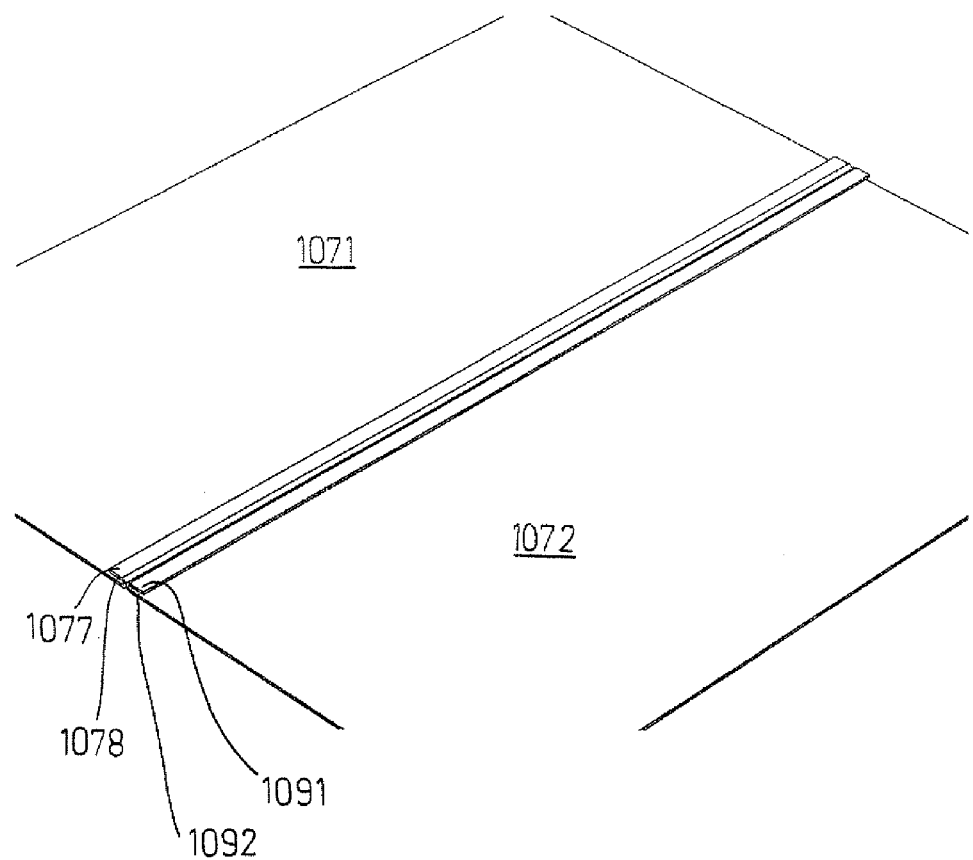
FIG. 44 is the same as FIG. 43 except that part of a further panel assembly is shown.

As shown in FIG. 41, the keyway connector 1025 is then slid through gaps between keys 1031 and 1034, until the keyway connector 1025 extends longitudinally within the continuous keyway passage. Once the keyway connector 1025 extends within the passage, it can be rotated relative to the keyways 1031, 1034 until the keys 1037 engage the keyways 1031, 1034 and are retained by the keyways 1031, 1034 so as to lock the flanged ends of the pipes 1021, 1022 together. This is shown in FIG. 42. To disconnect the flanged ends of the pipes 1021, 1022, the keyway connector 1025 is rotated within the passage until the keys 1037 no longer engage the keyways 1031, 1034.

Referring now to FIGS. 43 to 50, there is shown joined panel assemblies 1070 (see FIGS. 48 to 50) comprising a first panel assembly, a second panel assembly, a keyway connector 1100, and components thereof. These can be made of metal or plastics material, for example.

Figure 45:
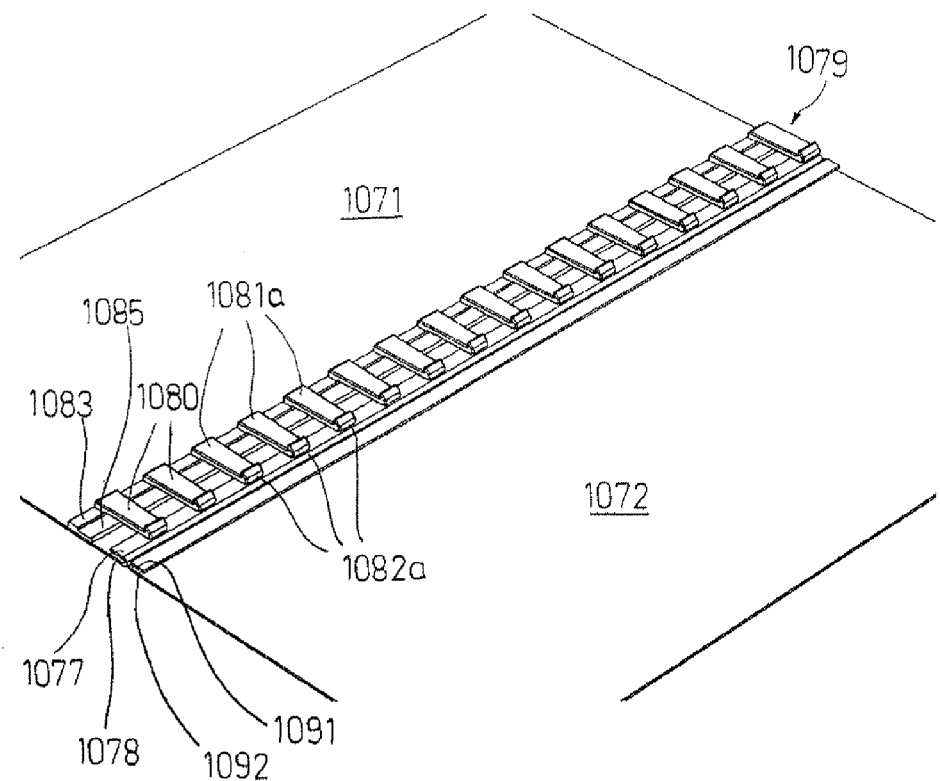
FIG. 45 is the same as FIG. 44 except that a further part of a panel assembly is shown.
Figure 46:
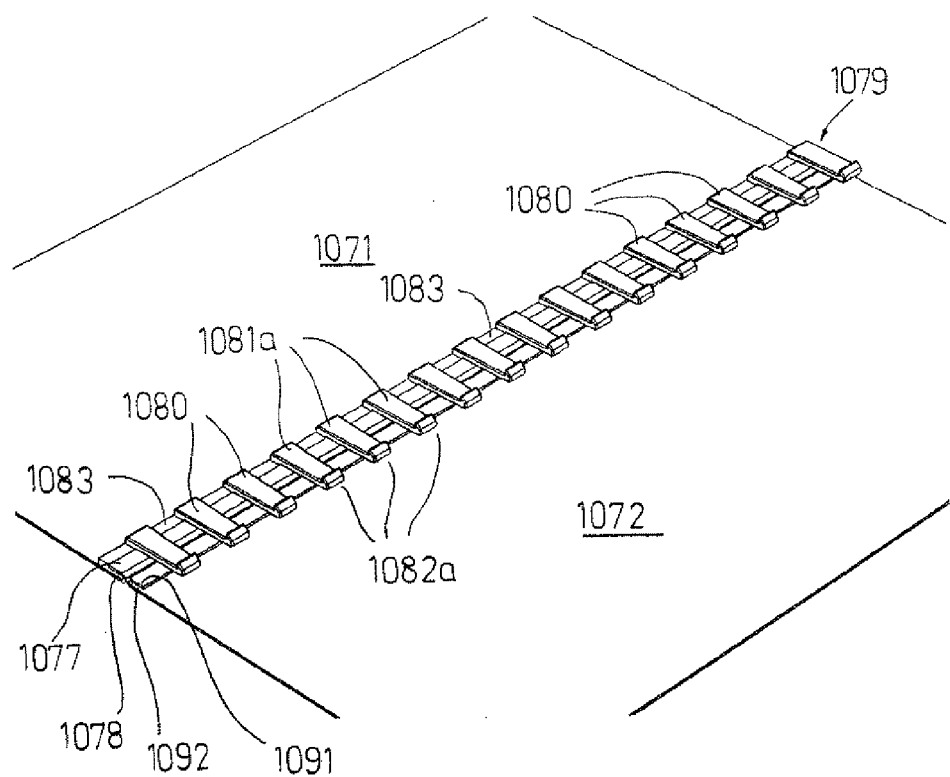
FIG. 46 is the same as FIG. 45 except that two parts of a panel assembly have been connected together.

FIG. 45 shows that the first panel assembly comprises a panel 1071 and a keyway arrangement 1079. The panel 1071 has an upturned longitudinal end 1077 that provides a groove 1078. The keyway arrangement 1079 comprises an elongate body 1083 and a plurality of regularly spaced keyways 1080 extending from the body 1083. Each keyway 1080 has connector-support portion 1081*a* and a key-retaining portion 1082*a*. The body 1083 has a stepped periphery such that there is a clearance between a thinner longitudinal portion 1085 of the body 1083 and each key 1080 (see FIG. 45). As seen in FIG. 46, the thinner longitudinal portion 1085 of the body 1083 is snugly received into the groove 1078.

Figure 47:
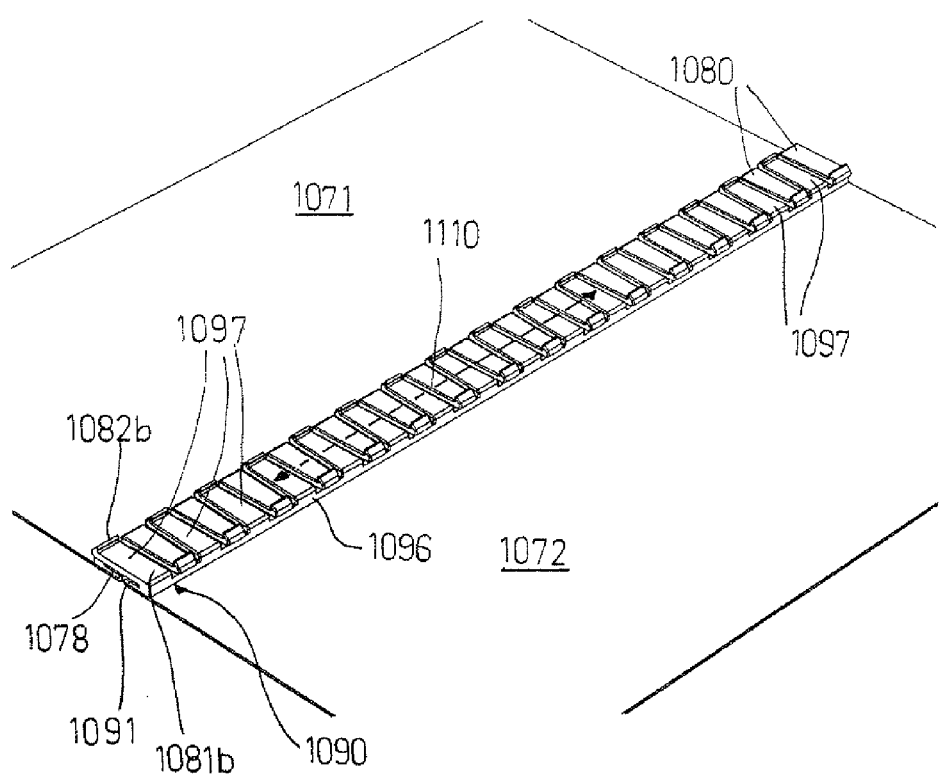
FIG. 47 is the same as FIG. 46 except that a further part of a panel assembly is shown.
Figure 48:
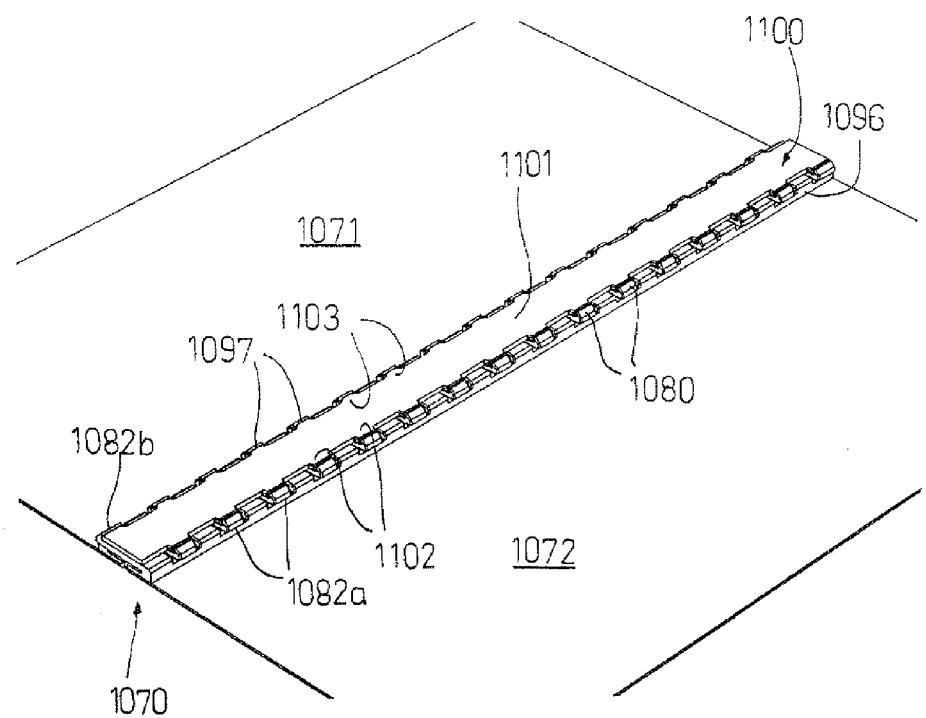
FIGS. 48 to 50 are the same as FIG. 47 except that a further part of a panel assembly is shown, said part being moved from a position shown in FIG. 48 to a final locking position shown in FIG. 50.
Figure 49:
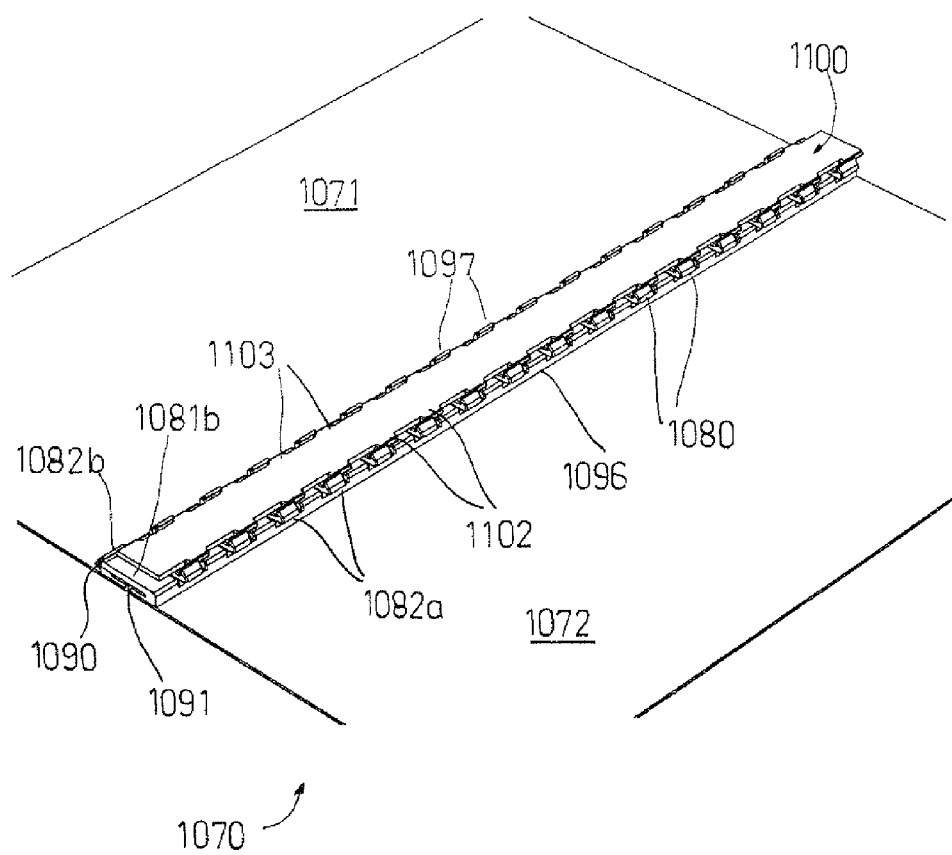

FIGS. 47-49 show that the second panel assembly comprises a panel 1072 and a keyway arrangement 1090. Like panel 1071, panel 1072 has an upturned longitudinal end 1091 that provides a groove 1092 (see FIGS. 44 to 46). The keyway arrangement 1090 comprises an elongate body 1096 and a plurality of regularly spaced keyways 1097 extending from the body 1096. Each keyway 1097 has connector-support portion 1081*b* and a key-retaining portion 1082*b*, as seen in FIG. 47. Like body 1083, body 1096 has a stepped periphery such that there is a clearance between a thinner longitudinal portion of the body 1096 and each key 1097. As seen in FIG. 47, the thinner longitudinal portion of the body 1096 is snugly received into the groove 1092.

Figure 50:
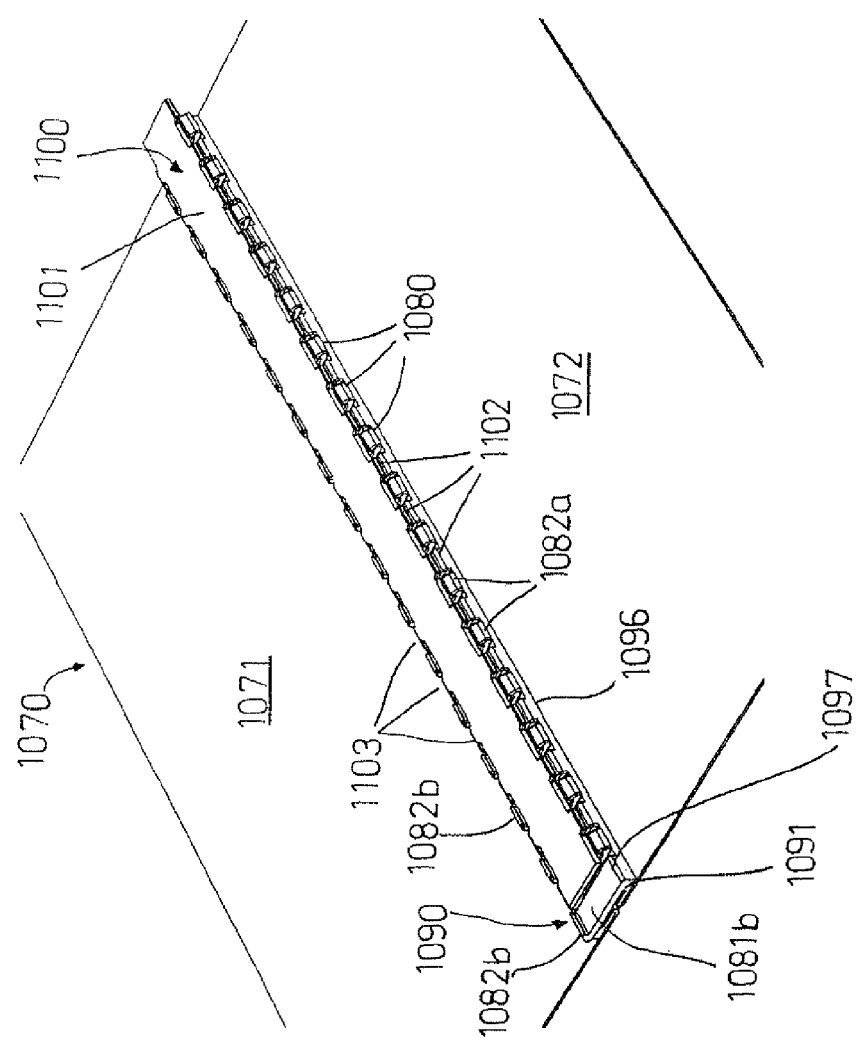

As seen in FIGS. 48 to 50, the keyway connector 1100 comprises a flat longitudinal body 1101 and keys 1102 extending from one side of the body 1101, and keys 1103 extending from an opposite side of the body 1101.

Keys 1102 extend in a common plane and are regularly spaced from one another. The spacing of keys 1102 matches the spacing of keyways 1080. Keys 1103 also extend in a common plane and are regularly spaced from one another. The spacing of keys 1103 matches the spacing of keyways 1097. Keys 1102 and 1103 are off-set relative to one another along a length of the body 1101 in the same manner as keyways 1080 and 1097 when intermeshed.

The keyways 1080, 1097 can intermesh with one another such that each keyway 1080 is straddled by keyways 1097 of the other arrangement. Keyways 1080 and 1097 intermesh to provide a continuous keyway passage 1110 extending longitudinally between the intermeshed keyways 1080, 1097 (the arrow as seen in FIG. 47).

The keyway connector 1100 can be inserted and slid longitudinally within the continuous keyway passage 1110, as seen in FIG. 48. Once inserted, each key-retaining portion 1082*a*, 1082*b* is potentially positioned to extend around a key 1102, 1103. This is best seen in FIGS. 48, 49 and 50.

Once the keyway connector 1100 extends within the passage 1110, it can be slid relative to the keyways 1080, 1097 until the keys 1102, 1103 engage the keyways 1080, 1097 and are retained by the keyways 1080, 1097 so as to lock the panels 1070, 1071 together to form a tight joint. To disconnect panel 1070 from panel 1071, the keyway connector 1100 is slid within the passage 1110 until the keys 1102, 1103 no longer engage the keyways 1080, 1097.

FIGS. 51-54 show a plastic slip flange assembly 1301 for connecting respective flanged ends of two plastic pipes 1302, 1303 together.

Figure 51:
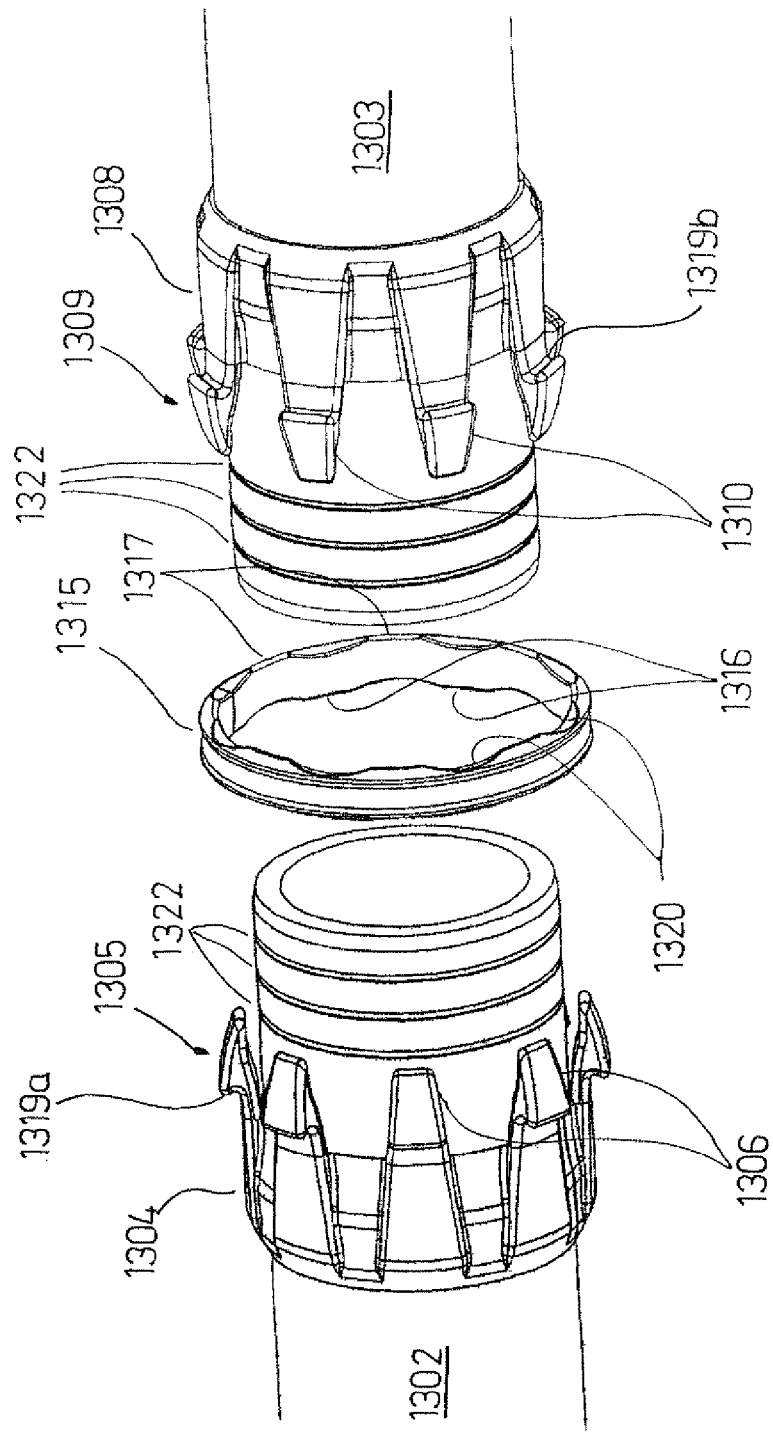
FIG. 51 is an exploded view of a slip flange assembly for connecting flanged ends of two pipes together, according to an embodiment of the present invention.
Figure 52:
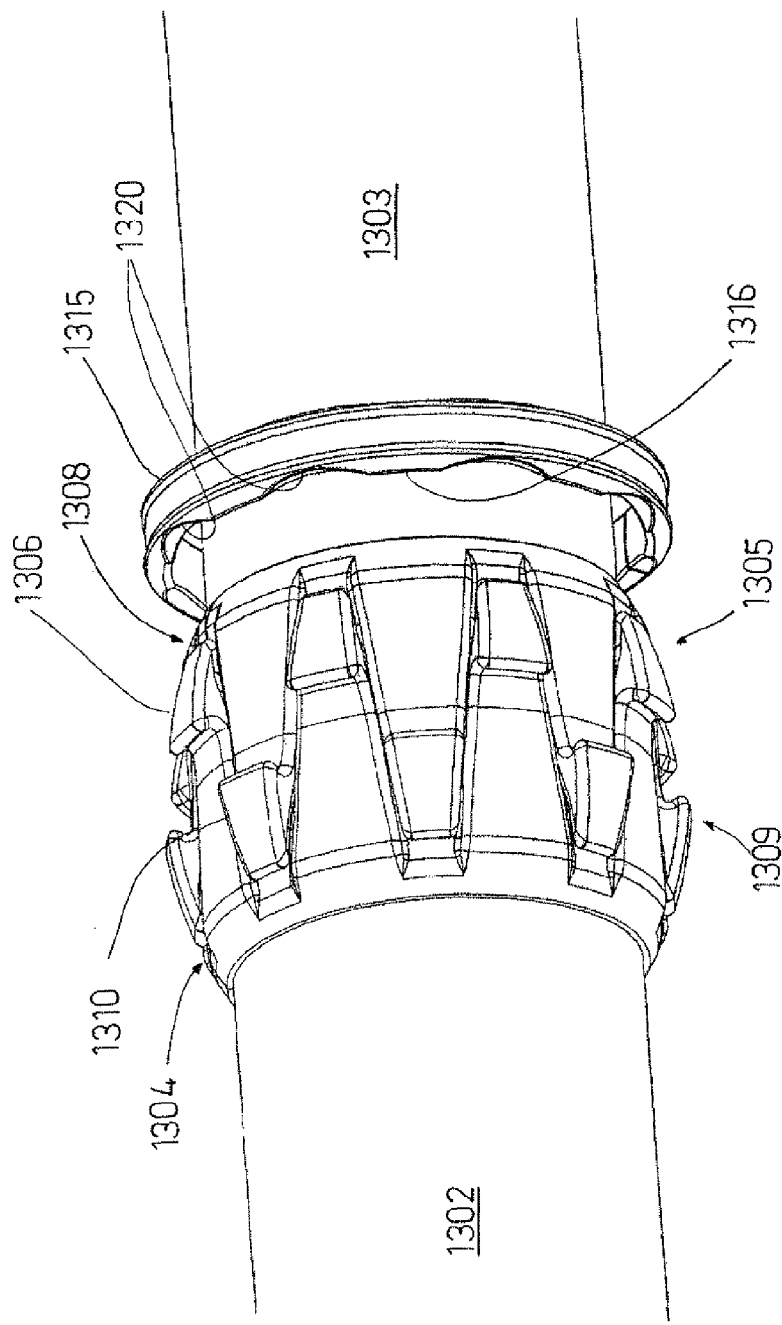
FIG. 52 is the same as FIG. 51 except that the parts of the slip flange assembly are shown partially connected together.
Figure 53:
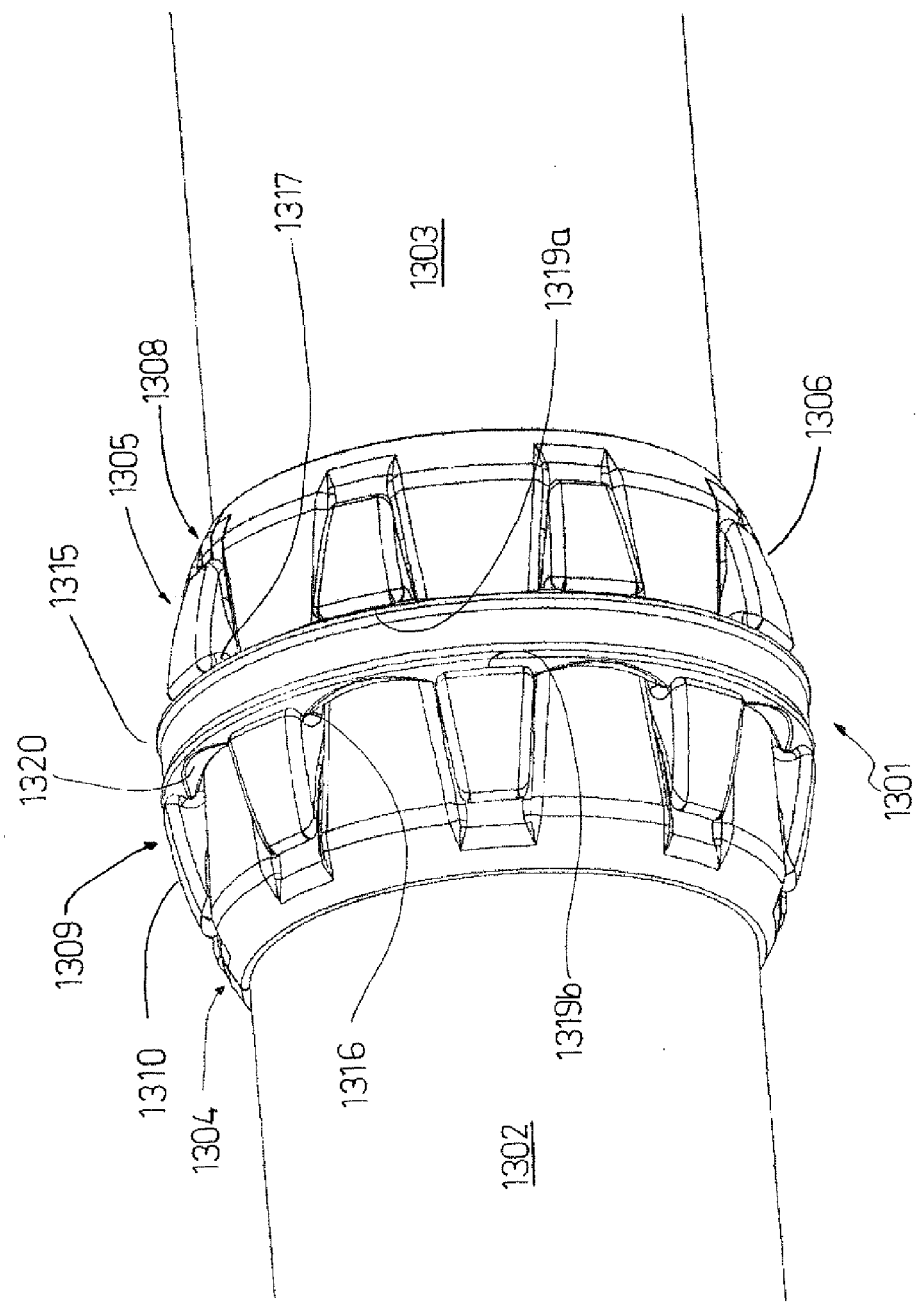
FIG. 53 is the same as FIG. 52 except that the slip flange assembly is shown in a final locking position.

The slip flange assembly 1301 comprises a first collar 1304, a second collar 1308 and a keyway connector 1315, as seen in FIGS. 51-53.

The first collar 1304 has a keyway arrangement 1305 extending from a circumference of the collar 1304. The keyway arrangement 1305 comprises a plurality of regularly spaced keyways 1306 (only some of which have been labeled).

The second collar 1308 has a keyway arrangement 1309 extending from a circumference of the collar 1308. The keyway arrangement 1309 comprises a plurality of regularly spaced keyways 1310 (only some of which have been labeled).

The keyway connector 1315 is in the form of a ring 1315 having a first set of keys 1316 (only some of which have been labeled) extending from one side of the ring 1315 and a second set of keys 1317 (only some of which have been labeled) extending from an opposite side of the ring 1315 (as seen in FIG. 51).

Keys 1316 extend in a common plane and are regularly spaced from one another. The spacing of keys 1316 matches the spacing of keyways 1310. Keys 1317 also extend in a common plane and are regularly spaced from one another. The spacing of keys 1317 matches the spacing of keyways 1306. Keys 1316 and 1317 are off-set relative to one another along a length of the ring 1315 in the same manner as keyways 1306 and 1310 when intermeshed.

Each keyway 1306, 1310 is in the form of a hook clip having a connector-support portion and a key-retaining portion 1319a, 1319b (as seen in FIGS. 51 and 53). Each key-retaining portion 1319a, 1319b may extend around a key 1316, 1317 of the keyway connect or 1315.

As shown in FIGS. 52 and 53, the keyways 1306, 1310 of the keyway arrangements 1305, 1309 can intermesh with one another to provide a continuous keyway passage extending around the pipes 1302, 1303 between the intermeshed keyways 1306, 1310.

As shown in FIGS. 51 to 53, the keyway connector 1315 also comprises curved recesses 1320 between the keys 1316, 1317 that help the keyway connector 1315 ride over the keyways 1306, 1310 when the keyway connector 1315 is inserted into the continuous keyway passage. It can also be seen from FIG. 52 that the keyway connector 1315 is insertable longitudinally within the continuous keyway passage when the keys 1316, 1317 are not positioned directly atop the keyways 1306, 1310. Once inserted, each key-retaining portion 1319a, 1319b is potentially positioned to extend around a key 1316, 1317. This is best seen in FIG. 53.

Once the keyway connector 1315 extends within the passage, it can be slid relative to the keyways 1306, 1310 until the keys 1316, 1317 engage the keyways 1306, 1310 and are retained by the keyways 1306, 1310, so as to lock the flanged ends of the pipes 1302, 1303 together. This is shown in FIG. 53. To disconnect the flanged ends of the pipes 1302, 1303, the keyway connector 1315 is slid within the passage until the keys 1316, 1317 no longer engage the keyways 1306, 1310 (not shown).

Figure 54:
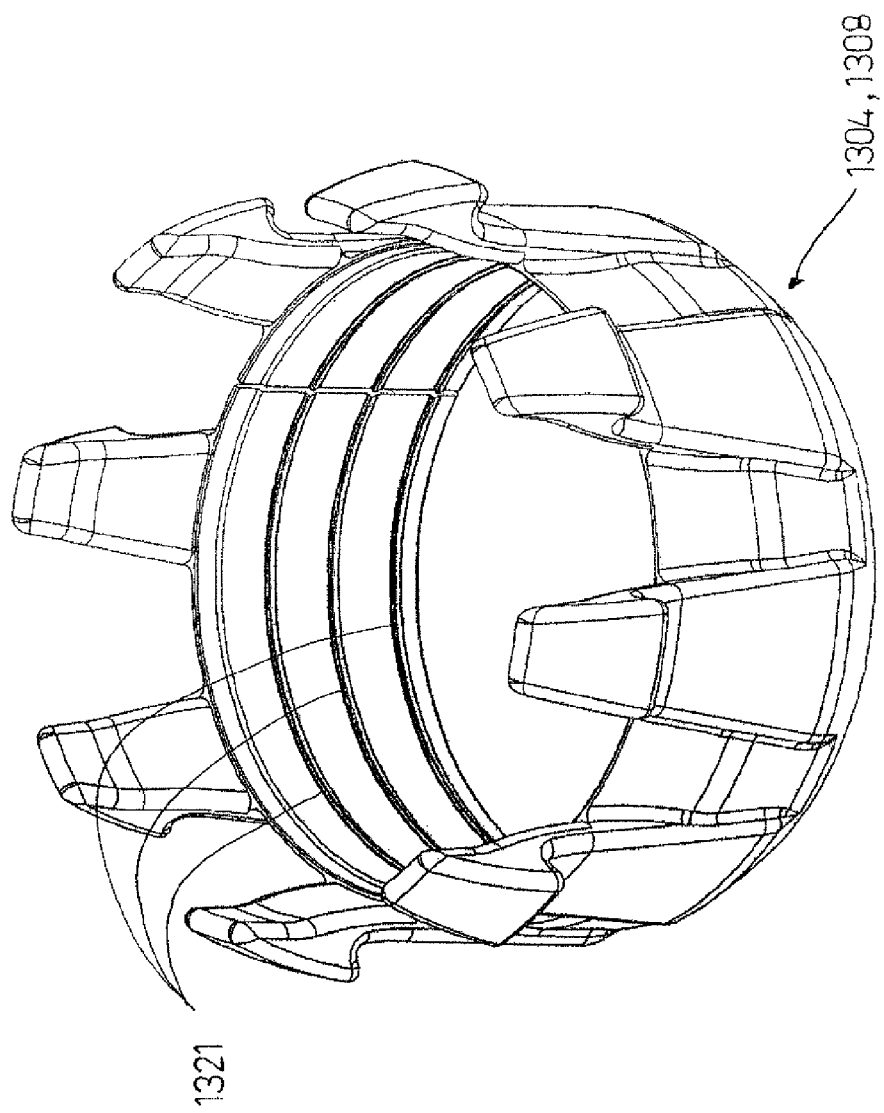
FIG. 54 is a perspective view of a collar of the assembly shown in FIG. 51.

As shown in FIG. 54 respective collars 1304, 1308 (single collar shown) comprise mating flanges 1321 that engage the flanged ends 1322 (shown in FIG. 51) of plastic pipes 1302 and 1303. When in mating arrangement flanges 1321 and 1322 secure collars 1304 and 1308 to the respective ends of pipes 1302 and 1303 and also help to form a seal around the circumference of each pipe 1302, 1303.

Figure 55:
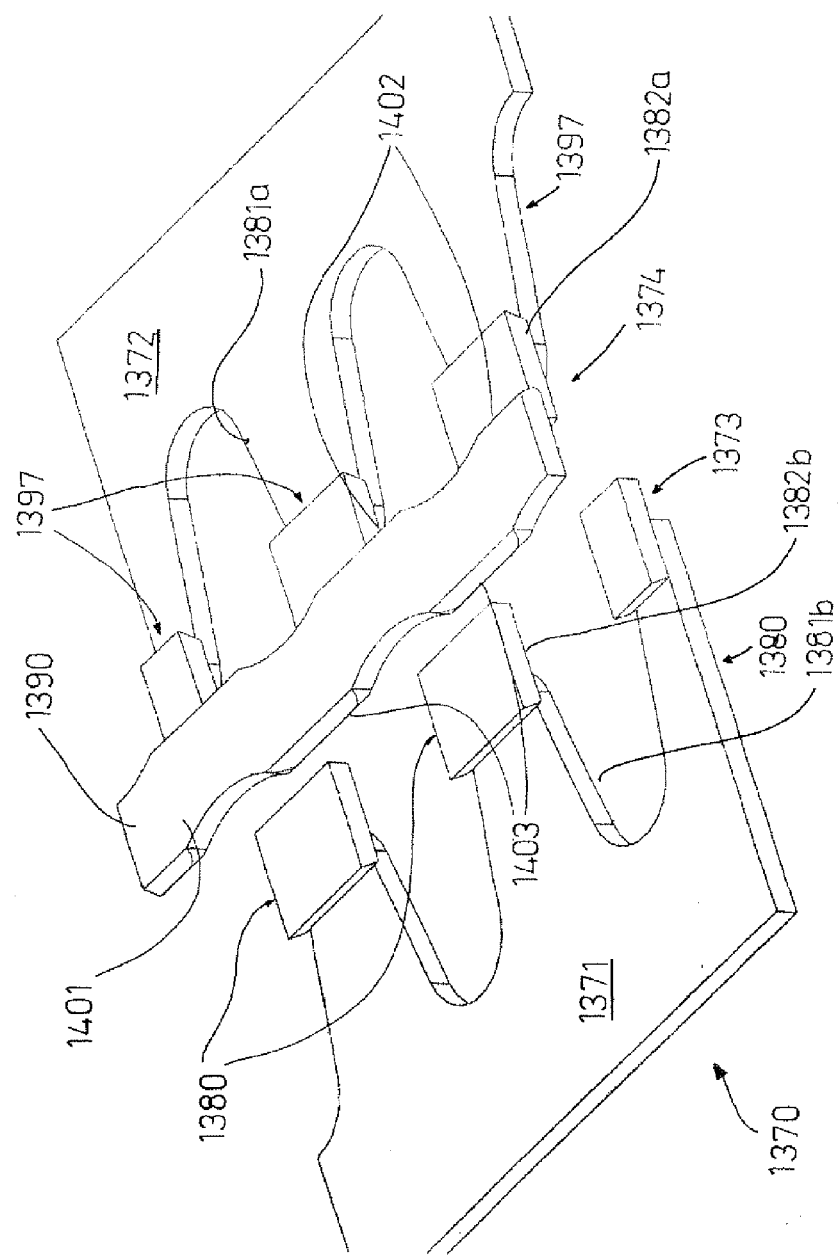
FIG. 55 is a perspective view of part of a panel assembly, according to another embodiment of the present invention.
Figure 56:
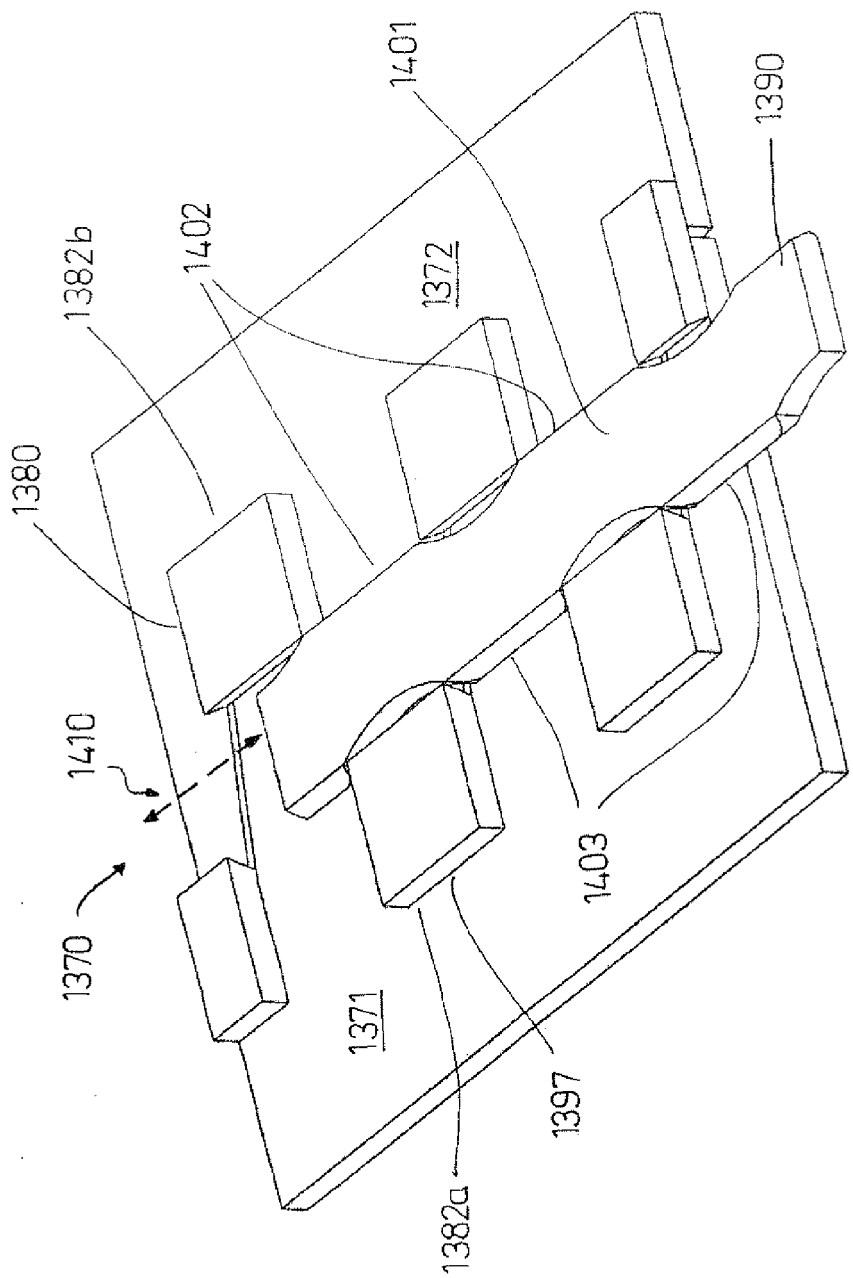
FIG. 56 is the same as FIG. 55 except that the parts of the assembly are in the process of being connected together.
Figure 57:
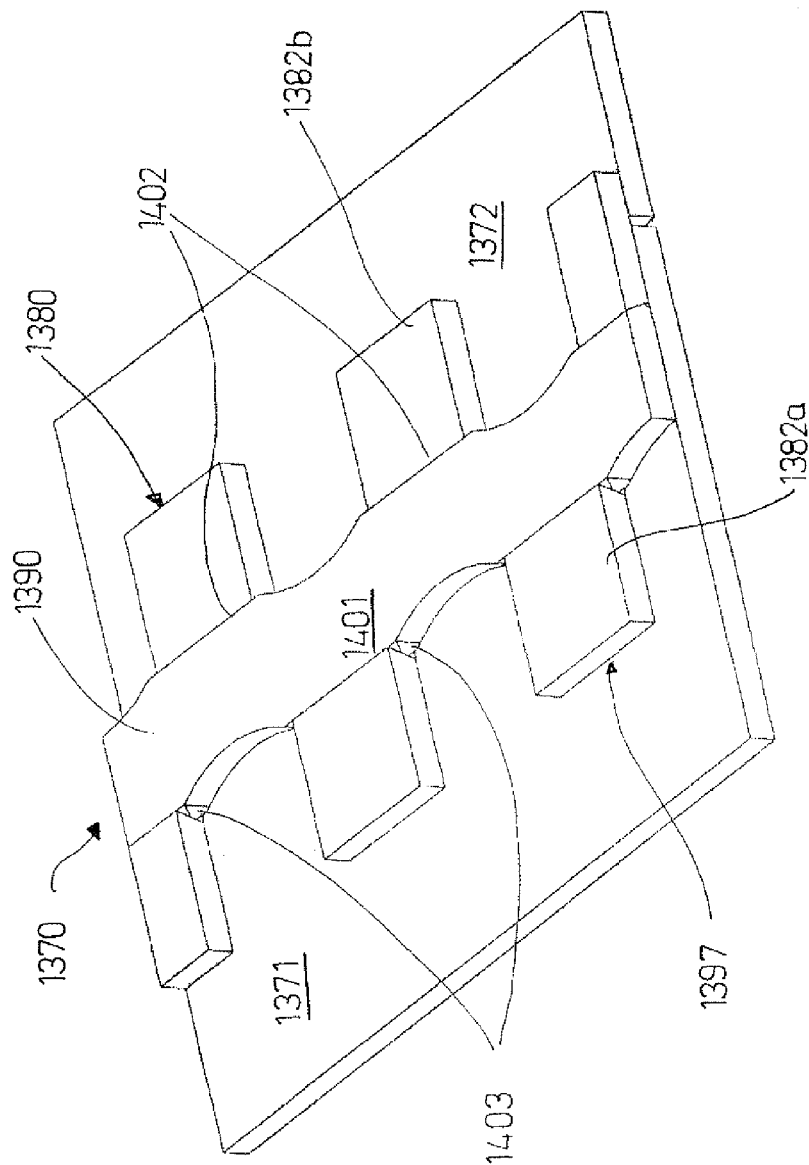
FIG. 57 is the same as FIG. 56 except that the assembly is shown in a final locking position.
Figure 58:
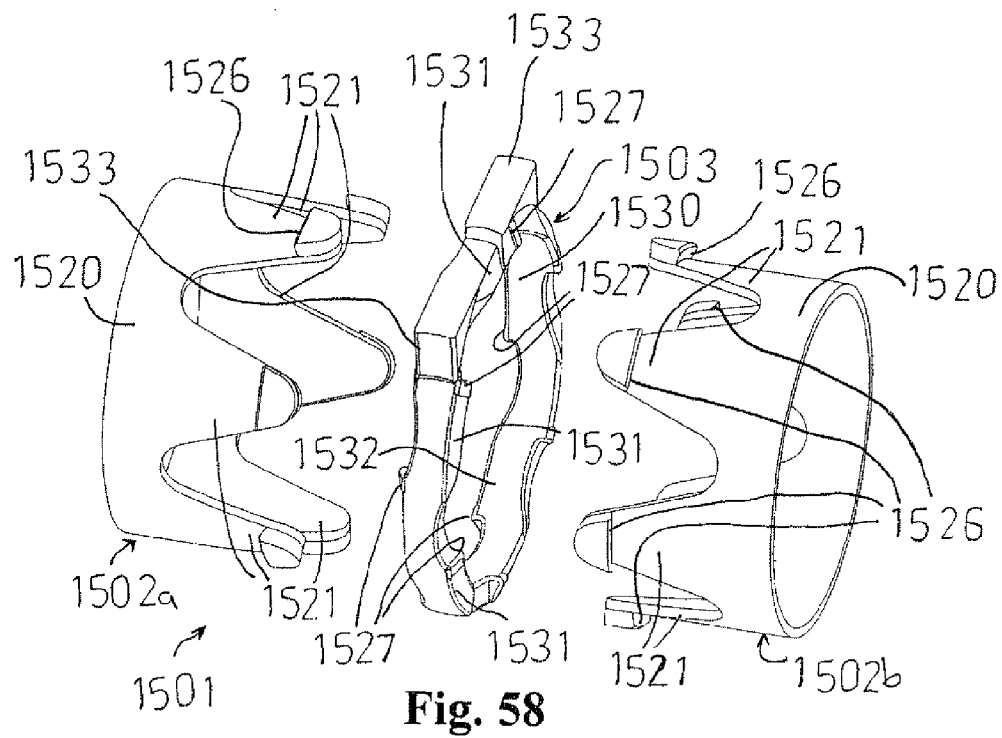
FIG. 58 is an exploded view of a connecting mechanism comprising two keyway arrangements and a keyway connector for connecting two tubular members together, according to an embodiment of the present invention.

Referring now to FIGS. 55 to 57, there is shown a panel assembly 1370 comprising a first panel 1371, a second panel 1372 and a keyway arrangement 1373, 1374 extending along an abutting corrugated edge of each panel 1371, 1372. These can be made of metal or plastics material, for example.

Each keyway 1380, 1397 of each keyway arrangement 1373, 1374 has a connector-support portion 1381a, 1381b and a key-retaining portion 1382a, 1382b.

As seen in FIGS. 55 to 57, a keyway connector 1390 of the assembly 1370 comprises a flat longitudinal body 1401 and keys 1402 extending from one side of the body 1401, and keys 1403 extending from an opposite side of the body 1401.

Keys 1402 extend in a common plane and are regularly spaced from one another. The spacing of keys 1402 matches the spacing of keyways 1380. Keys 1403 also extend in a common plane and are regularly spaced from one another. The spacing of keys 1403 matches the spacing of keyways 1397. Keys 1402 and 1403 are off-set relative to one another along a length of the body 1401 in the same manner as keyways 1380 and 1397 when intermeshed.

The keyways 1380, 1397 can intermesh with one another such that each keyway 1380 is straddled by keyways 1397 of the other arrangement. Keyways 1380 and 1397 intermesh to provide a continuous keyway passage 1410 extending longitudinally between the intermeshed keyways 1380, 1397 (the arrow as seen in FIG. 56).

The keyway connector 1390 can be inserted and slid longitudinally within the continuous keyway passage 1410, as seen in FIG. 56. Once inserted, each key-retaining portion 1382a, 1382b is potentially positioned to extend around a key 1402, 1403, Once the keyway connector 1390 extends within the passage 1410, it can be slid relative to the keyways 1380, 1397 until the keys 1402, 1403 engage the keyways 1380, 1397 and are retained by the keyways 1380, 1397 so as to lock the panels 1370, 1371 together to form a tight joint. To disconnect panel 1370 from panel 1371, the keyway connector 1390 is slid within the passage 1410 until the keys 1402, 1403 no longer engage the keyways 1380, 1397.

A method of joining components of various shapes and cross sectional profiles (polygonal, round, oval or freeform) is described in FIGS. 1 to 30. The joint disclosed largely overcomes the problems with conventional bolted flange type joints and, in addition, has the advantages of using less materials for the same strength, being faster to assemble and disassemble and, importantly, virtually eliminating human error in achieving correct joint tensioning, One or more of these embodiments, however, have the disadvantage that the joint can only be made by bringing the two faces to be joined together longitudinally. The projecting castellations/keyways may prevent the two faces from being brought together laterally as is required for lift out valves and other such pipe applications, in particular. This constraint could prevent use of those embodiments in these types of applications.

The embodiments of the invention described herein in FIGS. 31-36 and 37-42 overcome this limitation by constructing a curved, straight and or twisted joining strip that can be bonded to or more simply mechanically engaged against an adjoining hook or stepped surface that is formed on a part parallel to and displaced to either or both sides of the part joining faces. This hooked or stepped surface should ideally be shaped so that under load the strip anchor surfaces are drawn into tighter engagement with the body of the parts to be joined and so there should preferably be an acute rather than an obtuse angle on the surface designed to anchor the tensile forces generated by the joint engagement. This arrangement obviates the need for the two materials to be chemically or physically bonded together and indeed allows the joint so formed to be easily disassembled if required.

Importantly, these embodiments allow for very complex surface mating geometry such as saw tooth, corrugated or castellated mating surfaces to be constructed using simple fabrication techniques such as folding or rolling of metal edges to form a hook on the mating edges. The strips can be applied after the mating surfaces are engaged and can be removed before they are disengaged. The alignment of the castellations longitudinally becomes non-critical as the strips can be slid longitudinally into engagement during assembly.

For applications to flat panels (as per the embodiment shown in FIGS. 43 to 50), in particular such as knock down furniture, a dovetail groove can be formed into the wooden or fibre composite panel and a matching dovetail anchor on the strip can be slid into the grove. The advantages of this arrangement are that under high stress loading on the joint the bending moment on the hooks tends to exert beneficial forces back into the part thus helping counteract the opposing bending moment which would otherwise tend to flex the anchor away from the body of the part. This is important in that it allows the strip to be applied during assembly as manageable segments of varying length thus making it applicable to a wider range of industrial joining situations. It also means the materials used can be more varied. The strip could be mass produced of a material that was physically or chemically incompatible with the part but can still form a good joint even though the parts can't be glued or welded. For example an extruded or injection moulded thermoplastic strip could be mass produced then cut to the correct length and rapidly applied to a metal sheet with a tightly folded hook along its edge to engage and anchor a strip. See the embodiment of FIGS. 43 to 50, for example. Alternatively, plastic parts could have a steel strip applied that used yet a third material with desirable properties for the key. In some circumstances it will be an advantage for the anchoring hook part of the joining strip to be clipped into and retained firmly by a mating surface or groove in the anchoring region of the part so that multiple strips can be applied and remain in place until the key is used to engage and lock together the whole assembly. The same effect can be achieved by creating a variety of interlocking male and female shapes on each end of a keyway strip such that the sections of strip are held together in the correct relationship and do not move out of alignment during the locking up of the joint. In its most fundamental embodiment the keyway castellations could consist of a single keyway hook segment with an anchoring hook on the opposite end and a male mating portion on one side of the anchoring hook and female mating portion on the opposite side so that the two parts dovetail together with adjacent castellations like pieces of a jigsaw puzzle to form a long strip that can mesh with a similar longitudinal strip to form a keyway that can accept a key to lock the joint up securely. Correctly shaped a keyway so formed could suit straight line joints as well as a variety of radial curves (such as pipes) or longitudinal curves (flat or spirally curved joints)

An alternative method of achieving the objective of a lateral approach joint that has similar industrial applicability is to apply a series of double ended castellated hooks or longitudinal assemblies of hooks to create a double keyway. In this case two keys are required to complete the joint. To reduce the number of parts involved the two keys can be formed as one part if this is desirable.

A further refinement of this principle is illustrated in FIGS. 37-42 and comprises an embodiment where the keyway hooks 1031 and 1032 are spaced apart sufficiently to allow a type of key having a series of keys 1037 attached below the keyway connector body 1025 to be inserted over the keyway hooks and then moved into a locked position in the normal way for this technology. While this principle could be used for straight joints, it is particularly applicable for circular joints such as pipes and fittings where the key can be constructed as a single piece of relatively inflexible material that can be moved over a pipe joint longitudinally and then rotated circumferentially with appropriate mechanical advantage to lock up the joint securely in one operation. For greater servicing and assembly convenience the slip flange arrangement illustrates how the pipe flanges 1026 and 1027 can be made of castellated segments 1044 and 1045 that allow gaps 1048 and 1049 in the flange keyway anchor hook arrangement to pass over these castellated segments of the pipe but rotated to anchor the keyway hook arrangement 1023 and 1024 in position. This anchoring alignment can be preserved during tightening by inserting keys into one or more of gaps 1048 and 1049.

Yet further embodiments of the invention are described below.

FIGS. 58-63 show a further connecting mechanism 1501 comprising two keyway arrangements 1502*a*, 1502*b* and a keyway connector 1503 for connecting two tubular members 1504, 1505 together. These are made, for example, of metal, an alloy, plastics material, ceramics or rubber (including steel or polyurethane), or any combination of these either as separate components for assembly or as one component by way of casting, molding or similar methods.

Each keyway arrangement 1502 has a body in the form of a collar 1520 and six regularly spaced keyways 1521 extending from a circumference of the collar 1520 and generally parallel with a central axis of the collar 1520. The keyways 1521 have the general appearance of a sine waveform having both peaks and troughs. It is to be appreciated that the keyway arrangement could have any suitable number of spaced keyways, it need not be six. Also, rather than a sine waveform, the keyways could have any general appearance, for example a square, tapered-peak, triangle or sawtooth waveform.

The keyway connector 1503 has a body in the form of a ring 1530, a first set of six keys 1531 (only some of which have been labeled) extending from one side of the ring 1530, a second set of six keys 1532 (only some of which have been labeled) extending from an opposite side of the ring 1530, and a handle 1533 extending from the ring 1530.

Keys 1531, 1532 extend in a common plane and are regularly spaced from one another, matching the spacing of the keyways 1521. Keys 1531 and 1532 are off-set relative to one another along a length of the ring 1530 in the same manner as keyways 1521 when intermeshed.

The keyway connector 1503 further comprises a travel stop 1527 projecting from the ring body 1530 adjacent each key 1531, 1532.

Figure 60:
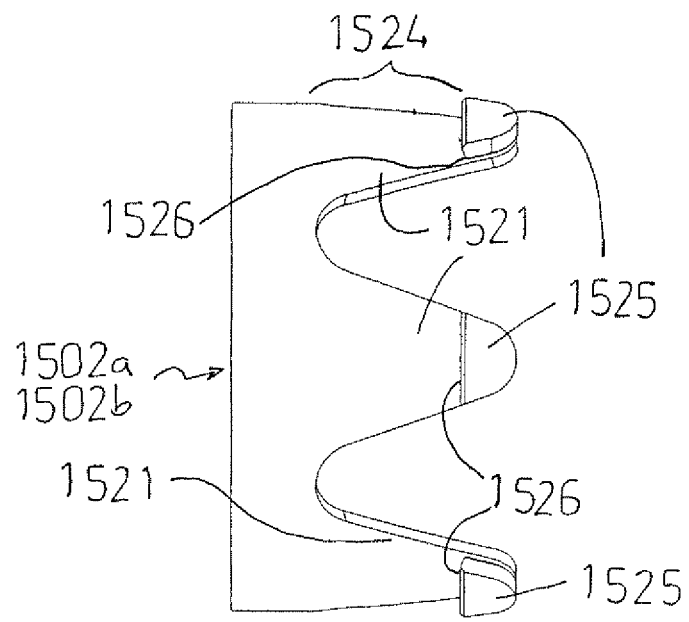
FIG. 60 is a side view of each keyway arrangement shown in FIG. 58.
Figure 61:
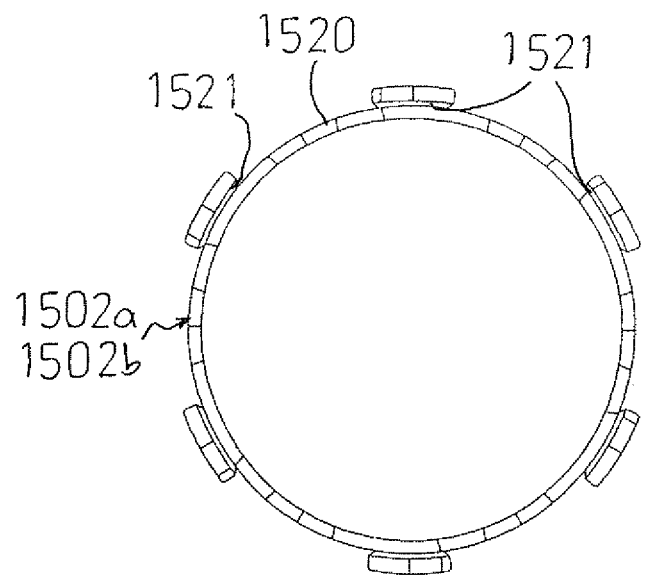
FIG. 61 is an end view of each keyway arrangement shown in FIG. 60.

As seen in FIG. 60, each keyway 1521 is in the form of a hook clip having a connector-support portion 1524 and a key-retaining portion 1525. A hook 1526 of each key-retaining portion 1525 can extend partway around a key 1531, 1532 of the keyway connector 1503.

Figure 59:
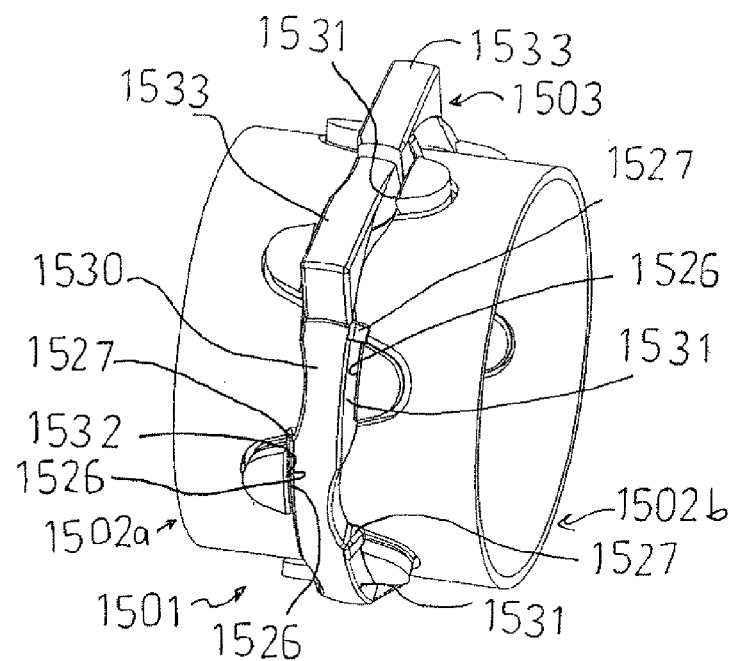
FIG. 59 is the same as FIG. 58 except showing parts of the connecting mechanism connected together.
Figure 62:
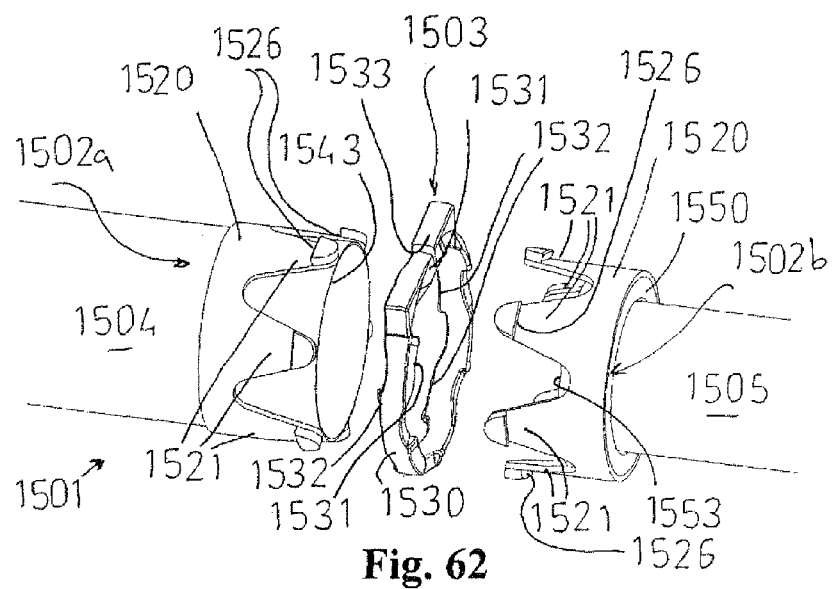
FIG. 62 shows the connecting mechanism of FIG. 58 in the process of connecting two tubular members together.
Figure 63:
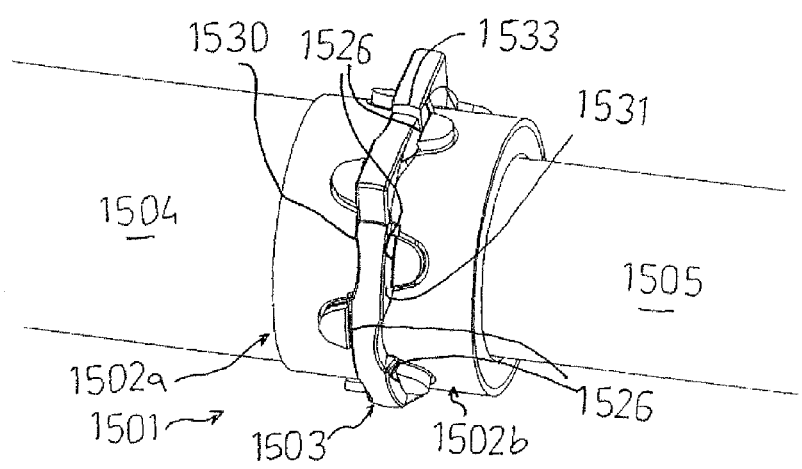
FIG. 63 is the same as FIG. 62 but showing the connecting mechanism of FIG. 58 connecting the two tubular members together.

As shown in FIGS. 59, 62 and 63, the keyways 1521 of the keyway arrangements 1502*a*, 1502*b* can intermesh with one another to provide a continuous keyway passage extending around the tubular members 1504, 1505 between the intermeshed keyways 1521. The keyway connector 1503 is insertable longitudinally within the continuous keyway passage when the keys 1531, 1532 are not positioned directly atop the keyways 1521.

Once the keyway connector ring body 1530 extends within the keyway passage, it can be slid/rotated relative to the keyways 1521 until the keys 1531, 1532 engage the keyways 1521 and are retained by the hooks 1526 of the keyways 1521, so as to lock the keyway arrangements 1502a, 1502b together. Travel stops 1527 prevent the ring body 1530 from being rotated further than required.

FIGS. 62 and 63 show how the connecting mechanism 1501 can be used to connect two tubular members 1504, 1505 together, end 1543 to end 1553. Tubular member 1505 has an end 1553 flange 1550. Tubular member 1504 is a pipe having an end 1543 lacking a flange. The diameters of tubular members 1504 and 1505 differ.

In use, keyway connector 1502a is adhered/glued/welded or otherwise affixed to tubular member 1504, or cast or molded or similar as one unitary component combining 1504, 1520, 1521, 1526 and 1543. Keyway connector 1502b is adhered/glued/welded or otherwise affixed to the flange 1550 of tubular member 1505. The purpose of the flange 1550 is to compensate for the differing diameter of the tubular members 1504, 1505. The flange 1550 could be a ring that is itself connectable to the tubular member 1505. That is, it need not be of unitary construction with the tubular member 1505.

The keyways 1521 are then intermeshed such that the ends 1543, 1553 abut. The keyway connector 1503 is then slid along or over one of the tubular members 1504, 1505 and into the keyway passage. The keys 1531, 1532 are then rotated into engagement with the hooks 1526 of the keyways 1521.

To disconnect the ends 1543, 1553 of the tubular members 1504, 1505, the keyway connector 1503 is rotated within the keyway passage until the keys 1531, 1532 no longer engage the keyways 1521.

Referring now to FIGS. 64 to 68, there is shown a panel assembly 1506 comprising a first panel 1507a, a second panel 1507b, a keyway arrangement 1508a, 1508b extending along an edge 1570 of each panel 1507a, 1507b, and a keyway connector 1509. These are made, for example, of metal, an alloy, plastics material, ceramics or rubber (including steel or polyurethane), or any combination of these either as separate components for assembly or as one component by way of casting, molding or similar methods. Panels 1507a and 1507b are illustrated here each of unitary construction. Although not illustrated, the panels 1507a, 1507b can be of indefinite length.

Each keyway arrangement 1508 has a body in the form of a strip 1580 and regularly spaced keyways 1581 (only some of which have been labeled) extending from the strip body 1580 and generally within the plane of the strip body 1580. The keyways 1581 have the general appearance of a sine waveform, having both peaks and troughs.

The keyway connector 1509 has a body in the form of a strip 1590, a first set of keys 1591 (only some of which have been labeled) extending from one side of the strip 1590 and a second set of keys 1592 (only some of which have been labeled) extending from an opposite side of the strip 1590.

Keys 1591, 1592 extend in a common plane and are regularly spaced from one another, matching the spacing of the keyways 1581. Keys 1591, 1592 are off-set relative to one another along a length of the strip 1590 in the same manner as keyways 1581 when intermeshed.

Figure 67:
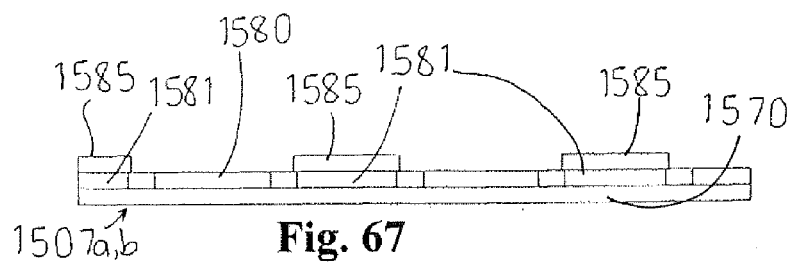
FIG. 67 is a side view of each panel/keyway arrangement shown in FIG. 64.
Figure 68:
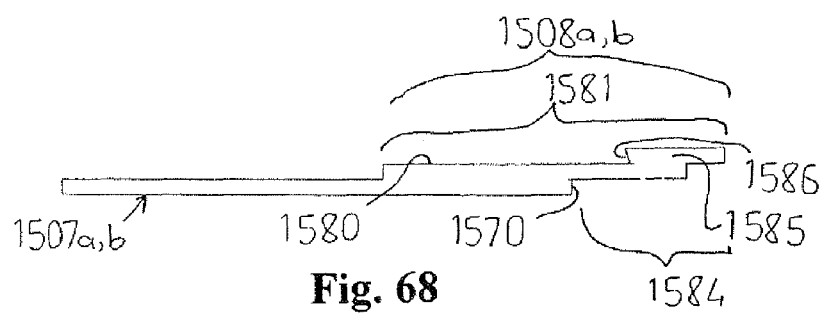
FIG. 68 is an end view of each panel/keyway arrangement shown in FIG. 64.

As seen in FIGS. 67 and 68, each keyway 1581 is in the form of a hook clip having a connector-support portion 1584 and a key-retaining portion 1585. A hook 1586 of each key-retaining portion 1585 can extend partway around a key 1591, 1592 of the keyway connector 1509.

Figure 64:
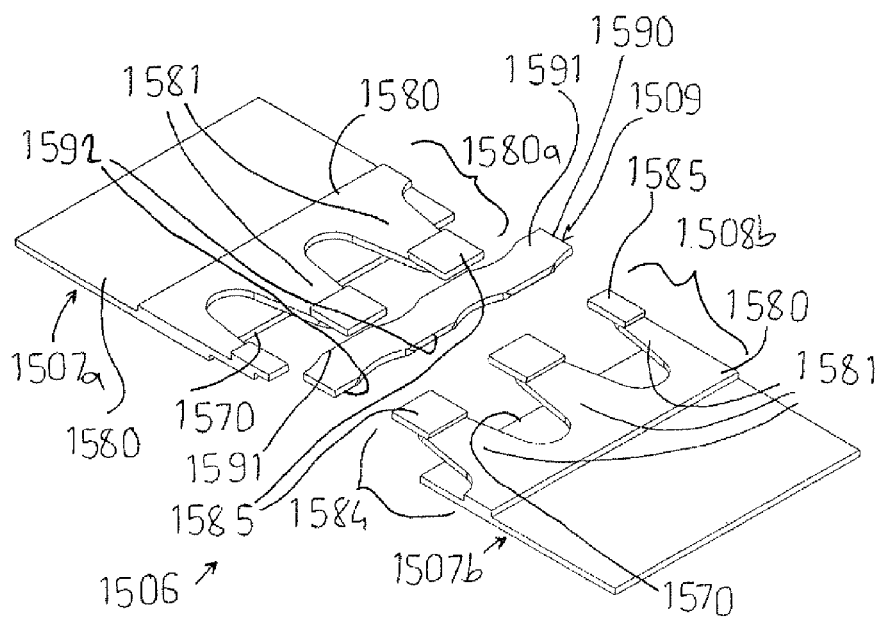
FIG. 64 is an exploded view of a panel assembly comprising two panels each having a connecting mechanism comprising two keyway arrangements, and a keyway connector, according to an embodiment of the present invention.
Figure 65:
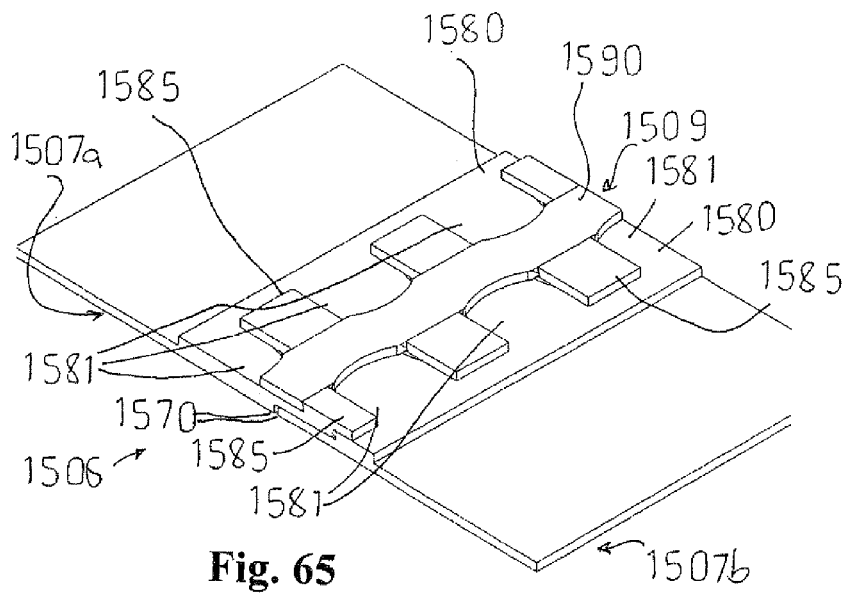
FIG. 65 is the same as FIG. 64 except showing the panels and connecting mechanism connected together.
Figure 66:
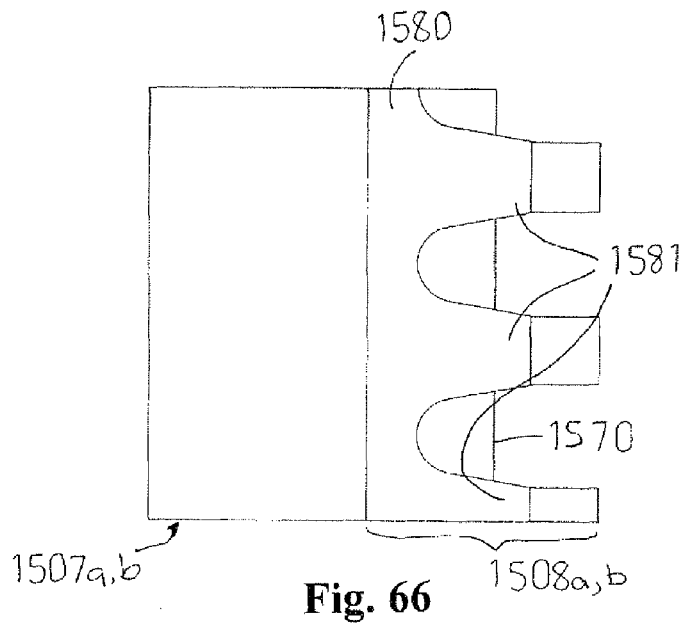
FIG. 66 is a top plan view of each panel/keyway arrangement shown in FIG. 64.

As shown in FIGS. 64 and 65, the keyways 1581 of the keyway arrangements 1508a, 1508b can intermesh with one another to provide a continuous keyway passage extending between the intermeshed keyways 1581. The keyway connector 1509 is insertable longitudinally within the continuous keyway passage. Once the keyway connector strip body 1590 extends within the keyway passage, it can be slid relative to the keyways 1581 until the keys 1591, 1592 engage the keyways 1585 and are retained by the hooks 1586 of the keyways 1581, so as to lock the keyway arrangements 1508a, 1508b together. As seen in FIG. 65, when connected, the intermeshed keyways 1581 support one another by way of the connector-support portion 1584.

Referring now to FIGS. 69-71, there is shown a connecting mechanism 1600 for joining two planar components (not shown) together and to mask the joint with a decorative finish. The connecting mechanism 1600 comprises a first keyway arrangement 1601a extendable along an edge of a first planar component, a second keyway arrangement 1601b extendable along a second planar component and a keyway connector 1603. These are made, for example, of metal, an alloy, plastics material, ceramics or rubber (including steel or polyurethane), or any combination of these either as separate components for assembly or as one component by way of casting, molding or similar methods. Although not illustrated, the keyway arrangements 1601a, 1601b and keyway connector 1603 can be of indefinite length.

Each keyway arrangement 1601a, 1601b has a body in the form of a strip 1604a, 1604b and regularly spaced keyways 1605a, 1605b (only some of which have been labeled) extending from the strip body 1604a, 1604b. The keyways 1605a, 1605b have the general appearance of a sine waveform, having both peaks and troughs.

Each strip 1604a, 1604b body has openings 1610a, 1610b for fasteners (eg. screws, nails or rivets) for secure fastening to the planar components. Alternatively each strip 1604a, 1604b body can be fastened to a planar component using double-sided adhesive tape that is locatable within a channel/groove 1611a, 1611b of each strip 1604a, 1604b body.

The keyway connector 1603 has an elongate rounded cover 1614 having an enclosed end 1615 and an elongate body 1616 extending from the cover 1614. The keyway connector 1603 has a first set of keys 1617 extending from one side of the body 1616 and a second set of keys 1618 extending from an opposite side of the body 1616. (only some of which have been labeled)

Keys 1617, 1618 extend in a common plane and are regularly spaced from one another, matching the spacing of the keyways 1605a, 1605b. Keys 1617, 1618 are off-set relative to one another along a length of the body 1616 in the same manner as the keyways 1605a, 1605b when intermeshed.

Each keyway 1605a, 1605b is in the form of a hook clip having a connector-support portion 1606a, 1606b and a key-retaining portion 1607a, 1607b. A hook of each key-retaining portion 1607a, 1607b can extend partway around a key 1617, 1618 of the keyway connector 1603.

As shown in FIGS. 70 and 71, the keyways 1605a, 1605b of the keyway arrangements 1601a, 1601b can intermesh with one another to provide a continuous keyway passage extending between the intermeshed keyways. The keyways 1605a, 1605b are supported by the strip 1604a, 1604b bodies (within the troughs). The keyway connector body 1616 is insertable longitudinally within the continuous keyway passage. Once the keyway connector body 1616 extends within the keyway passage, it can be slid relative to the keyways 1605a, 1605b until the keys 1617, 1618 engage the keyways 1605a, 1605b and are retained by the hooks 1607a, 1607b of the keyways 1605a, 1605b, so as to lock the keyway arrangements 1601a, 1601b together. When in this position, the cover 1614 hides the joint and provides a decorative and/or protective finish.

Referring now to FIGS. 72-74, there is shown a connecting mechanism 1700 comprising two keyway arrangements 1701a, 1701b and a keyway connector 1703 for joining two planar components (not shown) together at 90 degrees and to mask the joint with a decorative finish.

A first keyway arrangement 1701a is extendable along an edge of a first planar component and a second keyway arrangement 1701b is extendable along a second planar component. These together with the keyway connector 1703 are made, for example, of metal, an alloy, plastics material, ceramics or rubber (including steel or polyurethane), or any combination of these either as separate components for assembly or as one component by way of casting, molding or similar methods. Although not illustrated, the keyway arrangements 1701a, 1701b and keyway connector 1703 can be of indefinite length.

Each keyway arrangement 1701a, 1701b has a body in the form of a strip 1704a, 1704b and regularly spaced keyways 1705a, 1705b (only some of which are labeled) extending from the strip body 1704a, 1704b generally at 90 degrees to the strip body 1704a, 1704b. The keyways 1705a, 1705b have the general appearance of a sine waveform, having both peaks and troughs.

Each strip 1704a, 1704b body has openings 1710a, 1710b for fasteners (eg. screws, nails or rivets) for secure fastening to the planar components. In conjunction with this method, or alternatively each strip 1704a, 1704b body can be fastened to a planar component using adhesives or double-sided adhesive tape that is locatable within a channel/groove 1711a, 1711b of each strip 1704a, 1704b body.

The keyway connector 1703 has an elongate rounded cover 1714 having an enclosed end 1715 and an elongate body 1716 extending from the cover 1715. The keyway connector 1703 has a first set of keys 1717 extending from one side of the body 1716 and a second set of keys 1718 extending from an opposite side of the body 1716 (only some of which are labeled).

Keys 1717, 1718 extend in a common plane and are regularly spaced from one another, matching the spacing of the keyways 1705a, 1705b. Keys 1717, 1718 are off-set relative to one another along a length of the body 1716 in the same manner as the keyways 1705a, 1705b when intermeshed.

Each keyway 1705a, 1705b is in the form of a hook clip having a connector-support portion 1706a, 1706b and a key-retaining portion 1707a, 1707b. A hook of each key-retaining portion 1707a, 1707b can extend partway around a key 1717, 1718 of the keyway connector 1703.

As shown in FIG. 74, the keyways 1705a, 1705b of the keyway arrangements 1701a, 1701b can intermesh with one another to provide a continuous keyway passage extending between the intermeshed keyways. The keyways 1705a, 1705b are supported by the strip 1704a, 1704b bodies (within the troughs). The keyway connector body 1716 is insertable longitudinally within the continuous keyway passage. Once the keyway connector body 1716 extends within the keyway passage, it can be slid relative to the keyways 1705a, 1705b until the keys 1717, 1718 engage the keyways 1705a, 1705b and are retained by the hooks of the keyways 1705a, 1705b, so as to lock the keyway arrangements 1701a, 1701b together. When in this position, the cover 1714 hides the joint and provides a decorative and/or protective finish.

Advantages of the present invention, particularly as exemplified in FIGS. 58-74 include the following:

- The connecting mechanism's keyway and keyway connector size and scale can be readily adapted to suit a wide range of technical applications using a wide range of common or more exotic materials, thereby giving the connecting mechanism a range of advantages over fixed sizes and materials of conventional fasteners and joining methods.
- The connecting mechanism provides a strong, uniformly loaded joint along the entire length of the joint providing higher joint strength advantages over point load reliant joints, eg. bolted flanges, rivets, screws, pins or similar.
- The keyway connector can be readily and rapidly secured into position by moving one component relative to the other by the distance of one keyway/keyway connector pitch length. (The pitch length of a keyway is the distance from one keyway sine wave peak to the adjacent keyway sine wave peak (or trough to trough). This enables much faster and more convenient joining and assemblage of, say, joints assembled using traditional fasteners.
- The intermeshing keyways (castellations) provide a self-aligning system to inherently assist in alignment during assembly. This alignment advantage is further enhanced when using a sine or other curved profile for the keyway arrangements by way of smooth curved alignment edges.
- The connecting mechanism can be either permanent or non-permanent and can be assembled and disassembled numerous times. This provides exceptional advantages over traditional permanent joining methods such as welding, soldering, fusing, bonding, adhering, glueing or similar methods.
- By pulling the two or more components together, a range of forces and secured joint can be applied dependent on the application.
- By pulling the two or more components together, a range of sealing methods, materials and options can be utilised.
- For high load or pressure applications, the arrangement of the keyways and keyway connectors provides an advantage to sully protect and support the sealing method/s therefore providing a higher pressure advantage over other direct abutment type joints that may allow the seal to be forced out of the join under pressure and/or load.
- The connecting mechanism generally enables rapid and easy assembly of items.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

What we claim is:

1. A method of connecting at least a first component comprising at least one first keyway arrangement extending along the first component and a second component comprising at least one second keyway arrangement extending along the second component, the first and second components together creating an assembly when connected, wherein the at least one first and second keyway arrangements include first and second keyways which are spaced apart from one another, respectively, wherein said method comprises the steps of:

aligning the at least one first and second keyway arrangements of the first and second components such that the first and second keyways thereof intermesh to provide a continuous keyway passage extending longitudinally between the intermeshed first and second keyways; and extending a keyway connector comprising an arrangement of keys longitudinally within the keyway passage such that the arrangement of keys of the keyway connector engages the first and second keyways of the at least one first and second keyway arrangements of the first and second components, respectively, to lock the first and second components together, wherein:

(i) the keyway connector comprises an elongate body having opposed first and second longitudinal sides, wherein the arrangement of keys of the keyway connector comprises first keys extending laterally off the first longitudinal side and second keys extending laterally off the second longitudinal side; and wherein (ii) the first keys extending laterally off the first longitudinal side are offset from the second keys extending laterally off the second longitudinal side relative to a length of the elongate body; and wherein (iii) the keyway connector extends longitudinally within the keyway passage such that keys of the arrangement of keys of the keyway connector individually engage and are retained by individual said first and second keyways of the at least one first and second keyway arrangements to lock the first and second components together, respectively; and wherein (iv) the first and second keys of each of said first and second longitudinal sides, respectively, are adapted to slide along the keyway passage in a first direction and a second direction that is opposite to the first direction; and wherein (v) each of said first and second keys of each said first and second longitudinal sides, respectively, is adapted to slide along the keyway passage in both the first and second directions out of locking engagement with a respective one of said first and second keyways.

2. The method of claim 1, wherein at least one of said first and second keyways is in the form of a hook and at least one of said first and second keys is shaped so as to be retained by the hook.

3. The method of claim 1, comprising intermeshing the at least one first and second keyway arrangements of the first and second components to provide the continuous keyway passage, the at least one first keyway arrangement of the first component being supported in part by the second component and the at least one second keyway arrangement of the second component being supported in part by the first component.

4. The method of claim 1, wherein the keyway connector comprises a cover that extends between the first and second components and substantially obscures the at least one first and second keyway arrangements thereof from sight when the first and second components are locked together.

5. The method of claim 1, wherein the keyway connector comprises a handle, lobe, grip surface or third component extending from or along the elongate body.

6. The method of claim 1, wherein at least one of said first and second keyway arrangements is detachably connectable to one of said first and second components, respectively.

7. The method of claim 6, wherein all of said first and second keyway arrangements are detachably connectable to said first and second components, respectively.

8. The method of claim 1, wherein the first and second components are in the form of panels or walls connectable edge to edge or face to face.

9. The method of claim 8, wherein the panels or walls extend in substantially the same plane relative to one another.

10. The method of claim 8, wherein the panels or walls extend at different angles relative to one another.

11. The method of claim 8, wherein the panels or walls extend perpendicularly relative to one another.

12. The method of claim 1, wherein at least one of said first and second components is in the form of an arcuate, cylindrical or annular component.

13. The method of claim 1, wherein the first and second components are each in the form of a pipe, and wherein the at least one first and second keyway arrangements extend around abutting ends of said pipes, and wherein the keyway connector is annular.

* * * * *